US012003088B2

(12) United States Patent
Politis et al.

(10) Patent No.: US 12,003,088 B2
(45) Date of Patent: *Jun. 4, 2024

(54) DEVICES FOR OVERVOLTAGE, OVERCURRENT AND ARC FLASH PROTECTION

(71) Applicant: RIPD IP DEVELOPMENT LTD, Nicosia (CY)

(72) Inventors: Zafiris G. Politis, Athens (GR); Grigoris Kostakis, Athens (GR); Thomas Tsovilis, Drama (GR); Kostas Bakatsias, Athens (GR)

(73) Assignee: RIPD IP DEVELOPMENT LTD, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,265

(22) Filed: Oct. 27, 2022

(65) Prior Publication Data
US 2023/0141386 A1    May 11, 2023

Related U.S. Application Data

(63) Continuation of application No. 16/578,779, filed on Sep. 23, 2019, now Pat. No. 11,527,879, which is a
(Continued)

(51) Int. Cl.
*H02H 3/00* (2006.01)
*H02H 1/00* (2006.01)
(Continued)

(52) U.S. Cl.
CPC ............ *H02H 3/00* (2013.01); *H02H 1/0015* (2013.01); *H02H 3/08* (2013.01); *H02H 9/02* (2013.01); *H02H 9/041* (2013.01)

(58) Field of Classification Search
CPC ........................................................ H02H 9/041
(Continued)

(56) References Cited

U.S. PATENT DOCUMENTS 3,968,407 A * 7/1976 Wilson .................. H02H 9/008
361/91.6
4,288,830 A * 9/1981 Brasfield ................ H02H 9/041
361/111
(Continued)

FOREIGN PATENT DOCUMENTS

CN         2321155 Y     5/1999
CN       201113427 Y     9/2008
(Continued)

OTHER PUBLICATIONS

Toni Ott, WO 2021, 151623; entire specification and drawings; (Year: 2021).*
(Continued)

*Primary Examiner* — Dharti H Patel
(74) *Attorney, Agent, or Firm* — Myers Bigel, P.A.

(57) ABSTRACT

A crowbar module includes first and second electrical terminals, a module housing, and first and second crowbar units. The first crowbar unit is disposed in the module housing and includes a first thyristor electrically connected between the first and second electrical terminals. The second crowbar unit is disposed in the module housing and includes a second thyristor electrically connected between the first and second electrical terminals in electrical parallel with the first crowbar unit.

20 Claims, 35 Drawing Sheets

Related U.S. Application Data continuation of application No. 15/071,758, filed on Mar. 16, 2016, now Pat. No. 10,447,023.

(60) Provisional application No. 62/135,284, filed on Mar. 19, 2015.

(51) Int. Cl.
*H02H 3/08* (2006.01)
*H02H 9/02* (2006.01)
*H02H 9/04* (2006.01)

(58) Field of Classification Search
USPC .................................................. 361/56, 91.1
See application file for complete search history.

(56) References Cited

U.S. PATENT DOCUMENTS

| | | | | |
|---|---|---|---|---|
| 4,384,246 A * | 5/1983 | Larsen | H02H 7/06 | 322/29 |
| 4,475,139 A * | 10/1984 | Chadwick | H02J 3/1864 | 363/54 |
| 4,571,535 A * | 2/1986 | Gyugyi | H02J 3/1864 | 361/91.8 |
| 4,656,554 A * | 4/1987 | Maschek | H02H 9/04 | 361/91.7 |
| 4,912,589 A * | 3/1990 | Stolarczyk | H02H 9/04 | 337/28 |
| 5,436,786 A * | 7/1995 | Pelly | H02H 9/041 | 361/91.8 |
| 5,621,599 A * | 4/1997 | Larsen | H02H 9/041 | 361/91.8 |
| 5,646,810 A * | 7/1997 | Funke | H02H 9/04 | 361/111 |
| 6,038,119 A | 3/2000 | Atkins et al. | | |
| 6,118,639 A * | 9/2000 | Goldstein | H02H 9/042 | 361/55 |
| 6,226,162 B1 * | 5/2001 | Kladar | H02H 9/041 | 361/111 |
| 6,430,020 B1 | 8/2002 | Atkins et al. | | |
| 6,459,559 B1 * | 10/2002 | Christofersen | H02H 9/04 | 361/124 |
| 6,903,911 B2 * | 6/2005 | Reischer | H02M 1/32 | 361/100 |
| 7,433,169 B2 | 10/2008 | Kamel et al. | | |
| 7,986,132 B2 * | 7/2011 | Angquist | H02J 3/1864 | 323/210 |
| 8,743,525 B2 | 6/2014 | Xepapas et al. | | |
| 8,929,042 B2 * | 1/2015 | Pfitzer | H02H 9/041 | 361/91.1 |
| 9,385,524 B2 * | 7/2016 | Rowny, Jr. | H02H 7/06 | |
| 9,853,475 B2 * | 12/2017 | Ren | H02J 3/16 | |
| 10,447,023 B2 * | 10/2019 | Politis | H02H 9/02 | |
| 2002/0159212 A1 * | 10/2002 | Oughton, Jr. | H02H 9/041 | 361/111 |
| 2003/0086224 A1 * | 5/2003 | Elms | H02H 9/042 | 361/91.1 |
| 2003/0141517 A1 | 7/2003 | Merlin et al. | | |
| 2006/0034031 A1 * | 2/2006 | Lehuede | H02H 9/041 | 361/118 |
| 2006/0181818 A1 * | 8/2006 | Drubel | H02H 3/38 | 361/20 |
| 2007/0159760 A1 * | 7/2007 | Clark | H02H 9/04 | 361/118 |
| 2008/0074910 A1 | 3/2008 | Casteel | | |
| 2008/0239592 A1 | 10/2008 | Roscoe et al. | | |
| 2009/0154034 A1 * | 6/2009 | Tallam | H02H 9/06 | 361/56 |
| 2009/0161284 A1 * | 6/2009 | Maraval | B66C 1/08 | 361/144 |
| 2010/0091417 A1 * | 4/2010 | Letas | F03D 9/257 | 361/56 |
| 2011/0170218 A1 | 7/2011 | Claude et al. | | |
| 2011/0234099 A1 | 9/2011 | Ganireddy et al. | | |
| 2012/0300352 A1 * | 11/2012 | de Palma | H02H 9/041 | 361/91.5 |
| 2013/0169068 A1 * | 7/2013 | Wagoner | H02H 3/003 | 307/112 |
| 2013/0321959 A1 * | 12/2013 | Ranstad | H02M 5/458 | 361/18 |
| 2014/0078622 A1 * | 3/2014 | Crane | H01H 33/596 | 361/8 |
| 2014/0340807 A1 * | 11/2014 | Kularatna | H02H 9/005 | 361/118 |
| 2015/0098156 A1 * | 4/2015 | Rowny, Jr. | H02H 7/06 | 361/20 |
| 2015/0305169 A1 * | 10/2015 | Wakana | H05K 7/20454 | 361/709 |
| 2015/0371799 A1 * | 12/2015 | Sumino | H01H 47/00 | 307/96 |
| 2016/0013623 A1 * | 1/2016 | Zheng | H01T 13/44 | 361/263 |
| 2016/0204595 A1 * | 7/2016 | Park | H02H 3/16 | 361/10 |
| 2016/0254662 A1 * | 9/2016 | Dawley | H02H 9/02 | 361/93.1 |
| 2016/0276821 A1 * | 9/2016 | Politis | H02H 9/041 | |
| 2018/0183230 A1 * | 6/2018 | Kostakis | H01C 7/12 | |

FOREIGN PATENT DOCUMENTS

| | | | |
|---|---|---|---|
| CN | 201466601 U | 5/2010 | |
| CN | 203761306 U | 8/2014 | |
| DE | 4235329 A1 | 4/1994 | |
| DE | 4438593 A1 | 5/1996 | |
| DE | 19839422 A1 | 3/2000 | |
| DE | 10323220 A1 | 12/2004 | |
| DE | 102013103753 A1 | 10/2013 | |
| DE | 202014104564 U1 | 11/2014 | |
| EP | 0100626 A2 | 2/1984 | |
| EP | 1058366 A2 * | 12/2000 | H02H 3/44 |
| EP | 1058366 A2 | 12/2000 | |
| EP | 1116246 B1 | 7/2001 | |
| EP | 1855365 A1 | 11/2007 | |
| EP | 2701255 A1 | 2/2014 | |
| GB | 1262642 A | 2/1972 | |
| GB | 2251741 A | 7/1992 | |
| KR | 10-0981787 B1 | 9/2010 | |
| WO | 01/75910 A1 | 10/2001 | |
| WO | 2008/153578 A1 | 12/2008 | |

OTHER PUBLICATIONS

Liu; CN 20313453; entire specification and drawings (Year: 2013).*

\* cited by examiner

DEVICES FOR OVERVOLTAGE, OVERCURRENT AND ARC FLASH PROTECTION

RELATED APPLICATIONS

The present application is a continuation of U.S. patent application Ser. No. 16/578,779, filed Sep. 23, 2019, which is a continuation of U.S. patent application Ser. No. 15/071,758, now U.S. Pat. No. 10,447,023 filed Mar. 16, 2016, which claims the benefit of and priority from U.S. Provisional Patent Application No. 62/135,284, filed Mar. 19, 2015, the disclosures of each are incorporated herein by reference.

FIELD OF THE INVENTION

The present invention relates to circuit protection devices and, more particularly, to overvoltage, overcurrent and arc flash protection devices and methods.

BACKGROUND

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges and resulting down time may be very costly.

Typically, sensitive electronic equipment may be protected against transient overvoltages and surge currents using Surge Protective Devices (SPDs). For example, brief reference is made to FIG. 1, which is a system including conventional overvoltage and surge protection. An overvoltage protection device 10 may be installed at a power input of equipment to be protected 50, which is typically protected against overcurrents. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance. In this manner, the device can withstand significant short circuit currents. In this regard, there may be no operational need for an internal thermal disconnector. Further to the above, some embodiments that exhibit even higher short circuit withstand capabilities may also be protected only by the main circuit breaker of the installation without the need for a dedicated branch fuse.

Brief reference is now made to FIG. 2, which is a block diagram of a system including conventional surge protection. As illustrated, a three phase line may be connected to and supply electrical energy to one or more transformers 66, which may in turn supply three phase electrical power to a main circuit breaker 68. The three phase electrical power may be provided to one or more distribution panels 62. As illustrated, the three voltage lines of the three phase electrical power may designated as L1, L2 and L3 and a neutral line may be designated as N. In some embodiments, the neutral line N may be conductively coupled to an earth ground.

Some embodiments include surge protection devices (SPDs) 104. As illustrated, each of the SPDs 104 may be connected between respective ones of L1, L2 and L3, and neutral (N). The SPD 104 may protect other equipment in the installation such as the distribution panel among others. In addition, the SPDs may be used to protect all equipment in case of prolonged overvoltages. However, such a condition may force the SPD to conduct a limited current for a prolonged period of time, which may result in the overheating of the SPD and possibly its failure (depending on the energy withstand capabilities the SPD can absorb and the level and duration of the overvoltage condition). A typical operating voltage of an SPD 104 in the present example may be about 400V (for 690V L-L systems). In this regard, the SPDs 104 will each perform as an insulator and thus not conduct current during normal operating conditions. In some embodiments, the operating voltage of the SPD's 104 is sufficiently higher than the normal line-to-neutral voltage to ensure that the SPD 104 will continue to perform as an insulator even in cases in which the system voltage increases due to overvoltage conditions that might arise as a result of a loss of power or other power system issues.

In the event of a surge current in, for example, L1, protection of power system load devices may necessitate providing a current path to ground for the excess current of the surge current. The surge current may generate a transient overvoltage between L1 and N. Since the transient overvoltage significantly exceeds that operating voltage of SPD 104, the SPD 104 will become conductive, allowing the excess current to flow from L1 through SPD 104 to the neutral N. Once the surge current has been conducted to N, the overvoltage condition ends and the SPD 104 may become non-conducting again. However, in some cases, one or more SPD's 104 may begin to allow a leakage current to be conducted even at voltages that are lower that the operating voltage of the SPD's 104.

Additionally, within an electrical device cabinet there may be devices that may protect the equipment inside the cabinet and proximate personnel from arc flashes that could be generated inside the cabinet. An arc flash occurring within a cabinet may create severe damages and is considered to be a very serious safety hazard for the personnel. As such, detection of the arc flash and interruption of the corresponding current should be as fast as possible to minimize damages and/or risks. However, especially in high power systems, during an arc flash the fault current could be limited to a lower level than the current threshold required for the main circuit breaker to trip fast enough. Faster response times may be required to avoid damages and/or risk. One solution employed by many manufacturers includes an electronic system to force the external tripping of the circuit breaker. During an arc flash there may be a significant increase of the pressure inside the cabinet and a significant increase in the illumination. An electronic circuit may use pressure and/or optical sensors to detect the presence of an arc flash and trip the circuit breaker. Other more recent techniques use readings of the voltage and current of the power system and trip the circuit breaker when specific patterns of these readings are encountered.

However, the time that a circuit breaker may take to disconnect the system form the power source (after being externally tripped by the electronic circuit) may be in the order of 100 milliseconds or more. During this time, a short circuit current that may be in a range of about 10 kAmperes to about 100 kAmperes may cause damage to the internal portions of the equipment as well as expose proximate personnel to significant danger.

SUMMARY

Some embodiments of the present invention are directed to a circuit protection device that includes an arc flash, overcurrent, overvoltage and surge protection system that is connected between a plurality of phase lines and a neutral line that are between an incoming power supply line and an electrical load panel in an electrical equipment.

In some embodiments, the arc flash, overcurrent, overvoltage and surge protection system includes a crowbar device that is coupled to the plurality of phase lines and to the neutral line and is configured to prevent an overvoltage condition by generating a low resistance current path from the plurality of phase lines to the neutral line, a plurality of surge protection devices that are connected to the plurality of phase lines and to the neutral line and that are configured to protect the equipment during an overvoltage condition by conducting a limited amount of current that corresponds to the overvoltage condition, and a crowbar trigger circuit that is configured to cause the crowbar device to turn on and provide the low resistance current path from ones of the plurality of phase lines to the neutral line.

Some embodiments provide that the crowbar device includes a plurality of overvoltage protection modules that are coupled between respective ones of the plurality of phase lines and the neutral line. In some embodiments, ones of the plurality of overvoltage protection modules each include a bidirectional thyristor and an inductor that is connected in series with the bidirectional thyristor. Some embodiments provide that ones of the plurality of overvoltage protection modules each include two thyristors that are connected in antiparallel with one another and an inductor that is connected in series with the two thyristors. In some embodiments, the ones of the plurality of overvoltage modules further comprise a snubber circuit that is connected in parallel with the two thyristors. Some embodiments provide that the snubber circuit includes a resistor and a capacitor that are connected in series with one another.

In some embodiments, the arc flash, overcurrent, overvoltage and surge protection system further includes an arc flash detection system that is configured to detect an arc flash within the equipment and to generate and send an arc flash signal to the crowbar trigger circuit.

Some embodiments provide that the crowbar trigger circuit includes a plurality of thyristor trigger circuits that are configured to generate thyristor trigger signals that are received by the crowbar device. In some embodiments, the crowbar trigger circuit further includes a power supply and voltage hold-up circuit that is configured to receive electrical power for the trigger circuit and to provide power to the trigger circuit for a time period after the electrical power for the trigger circuit is lost, an interface circuit that is configured to receive inputs corresponding to voltages of the plurality of phase lines, current flow through the plurality of phase lines, an arc flash signal and/or temperatures or respective surge protection devices, and a microcontroller that is configured to receive data from the interface circuit, to process the received data and to generate and send trigger signals one or more of the plurality of thyristor trigger circuits, an alarm signal to a remote alerting device and/or a trip signal to a main circuit breaker. Some embodiments provide that the power supply and voltage holdup circuit includes a plurality of DC-DC converters that are each operable to provide voltages to ones of the plurality of thyristor trigger circuits and a holdup circuit that is configured to hold a voltage that is provided to the plurality of DC-dc converters.

Some embodiments provide that the crowbar device includes a plurality of pairs of antiparallel connected thyristors that are coupled between respective ones of the plurality of phase lines and the neutral line, a plurality of inductors that are connected in series respective ones of the plurality of pairs of antiparallel thyristors, and a plurality of surge protection devices that are connected between respective ones of the plurality of phase lines and the neutral line.

In some embodiments, the arc flash, overcurrent, overvoltage and surge protection system includes a crowbar device that is coupled to and between the plurality of phase lines and is configured to prevent an overvoltage condition by selectively generating a low resistance current path between the plurality of phase lines, a plurality of surge protection devices that are connected to and between the plurality of phase lines and that are configured to protect the equipment during an overvoltage condition by conducting a limited amount of current that corresponds to the overvoltage condition, and a crowbar trigger circuit that is configured to cause the crowbar device to turn on and provide the low resistance current path from ones of the plurality of phase lines to the neutral line.

Some embodiments provide that the arc flash, overcurrent, overvoltage and surge protection system includes a crowbar device that is coupled to the plurality of phase lines and to the neutral line and is configured to prevent an overvoltage condition by generating a low resistance current path from the plurality of phase lines to the neutral line, a plurality of surge protection devices that are connected to the plurality of phase lines and to the neutral line and that are configured to protect the equipment during an overvoltage condition by conducting a limited amount of current that corresponds to the overvoltage condition, and an arc flash trigger circuit that is configured to cause the crowbar device to turn on and provide the low resistance current path from ones of the plurality of phase lines to the neutral line. In some embodiments, the crowbar device includes a plurality of self-triggering crowbar modules that are connected to the neutral line and respective ones of the plurality of phase lines.

In some embodiments, the plurality of self-triggering crowbar modules each include two thyristors that are connected in antiparallel with one another, an inductor that is connected in series with the two thyristors, and a crowbar trigger circuit that is configured to receive a current signal from a current sensor on the corresponding one of the plurality of phase lines and to cause at least one of the two thyristors to provide a low resistance current path between the corresponding one of the plurality of phase lines and the neutral line responsive to the current signal exceeding a current threshold.

In some embodiments, the crowbar trigger circuit is configured to generate a trigger signal in the absence of any signal from the arc flash trigger circuit. Some embodiments provide that the crowbar trigger circuit is configured to provide self triggering of the corresponding one of the plurality of crowbar modules during a start-up period of the equipment. In some embodiments, the arc flash trigger circuit is configured to trigger the plurality of crowbar modules responsive to detecting an arc flash after the start-up period of the equipment.

Some embodiments provide that the ones of the plurality of crowbar modules further include a snubber circuit that is connected in parallel with the two thyristors and that the snubber circuit includes a resistor and a capacitor that are connected in series with one another.

In some embodiments, the arc flash, overcurrent, overvoltage and surge protection system further includes an arc flash detection system that is configured to detect an arc flash within the equipment and to generate and send an arc flash signal to the arc flash trigger circuit.

Some embodiments provide that the arc flash, overcurrent, overvoltage and surge protection system further includes a threshold selector that is connected to the arc flash trigger circuit and is configured to provide a threshold current selection signal corresponding to a current threshold value. In some embodiments, the threshold selector includes a user input device that receives a user input and that provides the threshold current selection signal to the arc flash trigger circuit. Some embodiments provide that the threshold current selection signal includes a discrete binary value, and wherein a lowest value of the discrete binary value corresponds to a default threshold current.

Some embodiments of the present invention are directed to an arc flash, overcurrent, overvoltage and surge protection system that includes a crowbar device that is coupled to and between a plurality of phase lines and is configured to prevent an overvoltage condition by selectively generating a low resistance current path between the plurality of phase lines and a plurality of surge protection devices that are connected to respective ones of the plurality of phase lines and to the crowbar device and that are configured to protect the equipment during an overvoltage condition by conducting a limited amount of current that corresponds to the overvoltage condition.

In some embodiments, ones of the plurality of surge protection devices each include a first terminal that is connected to a corresponding one of the plurality of phase lines and a second terminal that is connected to the crowbar device. Some embodiments provide that the crowbar device includes a plurality of phase terminals that are connected to the plurality of surge protection devices and a plurality of thyristors that are connected between different pairs of the phase terminals.

Some embodiments provide that the crowbar device further includes a crowbar trigger circuit that is operable to generate thyristor trigger signals to the plurality of thyristors responsive to detecting a fault condition on the phase lines. In some embodiments, the crowbar trigger circuit includes a rectification circuit that generates a direct current (DC) signal corresponding to the voltages between the plurality of phase lines, a comparator that compares the DC signal from the rectification circuit to a reference signal, and a plurality of isolation drivers that receive a comparator output, and, responsive to the comparator output indicating that the DC signal exceeds the reference signal, generates a trigger signal that turns on the plurality of thyristors.

In some embodiments, the surge protection devices comprise metal oxide varistors.

Some embodiments of the present invention are directed to a surge protection system that includes a plurality of crowbar modules that are coupled to a plurality of phase lines and that are configured to prevent an overvoltage condition by selectively generating a low resistance current path between the plurality of phase lines and a neutral line and a plurality of surge protection devices that are connected in series with respective ones of the plurality of crowbar modules to provide a plurality of series circuits that each include one of the plurality of crowbar modules and one of the plurality of surge protection devices, wherein each of series circuits is connected between a corresponding one of the plurality of phase lines and the neutral line.

In some embodiments, ones of the plurality of surge protection devices each include a first terminal that is connected to a corresponding one of the plurality of phase lines and a second terminal that is connected to a corresponding one of the plurality of crowbar modules. In some embodiments, ones of the plurality of crowbar modules each include a plurality of antiparallel thyristors that are connected between a corresponding one of the plurality of surge protection devices and the neutral line and a crowbar trigger circuit that is operable to generate thyristor trigger signals to the plurality of thyristors responsive to detecting a fault condition on the phase lines.

In some embodiments, the crowbar trigger circuit includes a rectification circuit that generates a direct current (DC) signal corresponding to a voltage on the corresponding one of the plurality of phase lines, a comparator that compares the DC signal from the rectification circuit to a reference signal, a driver that receives the comparator output, and, responsive to the comparator output indicating that the DC signal exceeds the reference signal, generates a thyristor drive signal, and an optical isolator that generates a thyristor trigger signal responsive to receiving the thyristor drive signal from the driver, wherein the thyristor trigger signal turns the pair of antiparallel thyristors on to provide a low resistance current path between the corresponding one of the surge protectors and the neutral line.

According to embodiments of the invention, a crowbar module includes first and second electrical terminals, a module housing, and first and second crowbar units. The first crowbar unit is disposed in the module housing and includes a first thyristor electrically connected between the first and second electrical terminals. The second crowbar unit is disposed in the module housing and includes a second thyristor electrically connected between the first and second electrical terminals in electrical parallel with the first crowbar unit.

In some embodiments, the first thyristor is connected in antiparallel to the second thyristor.

The crowbar module may include a snubber circuit disposed in the module housing and electrically connected between the first and second electrical terminals in electrical parallel with each of the first and second crowbar units.

The crowbar module may include a coil assembly connected electrically in series between the first terminal and each of the first and second crowbar units. In some embodiments, the crowbar module includes a snubber circuit disposed in the module housing and electrically connected between the first and second electrical terminals in electrical parallel with each of the first and second crowbar units.

In some embodiments, the coil assembly includes: an electrically conductive coil member, the coil member including a spirally extending coil strip defining a spiral coil channel; and an electrically insulating casing including a separator wall portion that fills the coil channel.

In some embodiments, the module housing includes a cover defining an enclosed cavity, the first and second crowbar units are contained in the enclosed cavity, and the crowbar module further includes a filler material that fills a volume in the enclosed cavity not occupied by the first and second crowbar units. In some embodiments, the filler material is an epoxy.

The crowbar module may include a metal-oxide varistor device disposed in the module housing and electrically connected between the first and second electrical terminals in parallel with each of the first and second crowbar units.

The crowbar module may include a trigger circuit disposed in the module housing and electrically connected to the first and second crowbar units. In some embodiments, the crowbar module includes an electrical connection to an external current sensor.

According to some embodiments, the first thyristor includes a first contact surface that is one of an anode and a cathode, and a second contact surface that is the other of an anode and a cathode, and the first crowbar unit includes an electrically conductive first electrode contacting the first contact surface, and an electrically conductive second electrode contacting the second contact surface. In some embodiments, the first electrode is a unitary metal unit housing member including an end wall and a side wall, the end wall and the side wall define a unit housing cavity, the thyristor is disposed in the unit housing cavity. The crowbar module may include a biasing device biasing at least one of the first and second electrode members against the first or second contact surface.

According to some embodiments, the first crowbar unit includes: a unit housing defining an enclosed chamber, the first thyristor being disposed in the enclosed chamber; a wire port defined in a wall of the unit housing between the enclosed chamber and an exterior of the unit housing; a cable gland mounted in the wire port; and an electrical lead extending through the cable gland from the exterior of the unit housing and electrically connected to the first thyristor.

The electrical lead wire may be terminated at a control terminal of the first thyristor. The crowbar module may include a second electrical lead wire extending through the cable gland from the exterior of the unit housing and electrically connected to a reference terminal of the first thyristor.

In some embodiments, the cable gland is bonded to the electrical lead wire. In some embodiments, the cable gland includes a resin that is bonded to the electrical lead wire. In some embodiments, the resin is an epoxy resin.

According to some embodiments, the cable gland includes: a tubular outer fitting secured in the wire port; and a sealing plug mounted in the outer fitting and surrounding the electrical lead wire; wherein the sealing plug fills the radial space between the electrical lead wire and the outer fitting. In some embodiments, the sealing plug is bonded to the electrical lead wire. In some embodiments, the outer fitting is formed of a polymeric material bonded to the unit housing.

According to some embodiments, the cable gland mechanically secures the electrical lead wire to the unit housing and hermetically seals the wire port.

According to embodiments of the invention, a crowbar unit includes a unit housing defining an enclosed chamber, a thyristor disposed in the enclosed chamber, a wire port defined in a wall of the unit housing between the enclosed chamber and an exterior of the unit housing, a cable gland mounted in the wire port, and an electrical lead extending through the cable gland from the exterior of the unit housing and electrically connected to the thyristor.

In some embodiments, the thyristor includes a first contact surface that is one of an anode and a cathode, and a second contact surface that is the other of an anode and a cathode, and the crowbar unit includes an electrically conductive first electrode contacting the first contact surface, and an electrically conductive second electrode contacting the second contact surface.

According to some embodiments, the first electrode is a unitary metal housing member including an end wall and a side wall, the housing member forms a part of the unit housing and defines a housing cavity, and the thyristor is disposed in the housing cavity.

The crowbar unit may include a biasing device biasing at least one of the first and second electrode members against the first or second contact surface.

In some embodiments, the electrical lead wire is terminated at a control terminal of the thyristor. The crowbar unit may include a second electrical lead wire extending through the cable gland from the exterior of the unit housing and electrically connected to a reference terminal of the thyristor.

According to some embodiments, the cable gland is bonded to the electrical lead wire. In some embodiments, the cable gland includes a resin that is bonded to the electrical lead wire. In some embodiments, the resin is an epoxy resin.

According to some embodiments, the cable gland includes a tubular outer fitting secured in the wire port, and a sealing plug mounted in the outer fitting and surrounding the electrical lead wire, wherein the sealing plug fills the radial space between the electrical lead wire and the outer fitting. In some embodiments, the sealing plug is bonded to the electrical lead wire. In some embodiments, the outer fitting is formed of a polymeric material bonded to the unit housing.

According to some embodiments, the cable gland mechanically secures the electrical lead wire to the unit housing and hermetically seals the wire port.

In some embodiments, the thyristor is a bi-directional thyristor.

According to method embodiments of the invention, a method for forming a crowbar unit includes: providing a unit housing defining an enclosed chamber and including a wire port defined in a wall of the unit housing between the enclosed chamber and an exterior of the unit housing; mounting a thyristor in the enclosed chamber; routing an electrical lead wire through the wire port; sealing the electrical lead wire in the wire port with a cable gland; and electrically connecting the electrical lead wire to the thyristor.

In some embodiments, sealing the electrical lead wire in the wire port with a cable gland includes: forming a cable gland, including inserting an electrical lead wire in a tubular outer fitting, introducing a liquid sealing material into the outer fitting about the electrical lead wire, and curing or hardening the liquid sealing material about the electrical lead wire to seal the electrical lead wire in the outer fitting; and mounting the electrical lead wire and the cable gland in the wire port. In some embodiments, the liquid sealing material is a resin.

According to embodiments of the invention, a crowbar device includes a device housing and a crowbar module and a current sensor disposed in the device housing. The crowbar module includes: a module housing; a thyristor disposed in the module housing; a self-trigger circuit disposed in the module housing; and a snubber circuit disposed in the module housing.

According to embodiments of the invention, a crowbar system includes a crowbar module and an external trigger and alarm interface circuit. The crowbar module includes: a module housing; a thyristor disposed in the module housing; a coil disposed in the module housing; a trigger circuit disposed in the module housing; and a snubber circuit disposed in the module housing. The external trigger and alarm interface circuit is electrically connected to the crowbar module.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION OF EMBODIMENTS OF THE INVENTION

Figure 1:
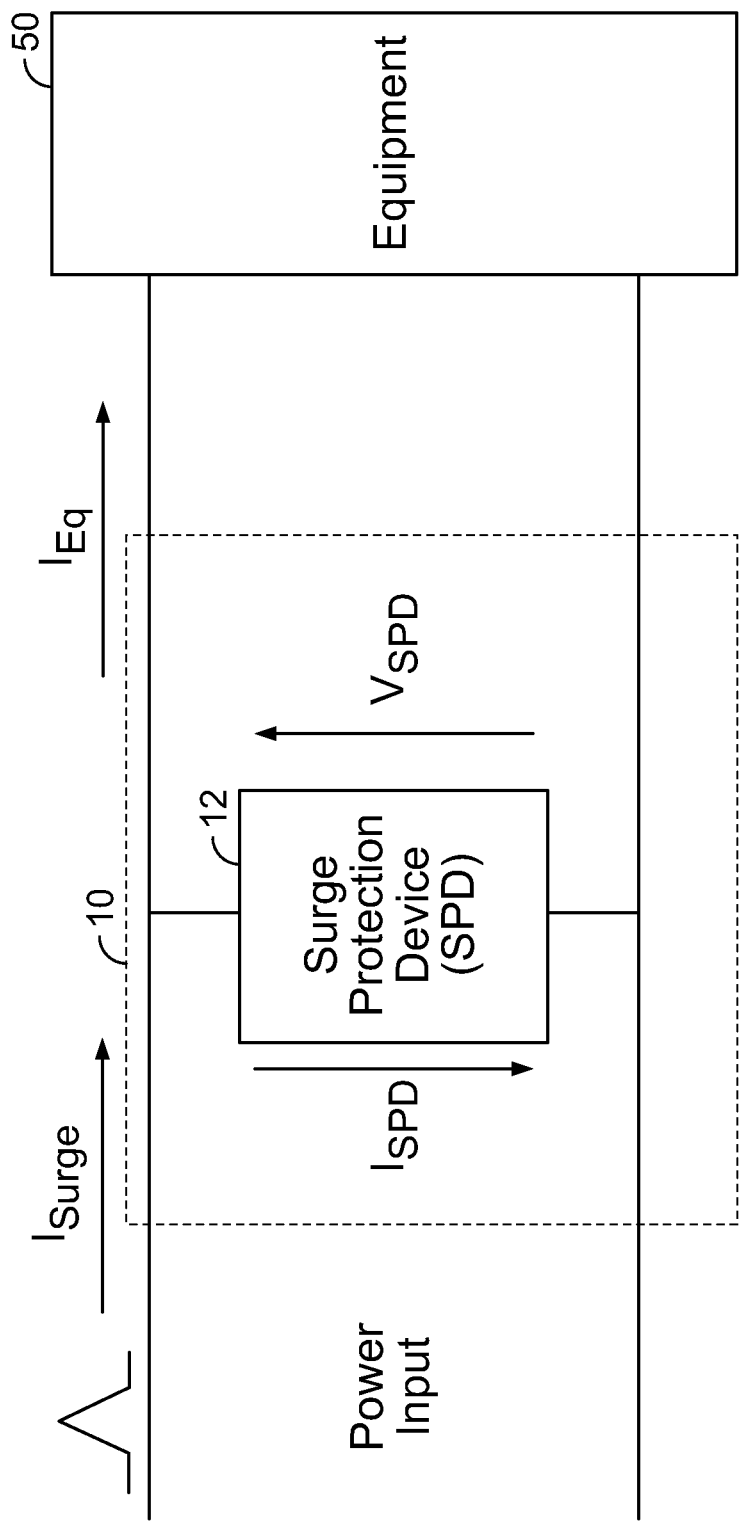
FIG. 1 is a block diagram of a system including conventional surge protection.
Figure 2:
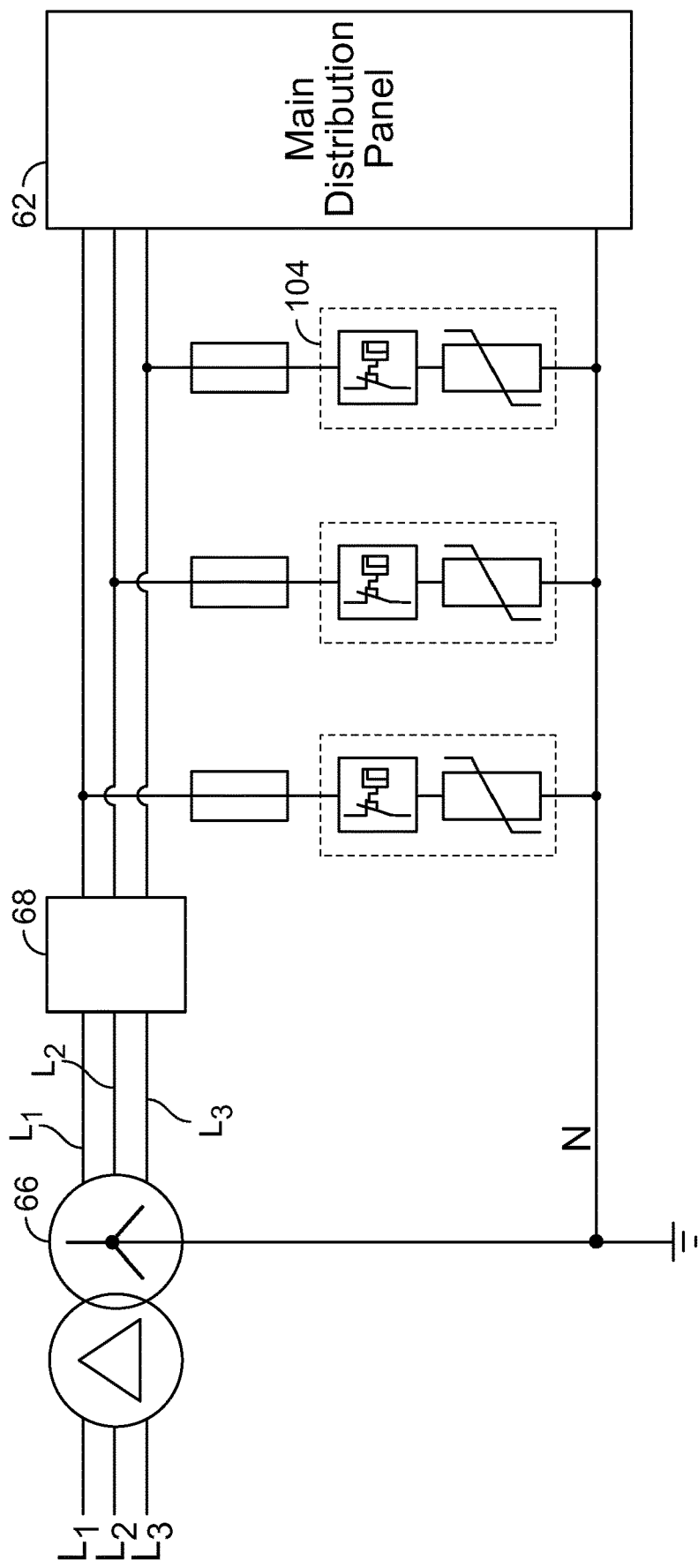
FIG. 2 is a block diagram of a system including conventional surge protection.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments described herein, an arc flash and surge protection system may protect electrical distribution and control equipment from arc flashes that may be generated inside an enclosure, such as an electrical switchgear cabinet. In the event of an arc in the absence of protections provided herein, a short circuit corresponding to the arc may cause the circuit breaker to trip and open the circuit within about 100 milliseconds. In the case of lower short circuit current due to, for example, circuit impedance, an arc flash detection system may trigger the circuit breaker to trip. However, during this period, the short circuit current, which may be between about 10 kA to about 100 kA, will damage internal equipment within the switchgear cabinet, and may present a serious safety hazard for personnel proximate the switchgear cabinet.

As disclosed herein, the above effects may be eliminated by using a crowbar device that has a very fast response time (e.g., less than about 5 milliseconds) and that may conduct the fault current to eliminate the arc until the circuit breaker trips and disconnects the switchgear cabinet from the power source.

The crowbar device may include two thyristors (one for each direction of AC current) that when triggered may create a short that will conduct the current and eliminate the arc flash. However, as provided herein, thyristors may be protected against damage from false triggers and/or overvoltages. False triggers may be protected against using circuit components described herein and overvoltage protection may be provided using surge protection devices that may be connected in parallel with the overvoltage protection device. The use of the surge protective device may protect the thyristors of the crowbar device from false trigger and other equipment in the installation.

In some embodiments, the crowbar device may protect the surge protection device in the event that the surge protection device has failed. For example, typical failure mode of such devices may be a short circuit that is interrupted by either an internal thermal disconnector and/or an external fuse/circuit breaker. In this manner, the crowbar device may further protect the surge protection device in case of its failure and therefore obviate a need for a thermal disconnector and/or a series fuse/circuit breaker.

Some embodiments provide that the crowbar device may be implemented in several different ways. A first example provides for a single operation in that the crowbar device is used only once and a replacement crowbar device is provided to replace the used crowbar device. A second example includes a crowbar device that can be used multiple times. In this example, the crowbar device may withstand the short circuit current until the circuit breaker trips. As such, the crowbar device may be restored after the fault event and allow a possible reclosure of the main circuit breaker that will permit the installation to resume normal operation (provided that the problem that caused the tripping of the crowbar system has been solved).

To trigger the crowbar device, a separate electronic circuit may be used. This circuit may receive the trigger signal from the arc flash detector circuit as an input and may trigger the crowbar device and/or the main circuit breaker. In some embodiments, this circuit may also receive voltage and current readings of the power lines and current readings of the surge protection devices as inputs. In this manner, the electronic system may indicate the presence of a short circuit anywhere downstream of the crowbar device, if there is an prolonged overvoltage condition and if the surge protective devices failed. In any of the above conditions (or any other condition that is required and can be detected by using these sensors or additional sensors) the electronic system may trigger the crowbar device and the main circuit breaker.

In addition, the electronic circuit may also provide an alarm signal to indicate the presence of and/or type of problem that caused the tripping of the crowbar device. Some embodiments provide that the crowbar device may be triggered responsive to one or more of the following conditions and/or events:

Arc Flash inside the cabinet;
Failure of the surge protective device;
Prolonged overvoltage or overcurrent conditions;
Short circuit downstream the crowbar device;
Any other pattern of electrical disturbance in the system that can be detected using the existing sensors or by installing additional sensors for that reason; and
Remote manual trigger.

Figure 3:
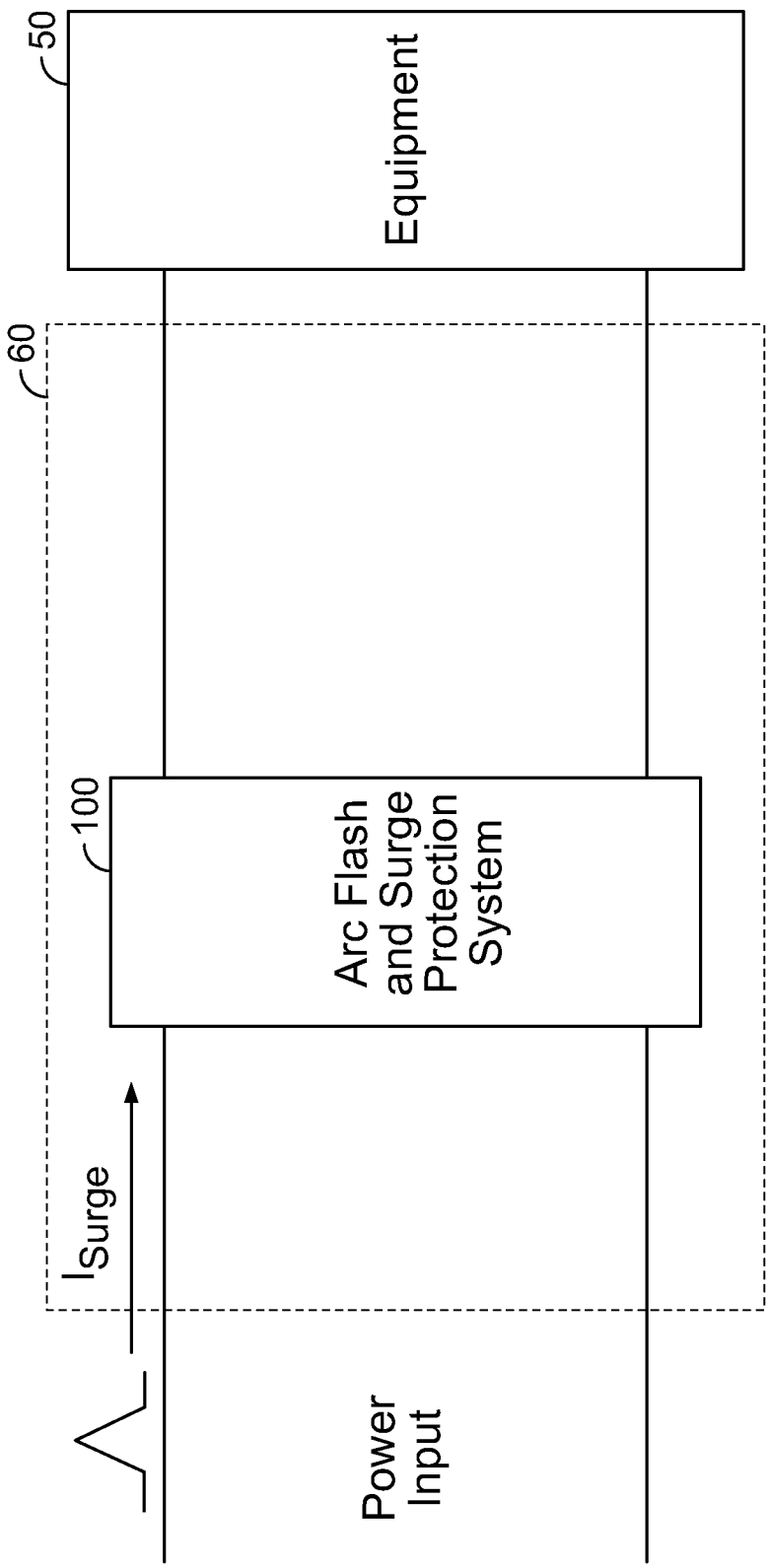
FIG. 3 is a block diagram illustrating an arc flash and surge protection system according to some embodiments of the present invention.

Reference is now made to FIG. 3, which is a block diagram illustrating an arc flash, overvoltage, overcurrent and surge protection system according to some embodiments of the present invention. Some embodiments of the present invention may be applicable to the protection of equipment corresponding to switchgear systems used in industrial installations including secondary distribution panels and/or a service entrance section of electrical generation facilities, including, for example, wind turbine generators. However, such embodiments are non-limiting. For example, arc flash and surge protection systems described herein may be applicable to many different types of systems that may be susceptible to overvoltage conditions, surge currents and/or arc flash faults. For example, medium and/or low voltage switchgear for controlling and distributing single or multiphase electrical power may use arc flash and surge protections systems as described herein. In some embodiments, a switchgear cabinet 60 may include an arc flash, overvoltage, over current and surge protection system 100 configured therein to protect the equipment 50, the switchgear cabinet 60 and other components included thereon and/or personnel proximate the switchgear cabinet 60.

Figure 4:
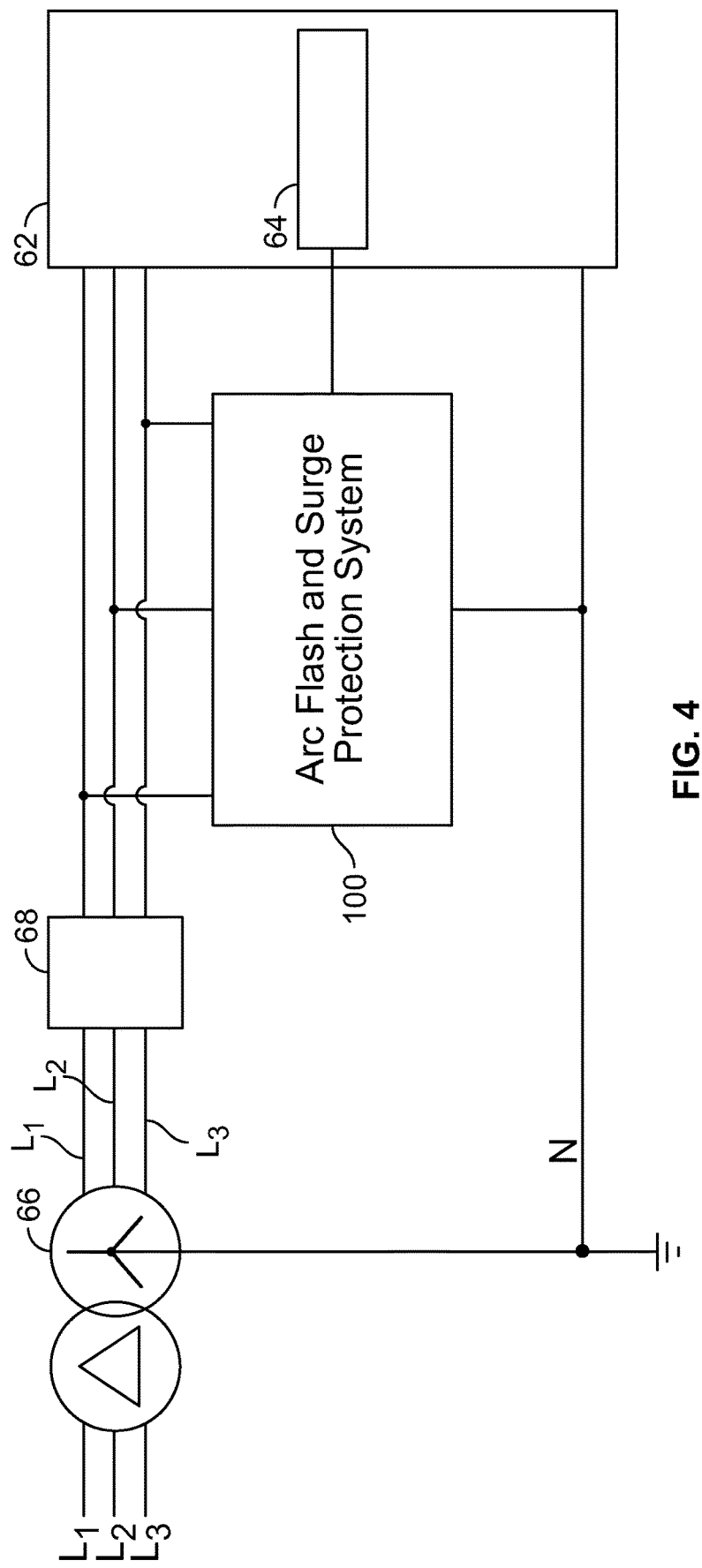
FIG. 4 is a block diagram illustrating an arc flash and surge protection system according to some embodiments of the present invention.

Brief reference is now made to FIG. 4, which is a block diagram illustrating an arc flash, overvoltage, over current and surge protection system according to some embodiments of the present invention. As illustrated, a three phase line may be connected to and supply electrical energy to one or more transformers 66, which may in turn supply three phase electrical power to a main circuit breaker 68. The three phase electrical power may be provided to one or more distribution panels 62. As illustrated, the three voltage lines of the three phase electrical power may designated as L1, L2 and L3 and a neutral line may be designated as N. In some embodiments, the neutral line N may be conductively coupled to an earth ground.

Some embodiments include an arc flash, overvoltage, overcurrent and surge protection system 100 connected between the phase lines L1, L2 and L3, and neutral (N). The arc flash, overvoltage, overcurrent and surge protection system 100 may protect other equipment in the installation such as the distribution panel 62 among others. In some embodiments, the arc flash, overvoltage, over current and surge protection system 100 may be coupled to and/or receive one or more signals from an arc flash detection system 64 that may be in a distribution panel 62 and/or other equipment in the installation.

As discussed above, an arc flash, overvoltage, overcurrent and surge protection system 100 may implemented in a system corresponding to power distribution switchgear 60 that is configured to distribute multiphase electrical power. For example, reference is now made to FIG. 5, which is a schematic diagram representing a circuit including an arc flash and surge protection system in a three phase switchgear cabinet according to some embodiments of the present invention. As illustrated, a three phase line may be connected to and supply electrical energy to one or more transformers 66, which may in turn supply three phase electrical power to a main circuit breaker 68 in the switchgear cabinet 60. Within the switchgear cabinet 60, the three phase electrical power may be provided to one or more distribution panels 62 that may or may not be within the switchgear cabinet 60. As illustrated, the three voltage lines of the three phase electrical power may designated as L1, L2 and L3 and a neutral line may be designated as N. In some embodiments, the neutral line N may be conductively coupled to an earth ground.

In some embodiments, the arc flash, overvoltage, overcurrent and surge protection system 100 may include a crowbar device 102 that is operable to prevent an overvoltage condition by generating a low resistance path from the three voltage lines L1, L2, L3 to the neutral line N. Although some embodiments are discussed herein with reference to an overvoltage condition, such embodiments may also refer to an overcurrent condition that may or may not be a result of an overvoltage condition. Some embodiments provide that the crowbar device may be triggered by a trigger circuit 106.

As illustrated, the crowbar device 102 may include an overvoltage protection module 120 corresponding to each of the three phases L1, L2 and L3. Each overvoltage protection module 120 may include two thyristors (e.g., TH5 and TH6) that are electrically coupled in parallel with one another, but with opposite polarities. Stated differently, an anode of a first thyristor (e.g., TH5) of the pair of thyristors may be coupled to a cathode of the second thyristor (e.g., TH6) of the pair of thyristors and a cathode of the first thyristor (TH5) of the pair of thyristors may be coupled to the anode of the second thyristor (TH6) of the pair of thyristors. In this manner, when the thyristors are triggered to be in a conductive state, each half of an alternating current waveform may be conducted from the phase to the neutral.

In some embodiments, an overvoltage protection module 120 may include a circuit of a resistor R and a capacitor C arranged in series with one another, such that the resistor-capacitor series RC is connected in parallel with the two thyristors (e.g., TH5 and TH6). Although described and illustrated as a single resistor R and capacitor C, embodiments may include more than one resistor and/or more than one capacitor to achieve the desired resistive and/or capacitive performance, but also to use extra R and C for redundancy, as the operation of this circuit may be important to prevent a false triggering of the thyristors. The snubber circuit may slow down a rate of change in voltage (dV/dt) that may otherwise result in falsely triggering the thyristor. For example, in the absence of the RC snubber circuit, the thyristor may be triggered by electrical noise that is unrelated to an actual overvoltage condition. The capacitor C may reduce the rate of change in voltage (dV/dt) together with the resistor R. The inductance L and the resistance R may limit the inrush of current of the high capacitance value of the capacitor C when the circuit is energized.

Some embodiments provide that an inductor L in arranged in series with the pair of antiparallel-connected thyristors. The inductor L may limit a rate of change in current (di/dt) through the thyristors, which might otherwise damage the thyristors. Also, L, combined with the RC snubber circuit, reduces the rate of change in voltage (dV/dt) at the thyristors in case of an overvoltage generated in the power system. In this manner, a self-trigger of thyristors may be prevented.

Some embodiments provide that in a three-phase power system, a crowbar device 102 includes three overvoltage protection modules 120 that may be coupled from respective phase conductors L1, L2 and L3 to a neutral N. In some embodiments, each of the overvoltage protection modules 120 is a modular component include all of the functional components therein in a single assembly. Some embodiments provide that multiple (e.g., three in a three-phase power system) overvoltage protection modules 120 may be configured as a single assembly including the components and functionality for overvoltage protection for all phases in a single assembly.

Some embodiments include surge protection devices (SPDs) 104. As illustrated, each of the SPDs 104 may be connected between respective ones of L1, L2 and L3, and neutral (N). The use of the SPD may protect the thyristors of the crowbar device during lightning events and/or transient overvoltage conditions, as well as protect other equipment in the installation. In addition, the SPDs may be used to protect all equipment in case of prolong overvoltages. However, such a condition may force the SPD to conduct a limited current for a prolonged period of time, which may result in the overheating of the SPD and possibly its failure (depending on the energy withstand capabilities the SPD can absorb and the level and duration of the overvoltage condition). Such event may be addressed by tripping the crowbar device. A typical operating voltage of an SPD 104 in the present example may be about 400V (for 690V L-L systems). In this regard, the SPDs 104 will each perform as an insulator and thus not conduct current during normal operating conditions. In some embodiments, the operating voltage of the SPD's 104 is sufficiently higher than the normal line-to-neutral voltage to ensure that the SPD 104 will continue to perform as an insulator even in cases in which the system voltage increases due to overvoltage conditions that might arise as a result of a loss of power or other power system issues.

In the event of a surge current in, for example, L1, protection of power system load devices may necessitate providing a current path to ground for the excess current of the surge current. The surge current may generate a transient overvoltage between L1 and N. Since the transient overvoltage significantly exceeds the operating voltage of SPD 104, the SPD 104 will become conductive, allowing the excess current to flow from L1 through SPD 104 to the neutral N.

Once the surge current has been conducted to N, the overvoltage condition ends and the SPD 104 becomes non-conducting again. However, in some cases, one or more SPD's 104 may begin to allow a leakage current to be conducted even at voltages that are lower than the operating voltage of the SPD's 104. Under such conditions, the leakage current may be measured using, for example, current transformers 105 that may provide leakage current values to the trigger circuit 106.

An arc flash detection system 64 may be configured to detect an arc flash within the switchgear cabinet 60 using one or more sensors and/or sensor types including photosensors, pressure sensors and/or current transformers, among others. The arc flash detection system may provide an arc flash detection signal (AFD) to the trigger circuit 106.

The trigger circuit 106 may receive inputs corresponding the line voltages L1, L2, L3, the line currents I1, I2, I3, the SPD leakage currents Is1, Is2, Is3, and the arc flash detection signal AFD. As described in more detail below, the trigger circuit 106 may, in response to a fault circumstance, cause the crowbar device 102 to turn on, thus providing a low resistance current path from the lines L1, L2, L3 to the neutral N, cause the main circuit breaker 68 to trip, and/or cause the SPD's to begin conducting. In some embodiments, the trigger circuit 106 may further generate and/or transmit an alarm signal to one or more other types of monitoring, logging or alarm equipment.

Some embodiments provide that the trigger circuit 106 is powered through a trigger circuit power supply 65, such as a single phase alternating current power source and/or a direct current power source. Some embodiments provide that the trigger circuit power supply 65 may be coupled to the trigger circuit 106 via one or more circuit interrupters or circuit breakers 67 and may be thus protected by the SPDs 104.

Figure 5:
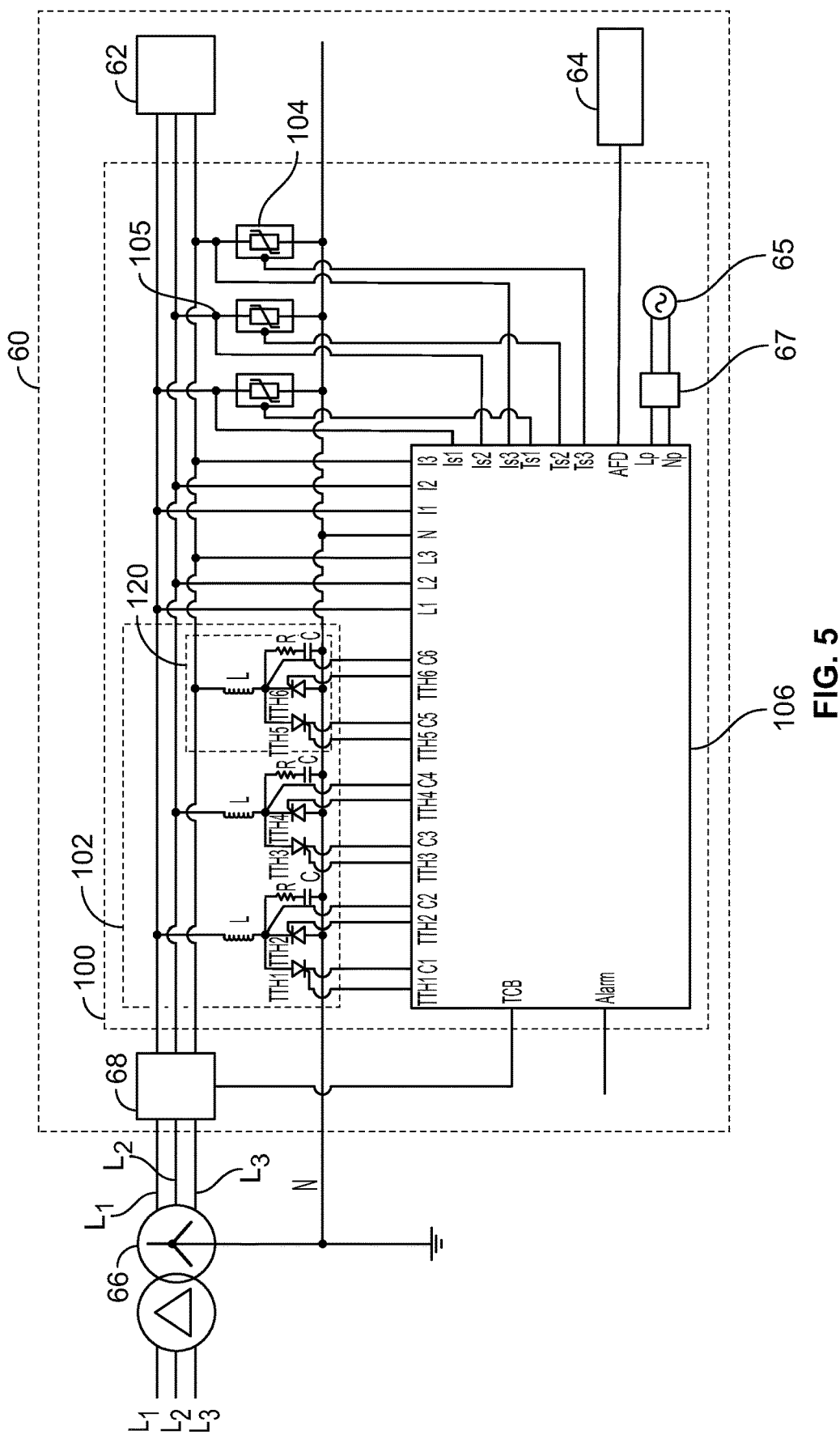
FIG. 5 is a schematic diagram representing a circuit including an arc flash and surge protection system in a switchgear cabinet according to some embodiments of the present invention.
Figure 6:
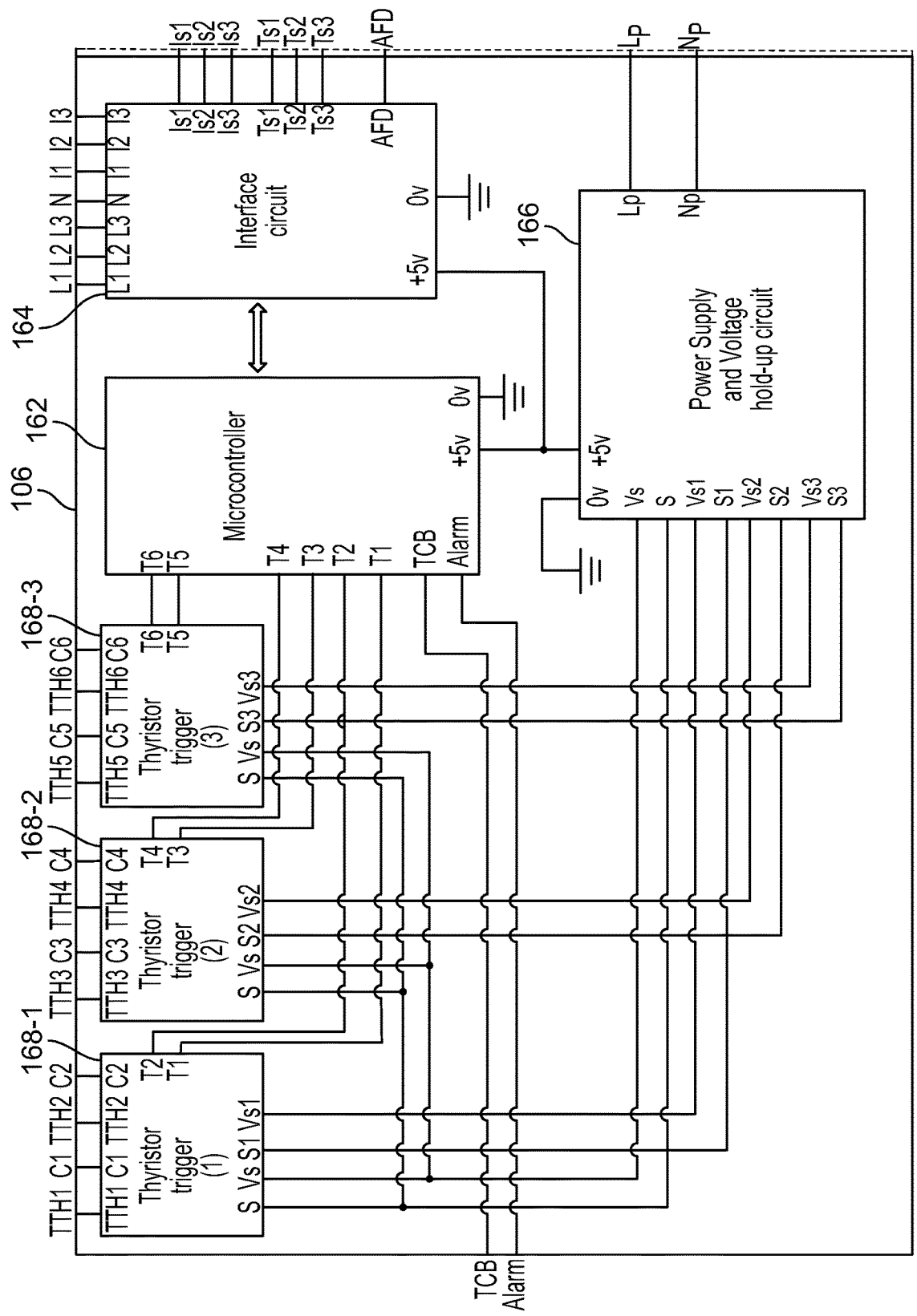
FIG. 6 is a schematic block diagram illustrating a trigger circuit as briefly described above regarding FIG. 4, according to some embodiments of the present invention.

Reference is now made to FIG. 6, which is a schematic block diagram illustrating a trigger circuit as briefly described above regarding FIG. 5, according to some embodiments of the present invention. In some embodiments, a trigger circuit 106 may include a power supply and voltage hold-up circuit 166, which may receive single phase alternating current electrical power and/or direct current electrical power to power the trigger circuit. The power supply and voltage hold-up circuit 166 may include a voltage hold-up circuit that may provide power to the trigger circuit for at least 100 milliseconds after a condition which eliminates the availability of the electrical power received from the a trigger circuit power supply 65.

In this manner, even with a loss of trigger circuit power due to a fault in another portion of the circuit, the power supply and voltage hold-up circuit 166 maintains sufficient voltage for the trigger circuit 106 to function until the circuit breaker is capable of tripping. For example, during this period, trigger signals to all of the thyristors may be maintained continually to keep the thyristors in a conducting state. Thus, the thyristors may be maintained in a conducting state until the main circuit breaker 68 has tripped. In the alternative, if a trigger signal to the thyristors is lost, the thyristors will only allow very limited current flow therethrough, which may result in the arc flash restarting.

Figure 7:
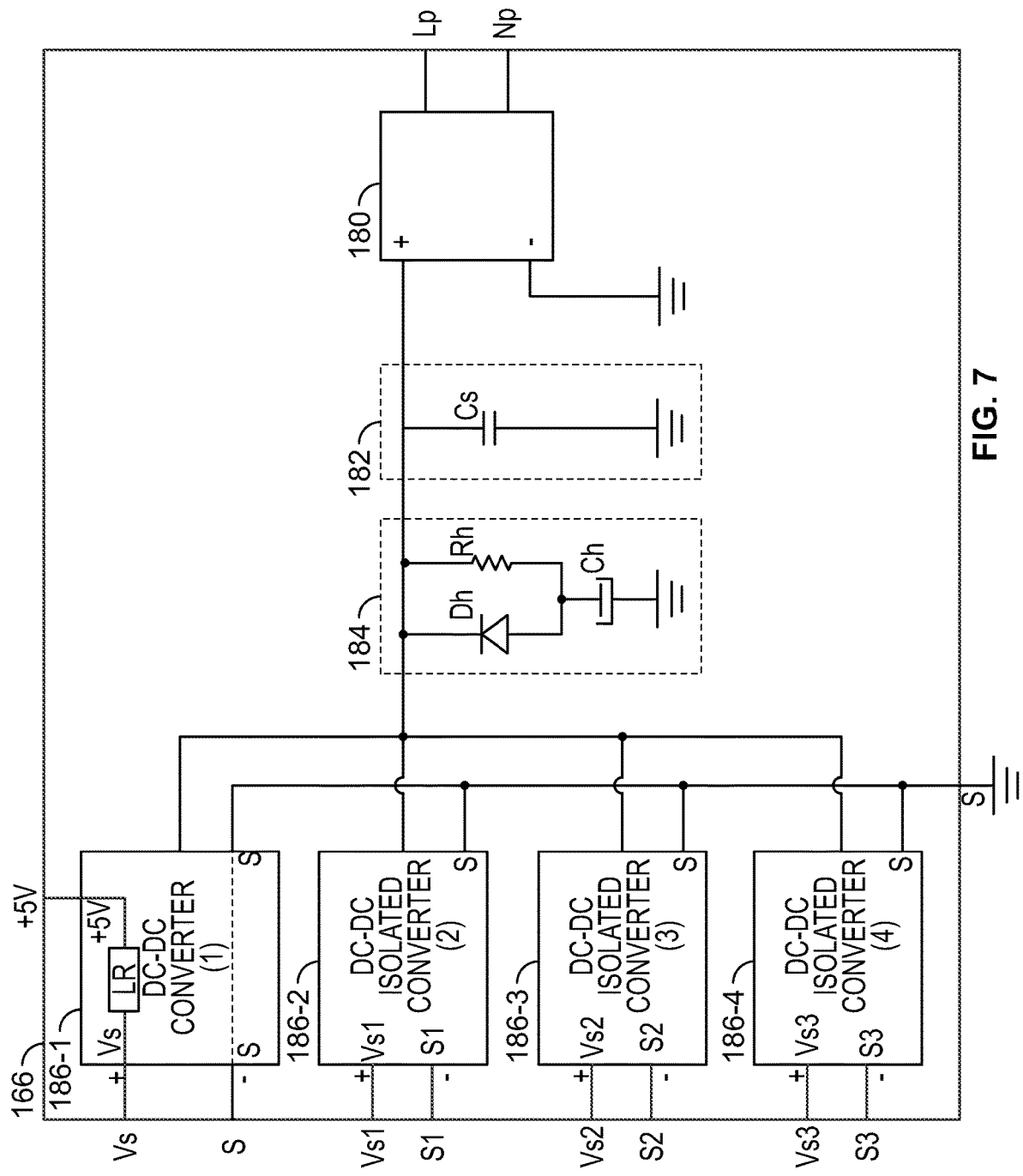
FIG. 7 is a schematic block diagram illustrating a power supply and voltage hold-up circuit as discussed in reference to FIG. 6.

Brief reference is now made to FIG. 7, which is a schematic block diagram illustrating a power supply and voltage hold-up circuit 166 as discussed in reference to FIG. 6 above. In some embodiments, the power supply and voltage hold-up circuit 166 is configured to receive electrical power as a single phase alternating current (AC) power source including a voltage line $L_p$ and a neutral line $N_p$. In such embodiments, the received electrical power may be converted from AC to direct current (DC) using an AC-DC rectification unit 180. The resulting DC power may be smoothed using a smoothing capacitor 182.

The DC power may be provided to a voltage hold-up circuit 184 that may include a holding resistor Rh that is connected in parallel with a holding diode Dh. The parallel combination of the holding resistor Rh and the holding diode Dh may be connected in series with a holding capacitor Ch. Some embodiments provide that the Rh, Dh, Ch circuit is connected between the DC power line and the ground or neutral. In some embodiments, the anode of the holding diode Dh is connected to the DC power line and the cathode of the holding diode Dh is connected to the holding capacitor Ch, the other terminal of which is connected to the ground or neutral.

The power supply and voltage hold-up circuit 166 may include multiple different DC-DC isolated converters 186. For example, in the context of a three phase system, a DC-DC isolated converter 186-1 may be provided to supply voltage (Vs, S) to a common driver in each of the three different thyristor trigger circuits 168-1, 2, 3. Additionally, three DC-DC isolated converters 186-2, 3, 4 may be provided to supply voltage (Vs1, S1; Vs2, S2; Vs3, S3) to respective ones of the thyristor trigger circuits 168-1, 2, 3, respectively.

Figure 8:
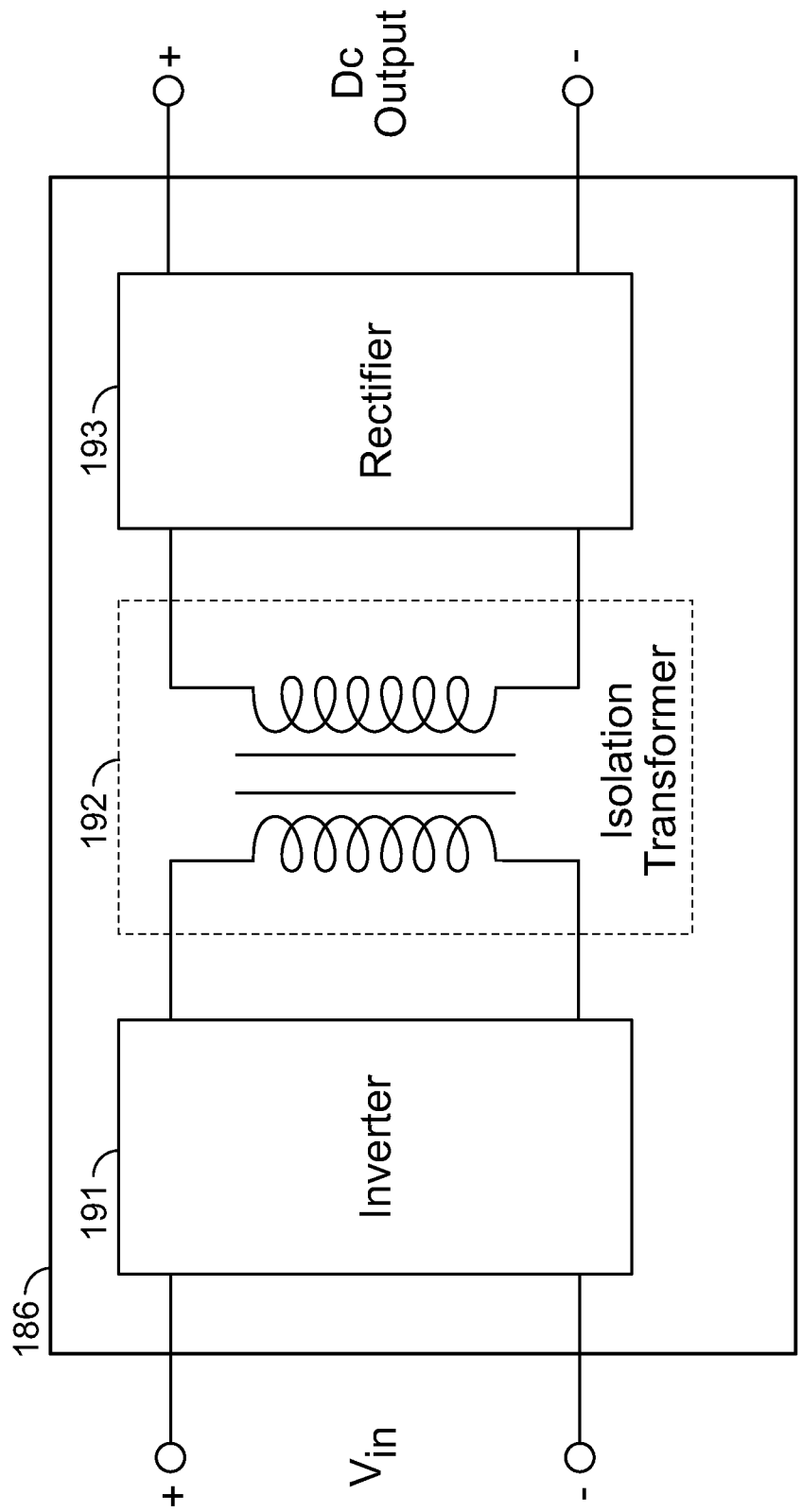
FIG. 8 is a block diagram illustrating a DC-DC isolated converter as discussed in reference to FIG. 7.

Brief reference is now made to FIG. 8, which is a block diagram illustrating a DC-DC isolated converter as discussed in reference to FIG. 7 above. A DC-DC isolated converter 186 may receive an input DC voltage Vin to an inverter 191, which is configured to convert the DC input voltage to an AC voltage. The AC voltage may be provided to an isolation transformer 192, which may produce a corresponding AC output that is conductively isolated from the input AC voltage that is received from the inverter 191. In some embodiments, the isolation transformer 192 may include a coil winding ratio that is 1:1 such that the AC output voltage is at a same voltage level as the AC input voltage received by the isolation transformer. Some embodiments provide that the isolation transformer 192 coil winding ratio is not 1.0 and thus the AC output voltage may have a different voltage level from the AC input voltage received by the isolation transformer 192. The AC output voltage from the isolation transformer 192 may be received by a rectifier 193, which is configured to convert the AC voltage to a DC output voltage.

Referring back to FIG. 6, in some embodiments, the trigger circuit 106 may include an interface circuit 164 that is configured to receive inputs from various sensors and provide the data corresponding to the received inputs to a microcontroller 162. For example, the interface circuit 164 may receive inputs corresponding to: the voltages of the phase power lines L1, L2, L3 and the neutral N; an arc flash alarm signal AFD from the arc flash detection system 64; current flow on the phase power lines I1, I2, I3; current flow through the SPD's Is1, Is2, Is3; and/or temperature of the SPDs Ts1, Ts2, Ts3, among others.

Some embodiments provide that the microcontroller 162 may process the received inputs and generate trigger signals to one or more thyristor triggers 168-1, 2, 3 to trigger the thyristors to a conduction mode. In some embodiments, the microcontroller may further generate a trip signal TCB to the main circuit breaker 68. Some embodiments provide that the microcontroller generates an alarm signal that may be provided to local and/or remote locations that may be monitored and/or that may include supervisory control and data acquisition (SCADA). In some embodiments, the alarm signal is provided to a remote visual and/or audible annunciator.

The microcontroller 162 may trigger the thyristors based on a variety of causes and/or events. For example, an arc flash may trigger an arc flash signal to be sent to the microcontroller 162 from the arc flash detection system 64. A system overvoltage condition corresponding one or more lines having a voltage that exceeds a predetermined threshold for a predetermined period of time may cause the microcontroller to trigger the thyristors. An overcurrent condition on one or more lines in which the current exceeds a predetermined current threshold for a predetermined period of time may cause the microcontroller to trigger the thyristors.

In some embodiments, overheating of the surge protection devices 104 in which a temperature of the SPDs exceeds a predetermined temperature threshold for a predetermined period of time may cause the microcontroller to trigger the thyristors. Additionally a short circuit may be detected when a voltage drop of any phase line and a corresponding current increase of that phase line may cause the microcontroller to trigger the thyristors.

Some embodiments provide that a detected end of life of an SPD may cause the microcontroller to trigger the thyristors. In some embodiments, such an SPD may include a metal oxide varistor (MOV) and/or combined MOV/GDT (gas discharge tube). Such a condition may be determined by a voltage drop in a phase line and a current rise in the corresponding SPD.

In some embodiments, the microcontroller may be configured to trigger the overvoltage protection device only when specific combinations of conditions and/or events are occurring with or without any constraints on the time interval between the conditions and/or events.

In some embodiments the thyristor triggers 168-1, 2, 3 may receive a trigger signal from the microcontroller 162 and provide control signals to corresponding thyristor pairs to cause the respective thyristors to switch from a substantially non-conducting state to a conducting state. For example, brief reference is now made to FIG. 9, which is a schematic block diagram illustrating a thyristor trigger circuit 168-1 as discussed above in reference to FIG. 6.

Figure 9:
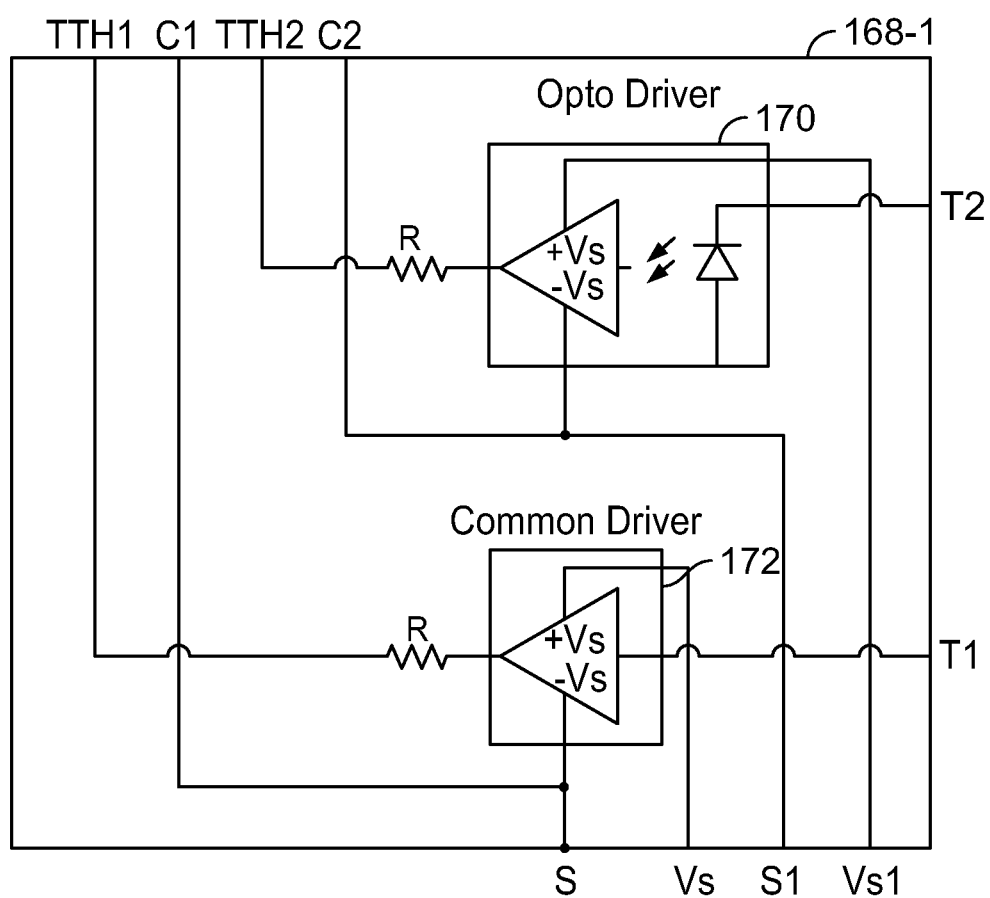
FIG. 9 is a schematic block diagram illustrating a thyristor trigger circuit as discussed in reference to FIG. 6.

Each of the thyristor trigger circuits 168 may be the same and may be operable to trigger a pair of thyristors that correspond to a specific phase line. As such, FIG. 9 is directed to one of the thyristor circuits of FIG. 6, namely 168-1, which corresponds to the thyristors connected to phase line L1. The common driver 172 may be powered by voltage lines Vs and S that are provided from the power supply and voltage hold-up circuit 166 and that are provided to the common driver 172 of each of the other thyristor trigger circuits 168-2, 3. The common driver 172 changes state to provide a thyristor trigger signal TH1 responsive to trigger signal T1 from the microcontroller 162. Thyristor 1 changes to a conducting state responsive to the state change of TH1 and remains in a conducting state as long as TH1 is activated. In the case of thyristor 1, the reference point C1 is the neutral line N.

The opto driver 170 may be powered by voltage lines Vs1 and S1 that are provided from the power supply and voltage hold-up circuit 166. In contrast with the DC voltage circuit Vs and S, the voltage lines Vs1 and S1 are not provided to other ones of the thyristor circuits 168-2, 3. The opto driver 170 changes state to provide a thyristor trigger signal TH2 responsive to trigger signal T2 from the microcontroller 162. Thyristor 2 changes to a conducting state responsive to the state change of TH2 and remains in a conducting state as long as TH2 is activated. In the case of thyristor 2, the reference point C2 is the phase line L1. The phase voltage reference point is a reason for using an opto driver to isolate the output.

Referring back to FIG. 6, the trigger circuit triggers all 6 of the thyristors at the same time and maintains the triggered state for at least 100 milliseconds while at the same time the power is supplied to the trigger circuit via the power supply and voltage hold-up circuit 166. Additionally, while the thyristors are being triggered, the trigger circuit may provide a trigger signal to the main circuit breaker 68 and an alarm indicating the fault. In some embodiments, the alarm may also include data corresponding to a cause of the fault event.

Figure 10:
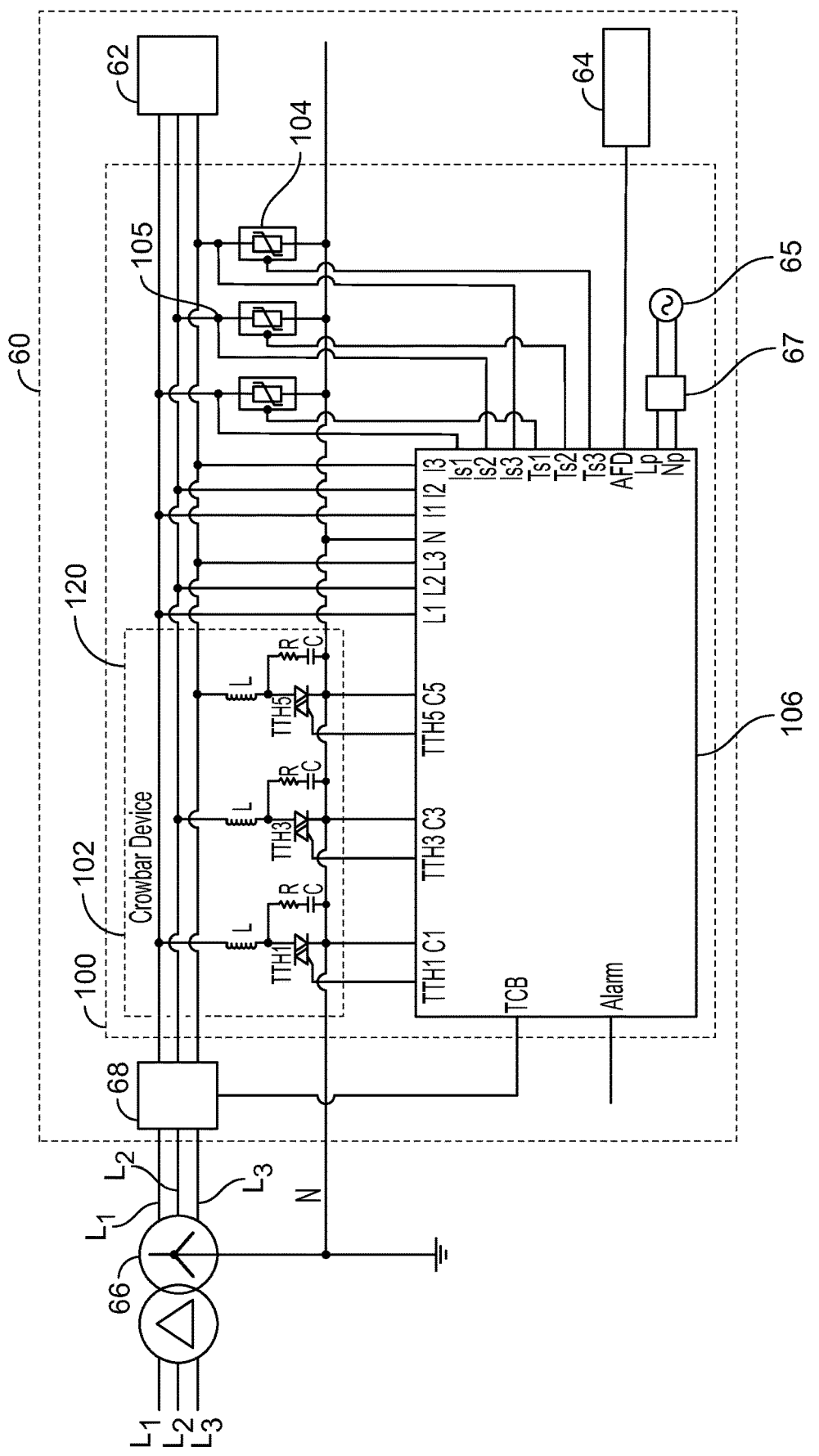
FIG. 10 is a schematic diagram representing a circuit including an arc flash and surge protection system according to some embodiments of the present invention.

Brief reference is now made to FIG. 10, which is a schematic diagram representing a circuit including an arc flash, overvoltage, overcurrent and surge protection system in a three phase switchgear cabinet according to some other embodiments of the present invention. As illustrated, embodiments according to FIG. 10 differ from those described above regarding FIG. 5 in that the crowbar device 102 includes a bidirectional thyristor for each phase to neutral instead of two unidirectional thyristors in a complementary arrangement for each phase. Some embodiments provide that the bidirectional thyristors each rely on four control wires for providing a trigger signal thereto. Other features of FIG. 10 are substantially similar to those discussed above regarding FIG. 5 and thus will not be repeated.

Figure 11:
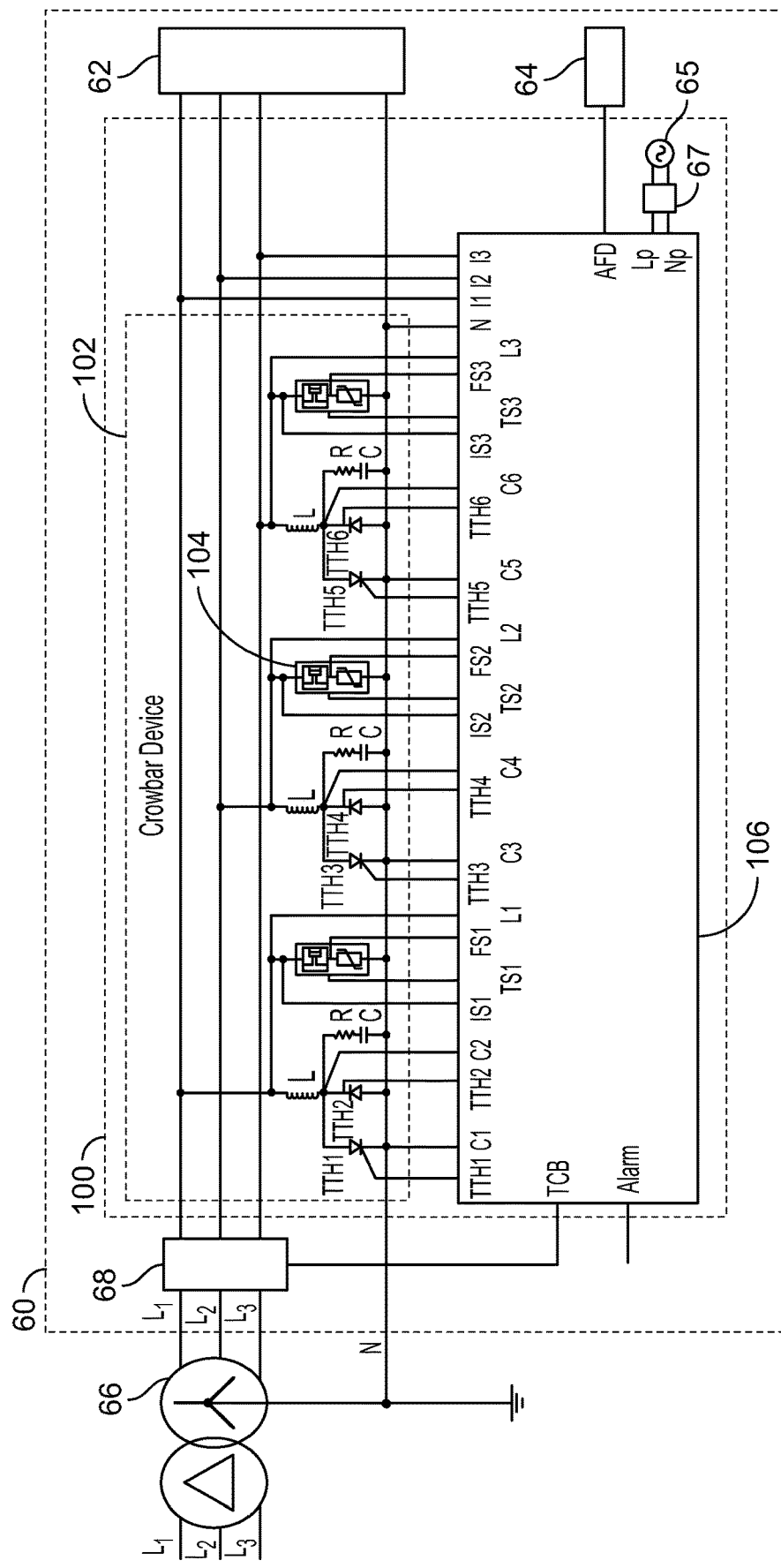
FIG. 11 is a schematic diagram representing a circuit including an arc flash and surge protection system according to some embodiments of the present invention.

Reference is now made to FIG. 11, which is a schematic diagram representing a circuit including an arc flash, overvoltage, overcurrent and surge protection system in a three phase switchgear cabinet according to some other embodiments of the present invention. As illustrated, embodiments according to FIG. 11 differ from those described above regarding FIG. 5 in that the crowbar device 102 includes the thyristors and the SPDs 104. In some embodiments, ones of the SPDs 104 are connected in the crowbar device 102 in parallel with the thyristor, RC and/or RLC circuits that are connected from each phase to the neutral. Some embodiments provide that the SPDs 104 are metal oxide varistors (MOVs) and/or combined MOV/GDT. In some embodiments, the MOVs may be thermally fused to prevent overheating of the MOV in the case of increased leakage currents, which may be a typical occurrence when an overvoltage condition exists in the power system. In this regard, the trigger circuit 106 may monitor the temperature rise and/or the thermal fuse and/or current through the MOV to indicate if the MOV has failed to short. Responsive to such conditions, the thyristors may be quickly triggered to prevent further damage of the whole device. Some embodiments provide that the thermal fuse may be sufficient to interrupt leakage currents when the MOV has not failed to short, to prevent overheating of the device. Other features of FIG. 10 are substantially similar to those discussed above regarding FIG. 5 and thus will not be repeated. To further reduce the overvoltage that could be applied to the thyristors, additional MOVs could be used in parallel to the snubber circuit (RC).

Figure 12:
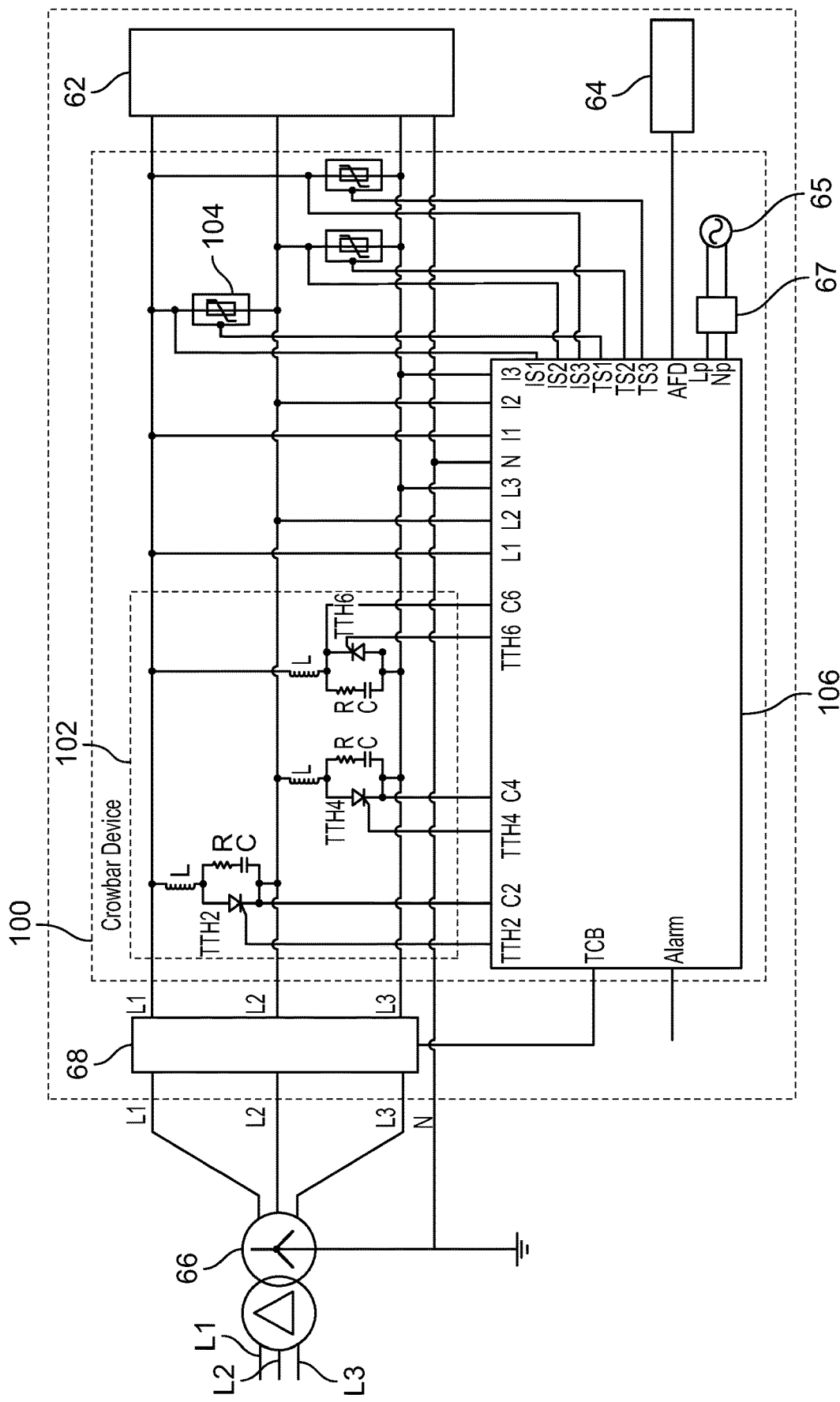
FIG. 12 is a schematic diagram representing a circuit including an arc flash and surge protection system according to some embodiments of the present invention.

Reference is now made to FIG. 12, which is a schematic diagram representing a circuit including an arc flash, overvoltage, overcurrent and surge protection system in a three phase switchgear cabinet according to some other embodiments of the present invention. As illustrated, embodiments according to FIG. 12 differ from those described above regarding FIG. 5 in that the crowbar device 102 is configured to be connected from phase to phase instead of phase to neutral. Specifically, a thyristor and an RLC circuit is connected from each phase to another phase such that the crowbar device 102 may operate without conducting excess current to a neutral line N. Additionally, the SPDs 104 are connected from phase to phase to provide overvoltage protection for one phase relative to the other phases. In some embodiments, the crowbar device 100 include a single thyristor that may be a single directional thyristor. Other features of FIG. 10 are substantially similar to those discussed above regarding FIG. 5 and thus will not be repeated.

As used herein, "monolithic" means an object that is a single, unitary piece formed or composed of a material without joints or seams.

With reference to FIGS. 13-23, a crowbar system 200 and a connector module 290 according to embodiments of the invention are shown therein. The crowbar system 200 corresponds to and is an implementation of the crowbar system 102 of FIG. 5. The connector module 290 corresponds to and is an implementation of a connector that may be connected between the crowbar system 102 and the trigger circuit 106 as illustrated in FIG. 3.

Figure 13:
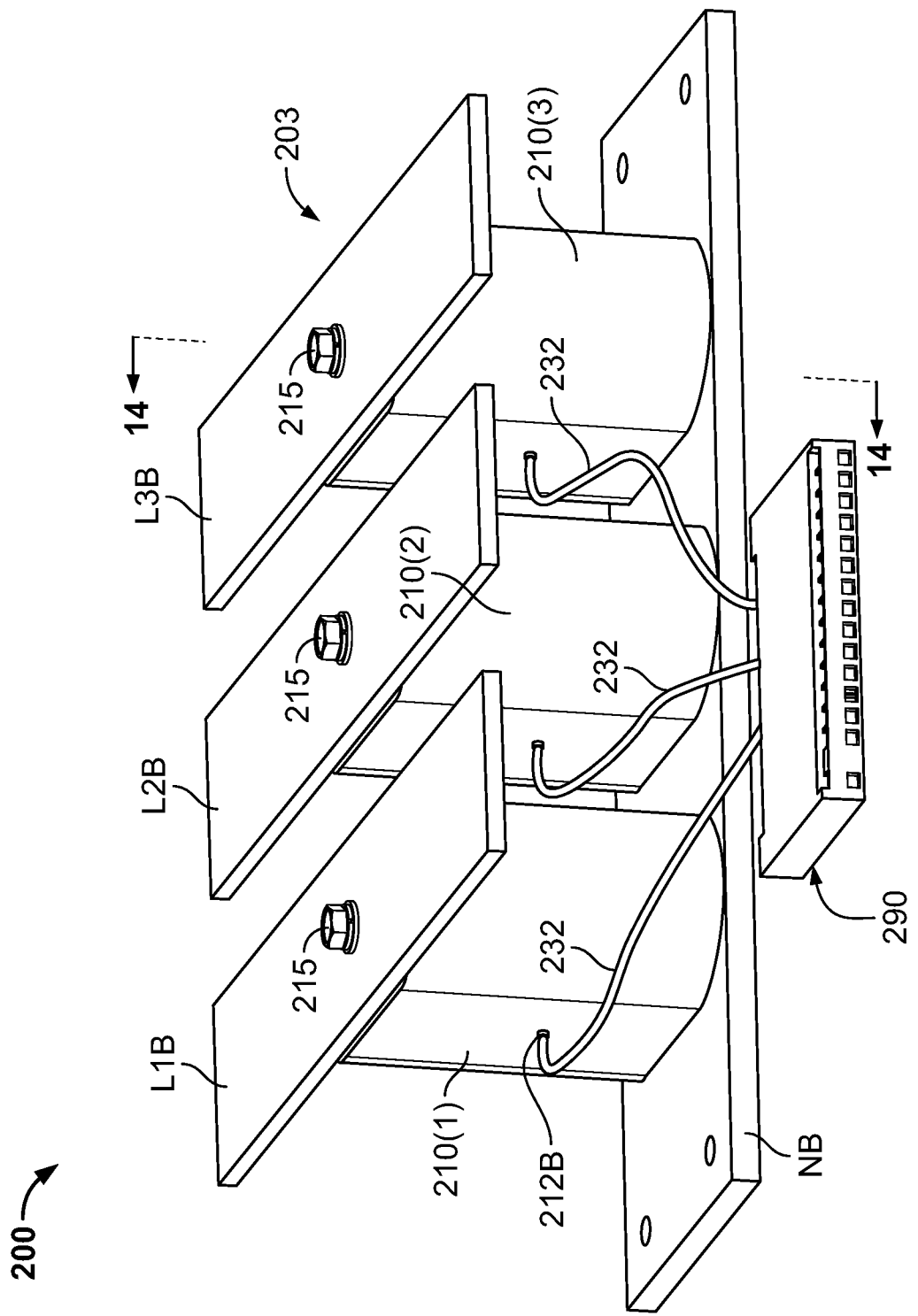
FIG. 13 is a top perspective view of a crowbar system and a trigger module according to some embodiments of the present invention.
Figure 14:
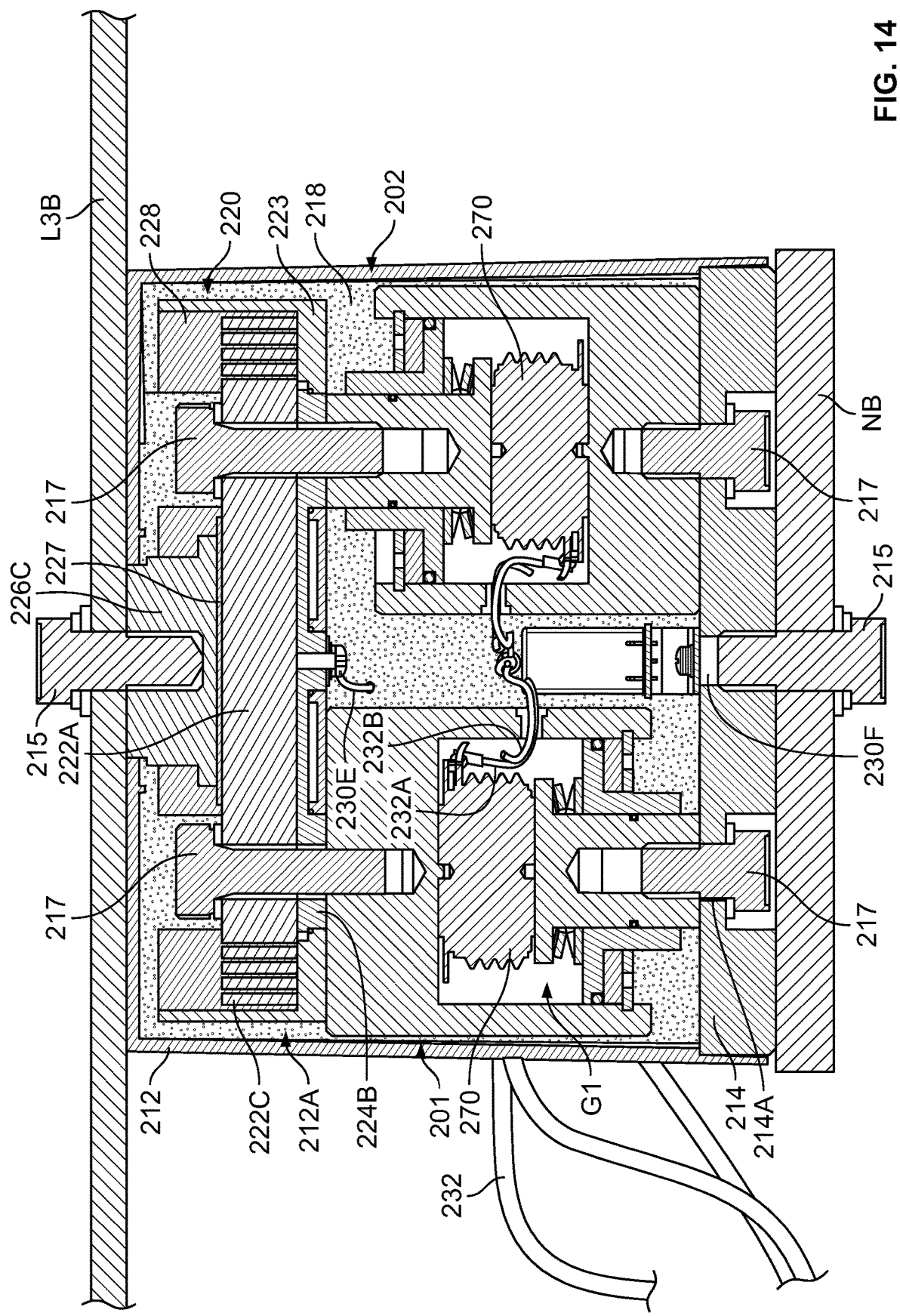
FIG. 14 is a cross-sectional view of the crowbar system of FIG. 13 taken along the line 14-14 of FIG. 13.

With reference to FIG. 13, the system 200 includes three line conductors L1B, L2B, and L3B (electrically connected to the lines L1, L2 and L3, respectively, of FIG. 5), a neutral conductor NB (electrically connected to the neutral line N of FIG. 5), and three crowbar modules 210(1), 210(2), and 210(3) according to embodiments of the invention and each corresponding to a respective one of the modules 120 of FIG. 3. The conductors L1B, L2B, L3B, NB may be substantially rigid, metal plates or busbars, for example. The conductors L1B, L2B, L3B, NB may be mounted in an electrical switchgear cabinet 60, for example. The crowbar modules 210(1), 210(2), and 210(3) are electrically connected to the connector module 290. Each of the crowbar modules 210(1), 210(2), and 210(3) electrically and mechanically connects the neutral conductor NB with a respective one of the line conductors L1B, L2B, L3B.

In some embodiments, the conductors L1B, L2B, L3B, NB are rigid busbars and are rigidly affixed to and connected by the modules 210(1), 210(2), 210(3) to collectively form a substantially rigid, unitary assembly or device 203 (FIG. 13).

With reference to FIGS. 14-21, the crowbar module 210(3) is shown therein. The crowbar modules 210(1), 210(2), and 210(3) may be substantially identical in construction and therefore only the crowbar module 210(3) will be described in detail below, it being understood that this description likewise applies to the other crowbar modules 210(1), 210(2). Herein, the numeral 210 is used to describe each of the three crowbar modules 210(1), 210(2), 210(3) generally.

The module 210(3) includes a plastic cover 212, a metal base busbar 214, fasteners 215, a coil assembly 220, an internal circuit board assembly 230, a signal cable 232, and two thyristor assemblies or units 201, 202.

Each of the thyristor units 201 and 202 includes a thyristor 270. The thyristor 270 of the unit 201 corresponds to the thyristor TH6 of FIG. 5 and the thyristor 270 of the unit 202 corresponds to the thyristor TH5.

Figure 16:
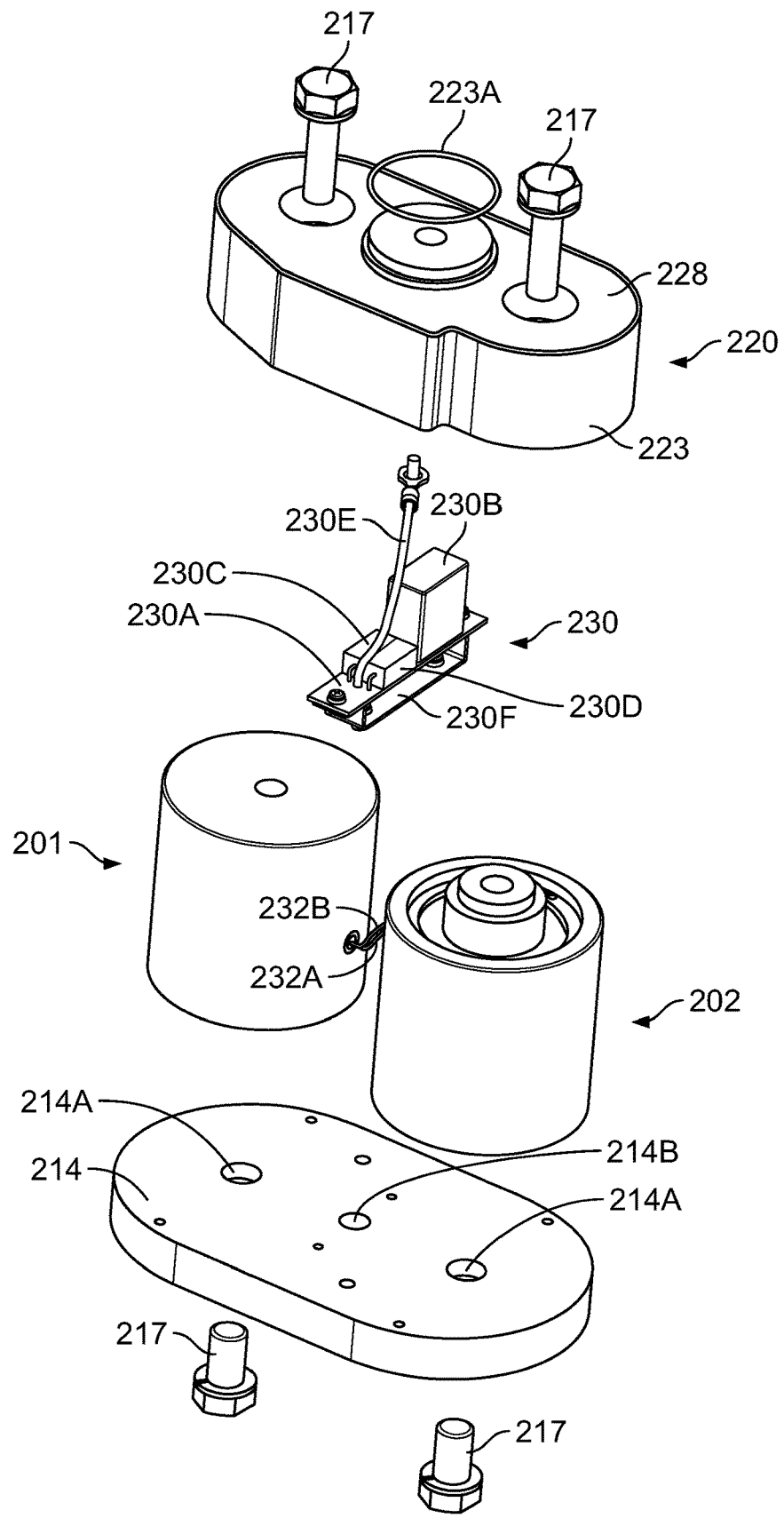
FIG. 16 is a fragmentary, exploded, top perspective view of the crowbar module of FIG. 15.
Figure 17:
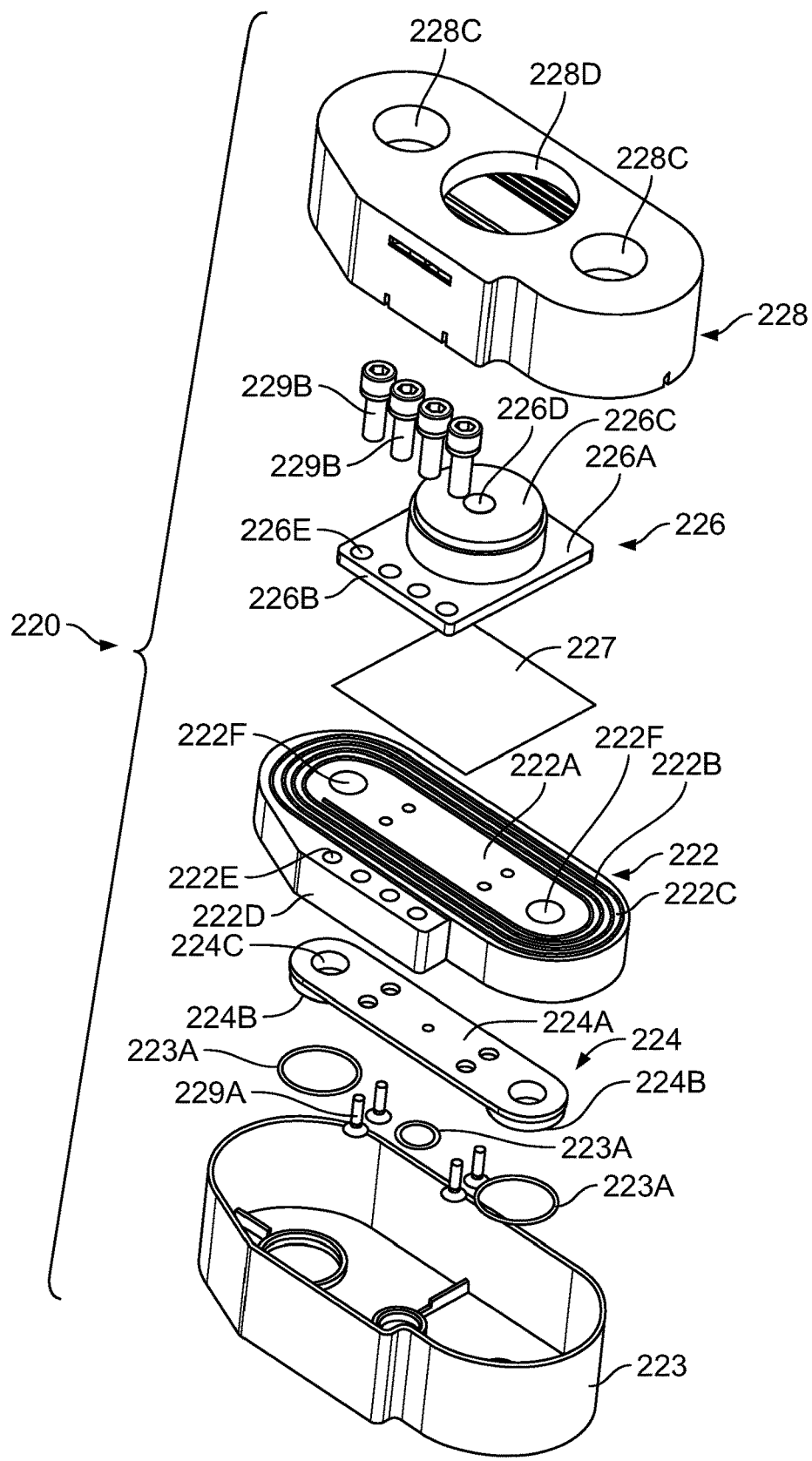
FIG. 17 is an exploded, top perspective view of a coil assembly forming a part of the crowbar module of FIG. 15.
Figure 18:
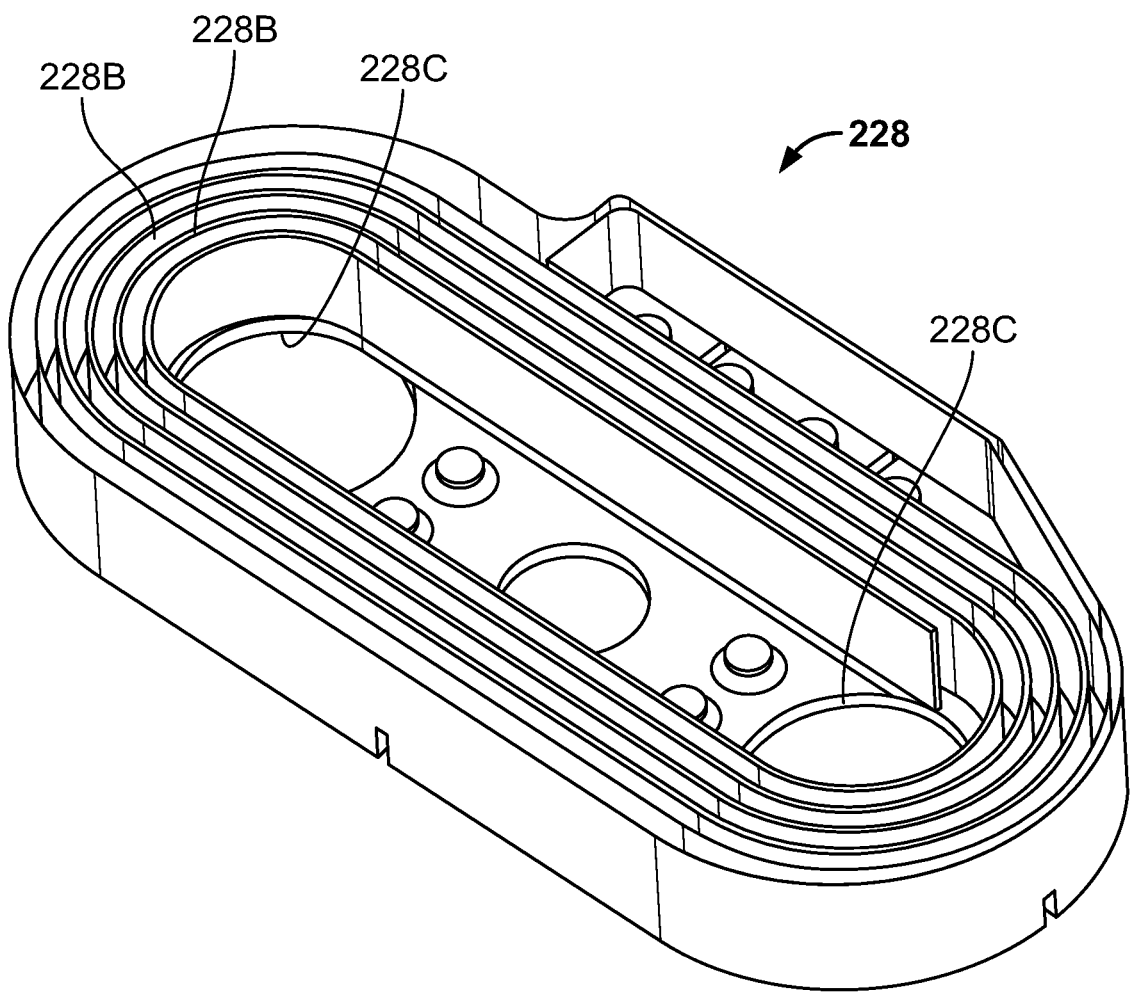
FIG. 18 is a cross-sectional, bottom perspective view of a casing forming a part of the coil assembly of FIG. 17.

A center through hole 214B and outer through holes 214A are defined in the busbar 214 (FIG. 16). The holes 214A may be countersunk or recessed to fully receive the heads of bolts 217. According to some embodiments, the busbar 214 is formed of aluminum. According to some embodiments, the busbar 214 is unitary and, in some embodiments, monolithic.

The cover 212 and the busbar 214 form a module housing that defines an enclosed cavity 212A within which the coil assembly 220, the internal circuit board assembly 230, the signal cable 232, and the crowbar units 201, 202 are contained. The signal cable 232 extends out of the cover 212 through a hole 212B and to the connection module 290.

The cover 212 may be formed of a dielectric or electrically insulating material having high melting and combustion temperatures. In some embodiments, the cover 212 is formed of a material that provides good moisture resistance. In some embodiments, the cover 212 is formed of a polymeric material and, in some embodiments, a silicone compound or polybutylene terephthalate (PBT).

A filler material 218 (FIG. 14) fills the volume within the cavity not occupied by the components 220, 230, 232, 201, 202. The filler material 218 may be a dielectric or electrically insulating material having high melting and combustion temperatures. In some embodiments, the filler material is formed of a polymeric material and, in some embodiments, includes a material selected from the group consisting of epoxy cast resin.

The coil assembly 220 (FIGS. 14 and 16-18) includes an electrically conductive coil member 222, an electrically conductive busbar 224, an electrically conductive terminal member 226, an electrical insulator sheet 227, an electrically insulating casing 228, coupling screws 229A and coupling bolts 229B.

The coil member 220 corresponds to the coil L (FIG. 5). The coil member 220 includes a coil body 222A, a spirally extending coil strip 222C defining a spiral coil channel 222B, and a coupling extension 222D. Threaded bores 222E extend axially through the extension 222D and through holes 222F extend axially through the body 222A.

According to some embodiments, the coil member 220 is formed of metal and, in some embodiments, is formed of aluminum. According to some embodiments, the coil member 220 is unitary and, in some embodiments, monolithic.

The terminal member 226 includes a body 226A, a coupling extension 226B, and a terminal post 226C. Holes 226E extend axially through the extension 226B. A threaded bore 226D extends axially into the post 226C. The terminal member 226 is electrically and mechanically connected to the coil member 220 by the bolts 229B, which extend through the bores 222E, 226E. The insulator sheet 227 is interposed between the body 226A and the body 222A to prevent or inhibit direct flow of electrical current therebetween.

According to some embodiments, the terminal member 226 is formed of metal and, in some embodiments, is formed of aluminum. According to some embodiments, the terminal member 226 is unitary and, in some embodiments, monolithic.

The busbar 224 includes a body 224A that is substantially planar on its upper side and has standoffs 224B projecting from its lower side. Bolt holes 224C extend axially through the body 224A and the standoffs 224B. Fasteners 229A extend through holes 224D and into the coil body 222A to secure the upper face of the busbar 224 in mechanical and electrical contact with the coil body 222A.

According to some embodiments, the busbar 224 is formed of metal and, in some embodiments, is formed of aluminum. According to some embodiments, the busbar 224 is unitary and, in some embodiments, monolithic.

The casing 228 includes an outer shell portion 228A and a separator wall portion 228B. The outer shell portion 228A partially surrounds and encases the components 222, 224, 226, 227. Bolt holes 228C are defined in the portion 228A in alignment with the holes 222F. The terminal post 226C projects through a post hole 228D and above the casing 228. The separator wall portion 228B fills the coil channel 222B between the adjacent windings of the coil strip 222C.

The casing 228 may be formed of a dielectric or electrically insulating material having high melting and combustion temperatures. In some embodiments, the casing 228 is formed of a polymeric material. In some embodiments, the casing 228 includes an epoxy. In some embodiments, the casing 228 includes a material selected from the group consisting of epoxy adhesive and/or epoxy cast resin or silicone elastomer. In some embodiments, the casing 228 is monolithic. In some embodiments, the casing 228 includes a material selected from the group consisting of epoxy adhesive and/or epoxy cast resin that is itself covered by an outer layer of a different material.

The outer casing layer 223 may be formed of a different material that the casing 228 in order to provide complementary properties. In some embodiments, the outer casing layer 223 is formed of a material that provides enhanced moisture resistance as compared to the material of the casing 228. In some embodiments, the outer casing layer 223 is formed of a silicone compound or PBT. The O-rings 223A (made of the same or similar material as the O-rings 265A, 265B) prevent leakage of the epoxy used in liquid form (initially) to form the casing 228.

The circuit board assembly 230 includes a substrate 230A (e.g., a PCB) and a capacitor 230B, a pair of resistors 230C, 230D, a lead wire 230E, and a lead bracket 230F mounted thereon. The capacitor 230B corresponds to the capacitor C (FIG. 5). The resistors 230C, 230D correspond to the resistor(s) R (FIG. 5). The capacitor 230B is electrically connected to the busbar 224 by the wire 230E and the resistors 230C, 230D is electrically connected to the busbar 214 by the lead bracket 230F. The resistors 230C, 230D and the capacitor from a snubber circuit as discussed in more detail below.

With reference to FIGS. 16 and 19-21, the crowbar unit 201 is shown therein. The crowbar units 201, 202 may be substantially identical in construction and therefore only the crowbar unit 201 will be described in detail below, it being understood that this description likewise applies to the crowbar unit 202.

Figure 20:
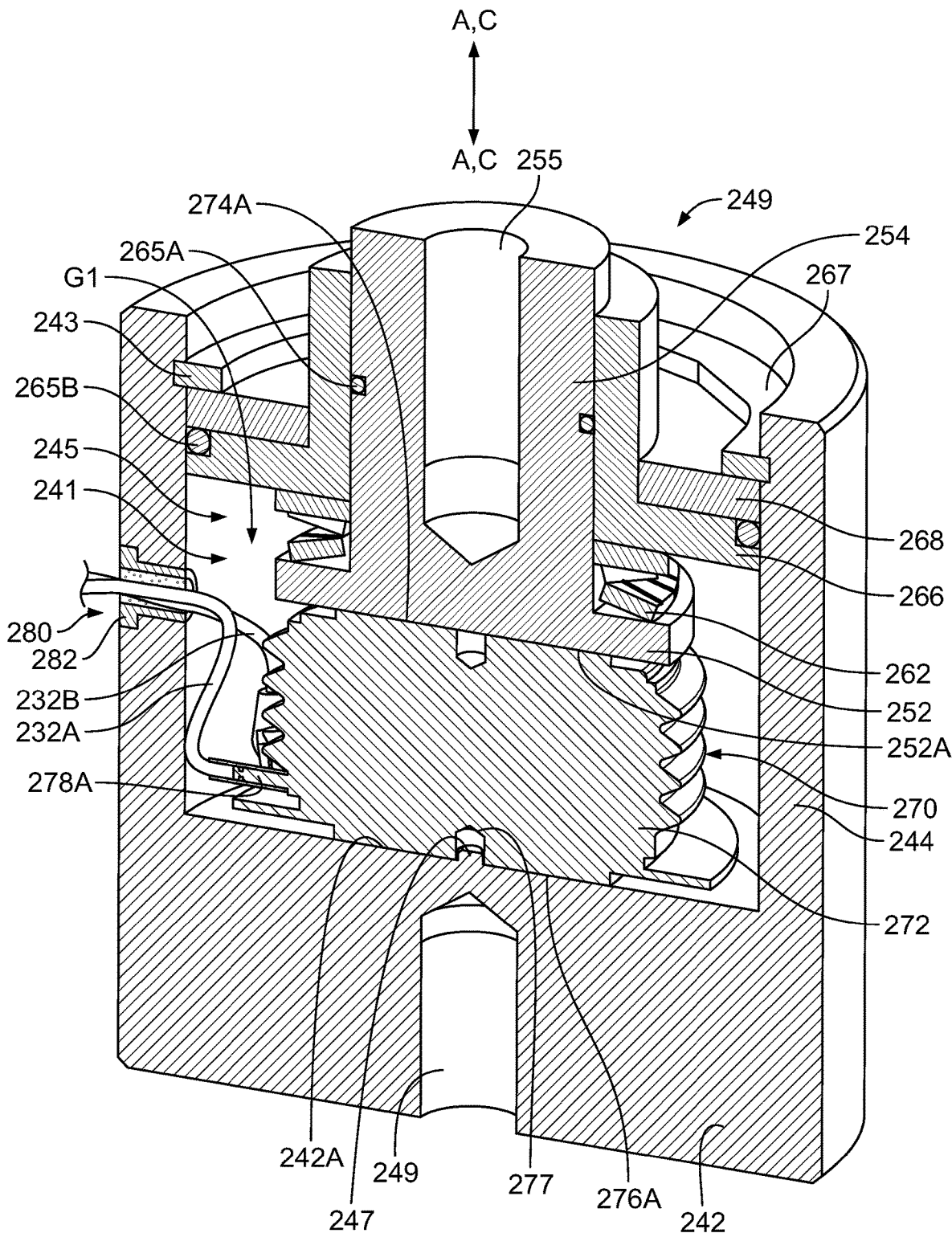
FIG. 20 is a cross-sectional, top perspective view of the crowbar unit of FIG. 19.
Figure 21:
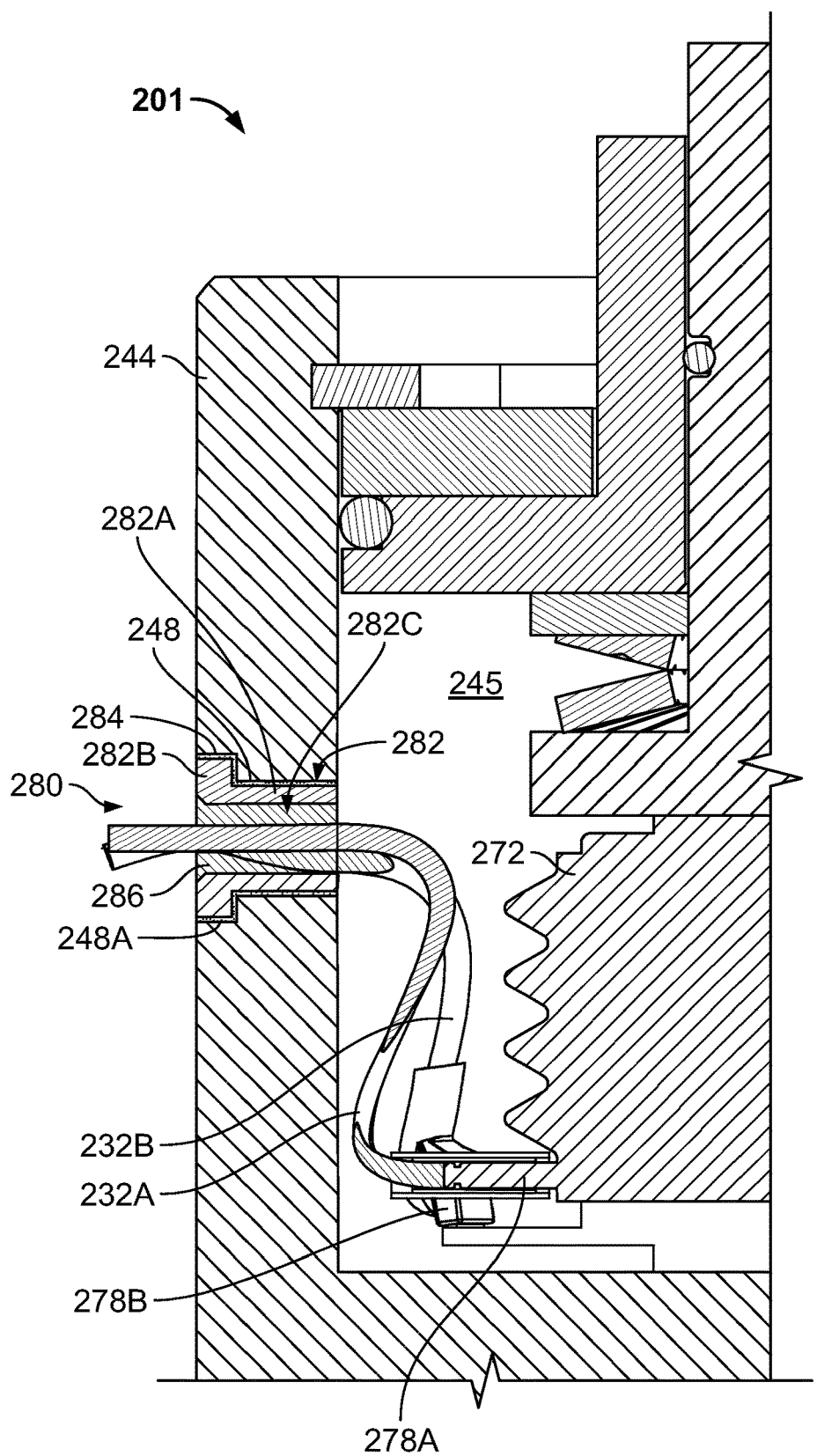
FIG. 21 is an enlarged, fragmentary, cross-sectional view of the crowbar unit of FIG. 19.
Figure 22:
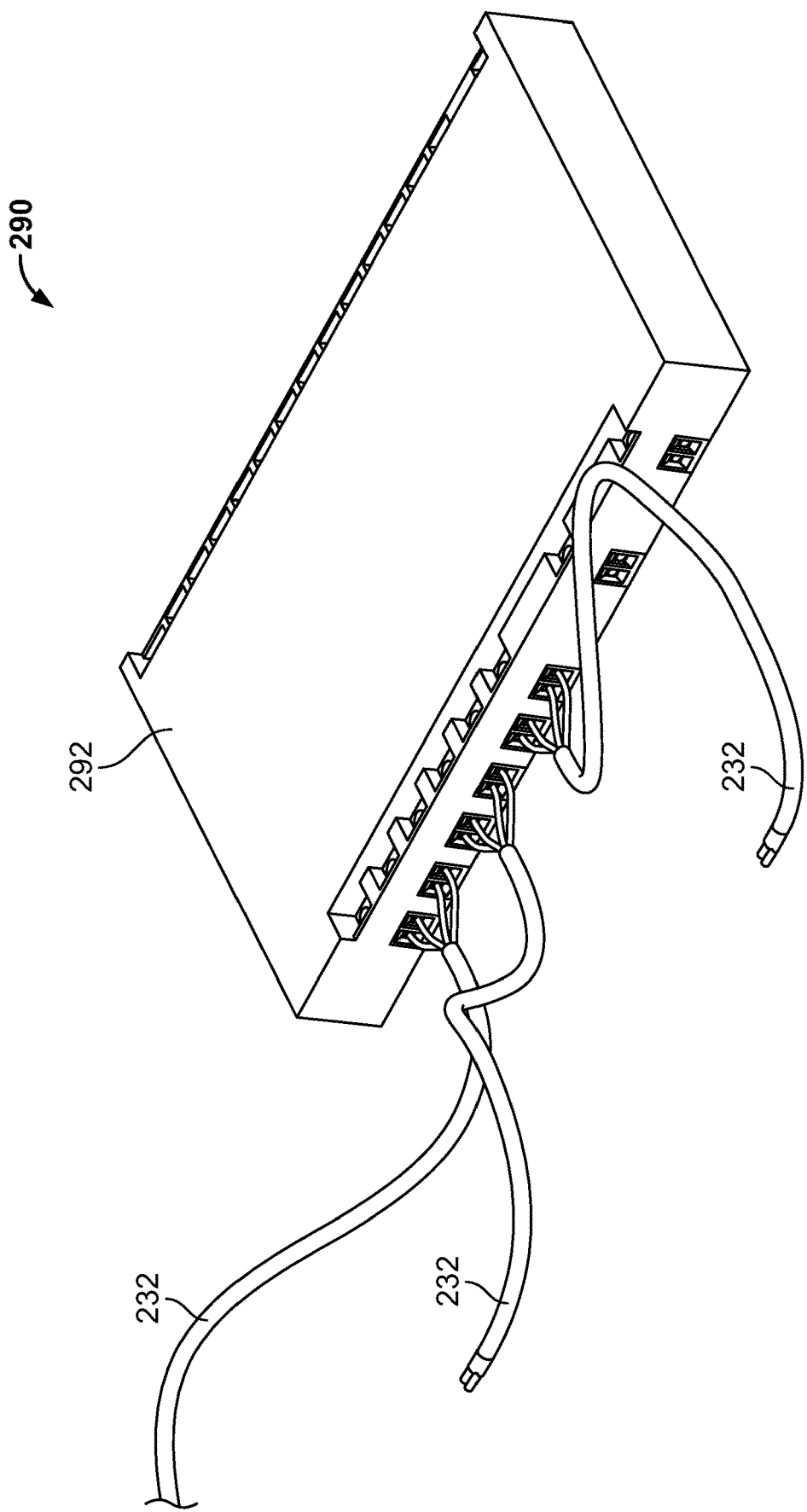
FIG. 22 is a rear perspective view of the connector module of FIG. 13.

The crowbar unit 201 has a lengthwise axis A-A (FIG. 20). The crowbar unit 201 includes a first electrode or housing 240, a piston-shaped second electrode 250, a thyristor 270 between the housing 240 and the electrode 250, and other components as discussed in more detail below.

Figure 19:
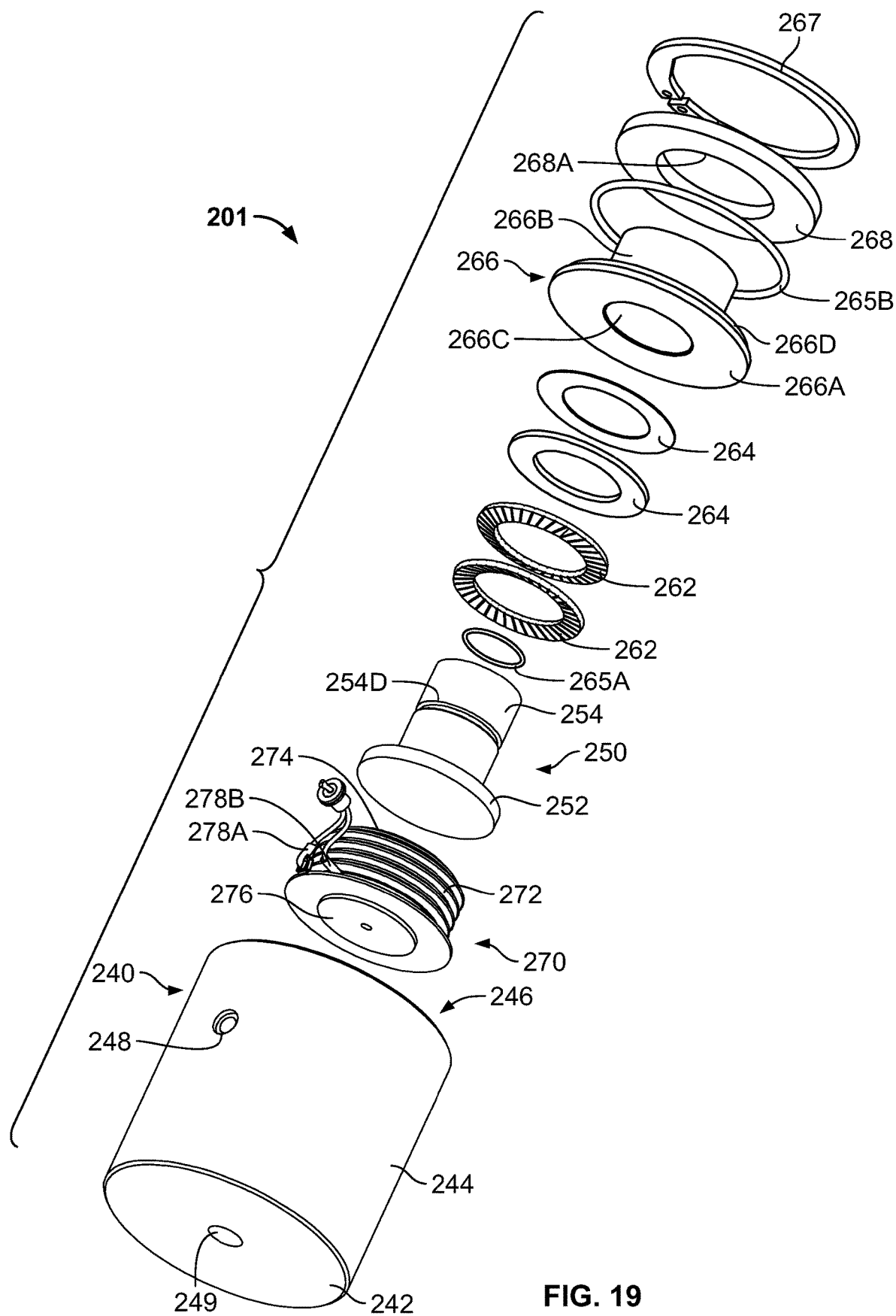
FIG. 19 is an exploded, bottom perspective view of a crowbar unit forming a part of the crowbar module of FIG. 15.

With reference to FIGS. 19 and 20, the housing 240 has an end electrode wall 242 and a cylindrical sidewall 244 extending from the electrode wall 242. The sidewall 244 and the electrode wall 242 form a chamber or cavity 241 communicating with an opening 246. A threaded bore 249 extends axially into the electrode wall 242. A wire aperture or port 248 extends through the side wall 244 and has an enlarged recess 248A at its outer opening.

The electrode 250 has a head 252 disposed in the cavity 241 and an integral shaft 254 that projects outwardly through the opening 246. The thyristor 270 is disposed in the cavity 241 between and in contact with each of the electrode wall 242 and the head 252.

Turning to the construction of the crowbar unit 201 in greater detail, the crowbar unit 201 further includes spring washers 262, flat washers 264, an insulating member 266, an end cap 268, a retention clip 267, O-rings 265A, 265B, and a cable gland 280.

The electrode wall 242 of the housing 240 has an inwardly facing, substantially planar contact surface 242A. A locator feature or post 247 projects upwardly from the contact surface 242A. An annular slot 243 is formed in the inner surface of the sidewall 244. According to some embodiments, the housing 240 is formed of aluminum. However, any suitable electrically conductive metal may be used. According to some embodiments, the housing 240 is unitary and, in some embodiments, monolithic. The housing 240 as illustrated is cylindrically shaped, but may be shaped differently.

As best seen in FIG. 20, the head 252 of the electrode 250 has a substantially planar contact surface 252A that faces the contact surface 242A of the electrode wall 242. A threaded bore 255 is formed in the end of the shaft 254 to receive the bolt 215 for securing the busbar L3B to the electrode 250. An annular, sidewardly opening groove 254D is defined in the shaft 254.

According to some embodiments, the electrode 250 is formed of aluminum and, in some embodiments, the housing sidewall 244 and the electrode 250 are both formed of aluminum. However, any suitable electrically conductive metal may be used. According to some embodiments, the electrode 250 is unitary and, in some embodiments, monolithic.

An annular gap G1 is defined radially between the head 252 and the nearest adjacent surface of the sidewall 244. According to some embodiments, the gap G1 has a radial width in the range of from about 5 to 15 mm.

The housing 240, the insulating member 266 and the end cap 268 collectively define an enclosed chamber 245 containing the thyristor 270.

The thyristor 270 includes a body 272 and an anode 274 and a cathode 276 on axially opposed ends of the body 272. It will be appreciated that in FIG. 14 the internal structure and components of the thyristors are not shown in detail. The anode 274 and cathode 276 have substantially planar contact surfaces 274A and 276A, respectively. The thyristor 270 is interposed between the contact surfaces 242A and 252A such that the contact surface 274A mates with the contact surface 242A and the contact surface 276A mates with the contact surface 252A. As described below, the head 252 and the wall 242 are mechanically loaded against the thyristor 270 to ensure firm and uniform engagement between the mating contact surfaces. The locator post 247 of the housing 240 is seated in a complementary locator socket 277 formed in the contact surface 276A.

The thyristor 270 further includes a gate or control terminal 278A and a reference terminal 278B. For example, as illustrated in FIG. 5, an input to the gate or control terminal 278A of the thyristor labeled therein as TH5 may correspond to signal TH5 from the trigger circuit 106. Similarly, a reference connection to a reference terminal 278B of the thyristor TH5 may correspond to the reference C5 from the trigger circuit 106.

With reference to FIG. 20, the cable gland 280 is affixed in the wire port 248 and two signal wires 232A, 232B extend through the wire port 248 and the cable gland 280 and into the chamber 245. The wire 232A is electrically terminated at the control terminal 278A and the wire 232B is electrically terminated at the reference terminal 278B.

The cable gland 280 includes a fitting 282 that is secured in the wire port 248. The fitting 282 has a cylindrical body 282A, a flange 282B and a through bore 282C. The body 282A is seated in the wire port 248 and the flange 282B is seated in the recess 248A. The fitting 282 may be secured in place by adhesive 284, for example. In some embodiments, the adhesive 284 bonds the body 282A and the flange 282B directly to the wall of the wire port 248.

The cable gland 280 further includes a sealing plug 286 in the bore 282C. The sealing plug 286 surrounds the wires 232A, 232B, bonds to the wires 232A, 232B and the fitting 282, and continuously fills the radial space between the wires 232A, 232B and the fitting 282 and seals about the wires 232A, 232B. In this manner, the sealing plug 286 serves to mechanically retain or secure the wires 232A, 232B in the port 282C (providing strain relief) and to fully seal, plug or close the bore 282C (e.g., hermetically).

The sealing plug 286 may be formed of a rigid material having high melting and combustion temperatures. In some embodiments, the sealing plug 286 is formed of a polymeric material. In some embodiments, the sealing plug 286 is a hardened or cured resin. In some embodiments, the sealing plug 286 includes an epoxy. In some embodiments, the sealing plug 286 includes an epoxy adhesive or an epoxy cast resin.

The fitting 282 may be formed of a rigid material having high melting and combustion temperatures. In some embodiments, the fitting 282 is formed of a polymeric material. In some embodiments, the fitting 282 is formed of Nylon-66 (PA-66), or equivalent.

Figure 15:
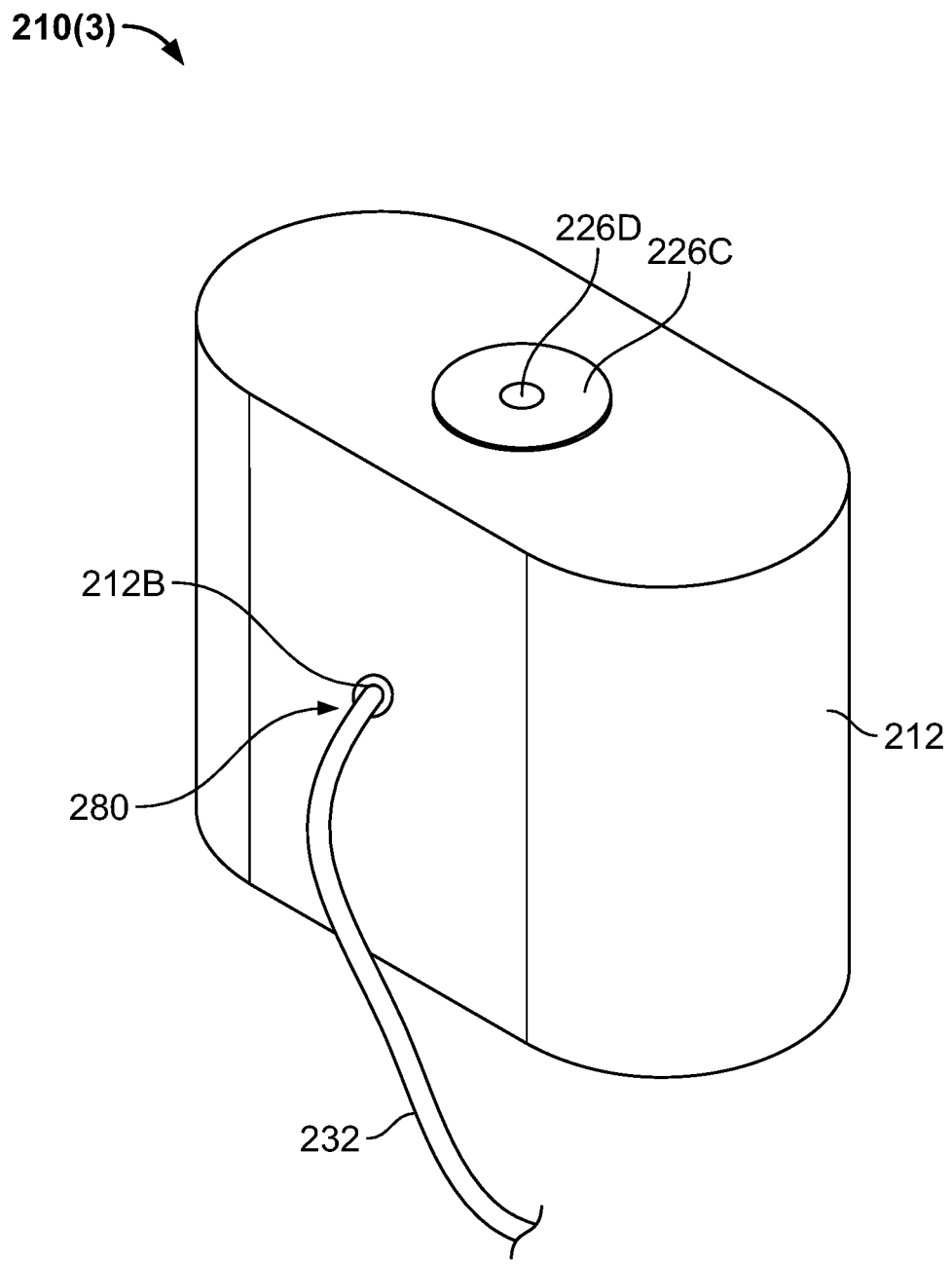
FIG. 15 is a top perspective view of a crowbar module forming a part of the crowbar system of FIG. 13.

A cable gland 280 can also be provided for sealing and penetration of the cable 232 through the cover 212 (FIG. 15).

The spring washers 262 surround the shaft 254. Each spring washer 262 includes a hole that receives the shaft 254. The lowermost spring washer 262 abuts the top face of the head 252. According to some embodiments, the clearance between the spring washer hole and the shaft 254 is in the range of from about 0.015 to 0.035 inch. The spring washers 262 may be formed of a resilient material. According to some embodiments and as illustrated, the spring washers 262 are Belleville washers formed of spring steel. While two spring washers 262 are shown, more or fewer may be used. The springs may be provided in a different stack arrangement such as in series, parallel, or series and parallel.

The flat metal washers 264 are interposed between the spring washer 262 and the insulator ring 266 with the shaft 254 extending through holes formed in the washers 264. The washers 264 serve to distribute the mechanical load of the upper spring washer 262 to prevent the spring washer 262 from cutting into the insulator ring 266.

The insulator ring 266 overlies and abuts the washer 264. The insulator ring 266 has a main body ring 266A and a cylindrical upper flange or collar 266B extending upwardly from the main body ring 266A. A hole 266C receives the shaft 254. According to some embodiments, the clearance between the hole 266C and the shaft 254 is in range of from about 0.025 to 0.065 inch. An upwardly and outwardly opening peripheral groove 266D is formed in the top corner of the main body ring 266A.

The insulator ring 266 is preferably formed of a dielectric or electrically insulating material having high melting and combustion temperatures. The insulator ring 266 may be formed of polycarbonate, ceramic or a high temperature polymer, for example.

The end cap 268 overlies and abuts the insulator ring 266. The end cap 268 has a hole 268A that receives the shaft 254. According to some embodiments, the clearance between the hole 268A and the shaft 254 is in the range of from about 0.1 to 0.2 inch. The end cap 268 may be formed of aluminum, for example.

The clip 267 is resilient and truncated ring shaped. The clip 267 is partly received in the slot 243 and partly extends radially inwardly from the inner wall of the housing 240 to limit outward axial displacement of the end cap 268. The clip 267 may be formed of spring steel.

The O-ring 265A is positioned in the groove 254 so that it is captured between the shaft 254 and the insulator ring 266. The O-ring 265B is positioned in the groove 266D such that it is captured between the insulating member 266 and the sidewall 244. When installed, the O-rings 265A, 265B are compressed so that they are biased against and form a seal between the adjacent interfacing surfaces. In an overvoltage event, byproducts such as hot gases and fragments from the thyristor 270 may fill or scatter into the cavity chamber 245. These byproducts may be constrained or prevented by the O-rings 265A, 265B from escaping the crowbar unit 201 through the housing opening 246.

The O-rings 265A, 265B may be formed of the same or different materials. According to some embodiments, the O-rings 265A, 265B are formed of a resilient material, such as an elastomer. According to some embodiments, the O-rings 265A, 265B are formed of rubber. The O-rings 265A, 265B may be formed of a fluorocarbon rubber such as VITON™ available from DuPont. Other rubbers such as butyl rubber may also be used. According to some embodiments, the rubber has a durometer of between about 60 and 100 Shore A.

The electrode head 252 and the housing wall 242 are persistently biased or loaded against the thyristor 270 along a load or clamping axis C-C (FIG. 20) to ensure firm and uniform engagement between the thyristor contact surfaces 276A, 274A and the surfaces 242A, 252A. This aspect of the unit 201 may be appreciated by considering a method according to the present invention for assembling the unit 201, as described below.

The wires 232A, 232B are secured in the bore 282A of the fitting 282 using the sealing plug 286. In some embodiments, the wires 278A, 278B are inserted into the bore 282A, a liquid sealing material is introduced (e.g., poured or injected) into the bore about the wires 232A, 232B, and the sealing material is cured to form the rigid sealing plug 286 on the wires 232A, 232B.

The fitting 282 is secured in the wire port 248 using the adhesive 284. The wires 232A, 232B are connected to the terminals 274A, 276A. In some embodiments, the wires 232A, 232B are secured by the sealing plug 286 before the step of securing the fitting 282 in the wire port 248.

The O-rings 265A, 265B are installed in the grooves 254, 266D. The thyristor 270 is placed in the cavity 241 such that the contact surface 276A engages the contact surface 242A. The electrode 250 is inserted into the cavity 241 such that the contact surface 252A engages the contact surface 274A. The spring washers 262 are slid down the shaft 254. The washers 264, the insulator ring 266, and the end cap 268 are slid down the shaft 254 and over the spring washers 262. A jig (not shown) or other suitable device is used to force the end cap 268 down, in turn deflecting the spring washers 262. While the end cap 268 is still under the load of the jig, the clip 267 is compressed and inserted into the slot 243. The clip 267 is then released and allowed to return to its original diameter, whereupon it partly fills the slot and partly extends radially inward into the cavity 241 from the slot 243. The clip 267 and the slot 243 thereby serve to maintain the load on the end cap 268 to partially deflect the spring washers 262. The loading of the end cap 268 onto the insulator ring 266 and from the insulator ring onto the spring washers 262 is in turn transferred to the head 252. In this way, the thyristor 270 is sandwiched (clamped) between the head 252 and the electrode wall 242.

When the crowbar unit 201 is assembled, the housing 240, the electrode 250, the insulating member 266, the end cap 268, the clip 267, the O-rings 265A, 265B and the cable gland 280 collectively form a unit housing or housing assembly 249 containing the thyristor 270.

The crowbar module 210 may be assembled as follows in accordance with methods of the invention.

In order to construct the coil assembly 220, the busbar 224 is secured to the coil member 222 using the bolts 229A. The terminal member 226 is secured to the coil member 222 using the bolts 229B with the insulator sheet 227 captured between the terminal member 226 and the coil member 222. The casing 228 is thereafter molded about and through this subassembly. For example, in some embodiments, the subassembly is placed in a mold, the mold is then filled with liquid casing material (e.g., a liquid resin), and the material is then cooled or cured to form the rigid casing 228. The regions of the holes 228C, 228D, 222F, 226D may be temporarily filled or plugged with mold features or the like to prevent the liquid casing material from filling these regions. The casing 223 is molding or fitted about the casing 228. For example, the casing 223 may be molded or co-molded around the casing 228. Elastomeric O-rings 223A may be fitted about the terminal post 226C and the busbar standoffs 224B.

The coil assembly 220 is secured to the electrode 240 of the crowbar unit 201 by a bolt 217 and to the electrode 250 of the crowbar unit 202 by a bolt 217. The heads of the bolts 217 are seated in the holes 228C of the casing 228 to provide a low, flat profile. The base busbar 214 is secured to the electrode 250 of the crowbar unit 201 by a bolt 217 and to the electrode 240 of the crowbar unit 201 by a bolt 217. The heads of the bolts 217 are seated in the holes 214A of the base busbar 214 to provide a low, flat profile. The lead wires 230E and 230F are secured to the busbar 224 and the base busbar 214, respectively, by screws.

The cover 212 is installed over the foregoing subassembly and secured to the base busbar 214 by fasteners (e.g., screws), adhesive, and/or interlock features, for example. The cable 232 (which includes the wire pairs 232A, 232B from each of the crowbar units 201, 202) is routed through the opening 212B in the cover 212. The remaining volume of the cavity 212A is filled with the filler material 218. In some embodiments, a liquid filler material is introduced (e.g., poured or injected through the hole 214B) into the cavity 212A, and then cured to form the rigid filler material 218.

The connection module 290 (FIGS. 13 and 22) includes a circuit or circuits corresponding to an interconnection between the crowbar system 102 and the trigger circuit 106. For example, some embodiments provide that the crowbar system 102 includes three crowbar modules 210(1), 210(2) and 210(3) (schematically illustrated as crowbar module 120 in FIG. 5) that include connections to trigger circuit 106. Specifically, for example, each of cables 232 may correspond to a respective one of the crowbar modules 210 and may correspond to thyristor trigger signals for each of the two crowbar units 201 within each crowbar module 210 and reference signals for each of the two crowbar units within each crowbar module 210. The connection module 290 may include a surrounding enclosure 292, and multiple electrical contacts that are configured to provide connections to contacts in a mating connector (not shown). In this manner, the crowbar system 102 may be connected to the trigger circuit 106.

In order to connect the crowbar modules 210(1), 210(2), 210(3) to the conductors L1B, L2B, L3B, NB, each of the line conductors L1B, L2B, L3B is mechanically and electrically connected to the terminal member 226 of a respective one of the crowbar modules 210(1), 210(2), 210(3) by a bolt 215, and the neutral conductor NB is mechanically and electrically connected to the base busbars 214 of the crowbar modules 210(1), 210(2), 210(3) by bolts 215.

In use, the crowbar system 200 and the crowbar modules 210(1), 210(2), 210(3) perform as described above for the system 102 and the three modules 120, respectively (FIG. 5).

When a triggering event occurs, and the thyristors 270 of a module 210 conduct current between the lines the module 210 bridges (i.e., the neutral line N and the associated one of the lines L1, L2, L3). As discussed above, the crowbar units 201, 202, and therefore the thyristors 270 thereof, are oriented in opposite directions in order to conduct current in respective ones of the AC current directions. In the case of the crowbar unit 202 of the module 210, the current flows sequentially through the terminal post 226C, the terminal extension 226B, the coil member extension 222D, the coil strip 222C, the coil body 222A, the busbar 224, the electrode 250 mated to the busbar 224, the thyristor 270, the electrode 240 mated to the busbar 214, and the busbar 214. In the case of the crowbar unit 201, the current flows sequentially through the busbar 214, the electrode 250, the thyristor 270, the electrode 240, the busbar 224, the coil body 222A, the coil strip 222C, the extension 222D, the extension 226B, and the terminal post 226C.

The construction and configuration of the crowbar modules 210 provides a compact, modular, unitarily packaged device that can be efficiently integrated into existing electrical equipment cabinets. The packaging provides a simple and convenient arrangement and features for connecting the modules 210 to the lines L1, L2, L3, N (e.g., via conductor busbars L1B, L2B, L3B, NB).

Moreover, the construction and configuration of the crowbar modules 210 can provide the crowbar modules 210 with increased strength and durability to withstand the physical effect (electromagnetic forces generated) of fault currents over a prolonged period of time, and other electrical and mechanical stresses in service. Therefore, it can safely withstand the short circuit event (avoid any safety issues to the personnel and any damages to the equipment of the installation as well as the whole installation itself) when it is triggered.

The crowbar module 210 can operate when triggered in two distinct ways: one to withstand the fault current for the period of time required to trip the upstream main circuit breaker and a second (a different design than the first) that the thyristors 270 cannot withstand the fault current and fail in short. The second option is attractive due to the lower energy withstand capabilities of the thyristors employed in the design. However, in such case, the crowbar system 200 typically can only be triggered once, as after it is triggered, the system 200 is not recoverable and it has to be replaced.

In the case where the thyristors 270 can withstand the fault current, two additional provisions are typically required. One is that the inductance of the added coil 222 is used to eliminate the possibility of damaging the thyristors due to high di/dt during the conduction of the fault currents (creates a hot spot on the internal surface of the thyristor disk). The impedance of the coil is also useful to allow the snubber circuit 230B, 230C, 230D to prevent thyristor self-trigger due to excessive dv/dt (reduce the dV/dt, that requires a certain impedance in the circuit—in some applications this could be part of the existing impedance of the system and allow the omission of the coil). The second is that even in this case there should be provisions using the same construction for the crowbar module 210 to withstand the damage in case the thyristor fails short—typical failure mode of the thyristor. Therefore the configuration of the crowbar module 210 is highly beneficial, and in some cases mandatory, for both design implementations (withstand and failure of the crowbar module 210).

For example, when a module 210 is activated, a thyristor 270 thereof may be damaged (e.g., as a result of carrying all of the fault current). However, the associated housing assembly 241 contains the damage (e.g., debris, gases and immediate heat) within the crowbar unit 201, 202, so that the module 210 fails safely. Moreover, the components of the module 210 surrounding the unit 201, 202 can also contain any or buffer any heat or damage products that escape the unit 201, 202. In this way, the module 210 can prevent or reduce any damage to adjacent equipment (e.g., switch gear equipment in the cabinet) and harm to personnel. In this manner, the module 210 can enhance the safety of equipment and personnel. This can be a very important feature as the main reason for using a crowbar system as discussed herein is the protection of equipment and personnel from arc flash hazards that are typically caused by breaking the insulation between bus bars or by failures on semiconductive devices (like thyristors, IGBTs, etc). So, such a system may be of limited or no significant value if it creates the same damaging effects that it is employed to solve (hazardous failure of semiconductive devices).

The construction of the coil assembly 220, and in particular the casing 228, provide a robust, unitary component. The enhanced strength of the coil assembly 220 is beneficial to withstand the stresses that may be experienced and exerted by the coil member 222, which is located in series across lines.

The filler material 218 can provide the module 210 with improved strength. The filler material 218 can help to contain byproducts from destruction of the thyristor. The filler material 218 can thermal insulate as well as electrically insulate electrical components of the module 210 from the environment (e.g., personnel and other equipment in the switch cabinet). The filler material 218 can also provide tamper resistance.

The cable gland 280 provides strain relief for the wires 232A, 232B, and also serves to seal the wire port 248 to prevent or inhibit expulsion of byproducts from destruction of the thyristor through the wire port 248.

In some embodiments, the cable gland 280 is constructed to permit breach or failure of the cable gland 248 in response to pressure in the chamber exceeding a threshold pressure in a prescribed range. That is, the cable gland 280 can serve as a pressure dependent valve. This may be very important feature in case for some reason the crowbar module 210 is overexposed to fault currents—above its specifications—and the cable gland 280 operates as a pressure relief inside the module 210 without generating significant hazards (i.e., it is a controlled way to relieve the internal pressure by allowing a smoke emission in a specific direction that could be externally controlled by guiding the smoke emissions to a vent.

A failure of the cable gland 280 can be observed without disassembling the crowbar unit 201, 202. The valve function the gland 280 can be advantageously employed to determine the maximum fault current and duration that the crowbar module 210 can withstand, having as an indication only when the valve will open when the crowbar unit 201, 202 is being tested or rated (used as a first indication that the fault current withstand capability of the crowbar module 210 is close to its limits, instead of experiencing a full damage of the whole module).

Electrical protection devices according to embodiments of the present invention (e.g., the device 210) may provide a number of advantages in addition to those mentioned above. The devices may be formed so to have a relatively compact form factor. The devices may be retrofittable for installation in place of similar type crowbar devices not having a thyristor as described herein. In particular, the present devices may have the same length dimension, as such previous devices. That depends on the fault current rating of the crowbar system, the duration of the fault current and the mode of operation during trigger (withstand or failure). That determines the size of the thyristors 270 employed and therefore the size and construction details of the crowbar modules 210 and of the whole system.

According to some embodiments, the areas of engagement between each of the electrode contact surfaces (e.g., the contact surfaces 242A, 252A) and the thyristor contact surfaces (e.g., the contact surfaces 274A, 276A) is at least one square inch.

According to some embodiments, the biased electrodes 240, 250 apply a load to the thyristor 270 along the axis C-C in the range of from 2000 lbf and 26000 lbf depending on its surface area.

According to some embodiments, the combined thermal mass of the housing 240 and the electrode 250 is substantially greater than the thermal mass of the thyristor 270. As used herein, the term "thermal mass" means the product of the specific heat of the material or materials of the object (e.g., the thyristor 270) multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head 252 and the electrode wall 242 is substantially greater than the thermal mass of the thyristor 270. According to some embodiments, the thermal mass of at least one of the electrode head 252 and the electrode wall 242 is at least two times the thermal mass of the thyristor 270, and, according to some embodiments, at least ten times as great. According to some embodiments, the combined thermal masses of the head 252 and the wall 242 are substantially greater than the thermal mass of the thyristor 270, according to some embodiments at least two times the thermal mass of the thyristor 270 and, according to some embodiments, at least ten times as great.

As discussed above, the spring washers 262 are Belleville washers. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

According to further embodiments of the invention, the crowbar module 210 may be constructed with only one crowbar unit 201 or 202 (i.e., the other crowbar unit 202 or 201 is omitted), so that the crowbar module so formed electrically conducts only in one direction. Such modified crowbar modules may be used in matched, inverted pairs to provide the functionality of the crowbar module 210.

According to further embodiments of the invention, the crowbar module 210 may be constructed with only one crowbar unit 201 or 202 (i.e., the other crowbar unit 202 or 201 is omitted), but such that the remaining single crowbar unit 201, 202 includes, in place of the thyristor 270, a bi-directional thyristor that can operate in both directions. That is, when triggered, the bi-directional thyristor will conduct current in both directions of the AC current. This crowbar module may be reduced in size and/or cost as compared to the dual thyristor crowbar module.

According to further embodiments of the invention, the crowbar module 210 may be constructed without the coil 222.

Figure 23:
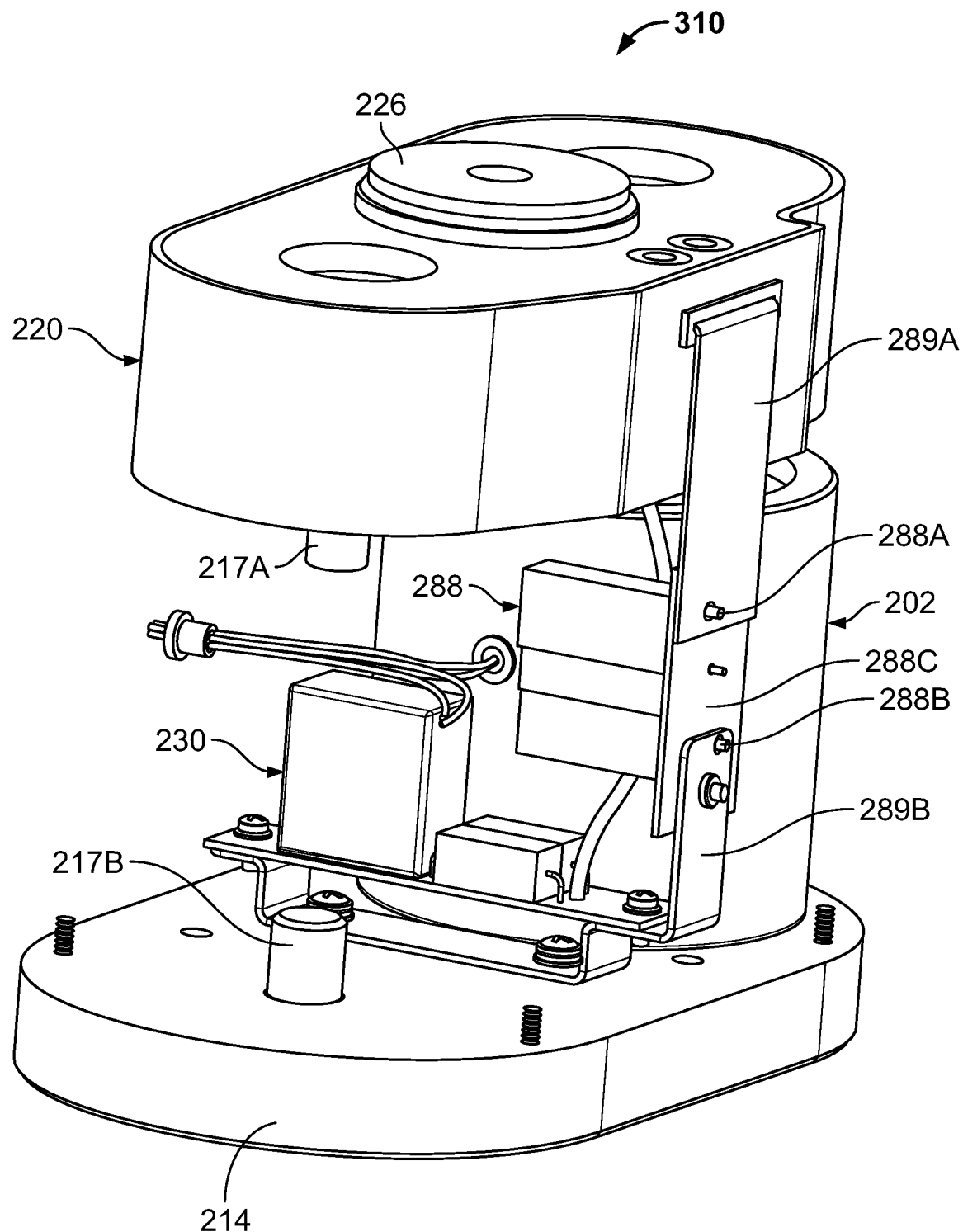
FIG. 23 is a fragmentary, perspective view of a crowbar module according to further embodiments of the invention.

With reference to FIG. 23, a crowbar module 310 according to further embodiments of the invention is shown therein. The crowbar module 310 corresponds to the crowbar module 210, except as described below. In FIG. 23, the cover 212, the filler material 218, and the crowbar unit 201 are not shown, in order to provide clearer view for the purpose of explanation. The crowbar unit 201 in the crowbar module 310 is electrically connected to the base busbar 214 and the coil member 222 by the bolts 217A and 217B as in the crowbar module 210.

The crowbar module 310 includes an integral metal-oxide varistor (MOV) device 288. The integrated MOV device 288 is electrically connected to the terminal member 226 by a lead 289A (bypassing the coil 222C), and to the base busbar 214 by a lead 289B. The MOV device 288 is mounted on an electrically insulating substrate 288C between the leads 289A, 289B. The MOV device 288 includes a first pin type lead electrically contacting the lead 289A and a second pin type lead electrically contacting the lead 289B. The MOV internally includes a thermal link (thermal disconnector or thermal fuse) between the lead 288A and the one electrode of the MOV. The other electrode of the MOV is connected to lead 288B. In addition, the connection between the 226 and the MOV lead 288A, as well as the connection between the busbar 214 and the lead 288B, is done using a bus bar to enable the connections to the power line and the ground to withstand the forces generated form the conducted current when the MOV conducts surge/lightning currents or fault currents from the power source. The crowbar module 310 may be used as a crowbar module in the crowbar device 102 of the system described above with reference to FIG. 11 for example. An additional MOV could also be used—integrated in the PCB 288C—and connected in parallel to the two thyristors to reduce the overvoltage at their ends and to prevent the maximum expected overvoltage which could lead to the false trigger of the thyristor.

Figure 24:
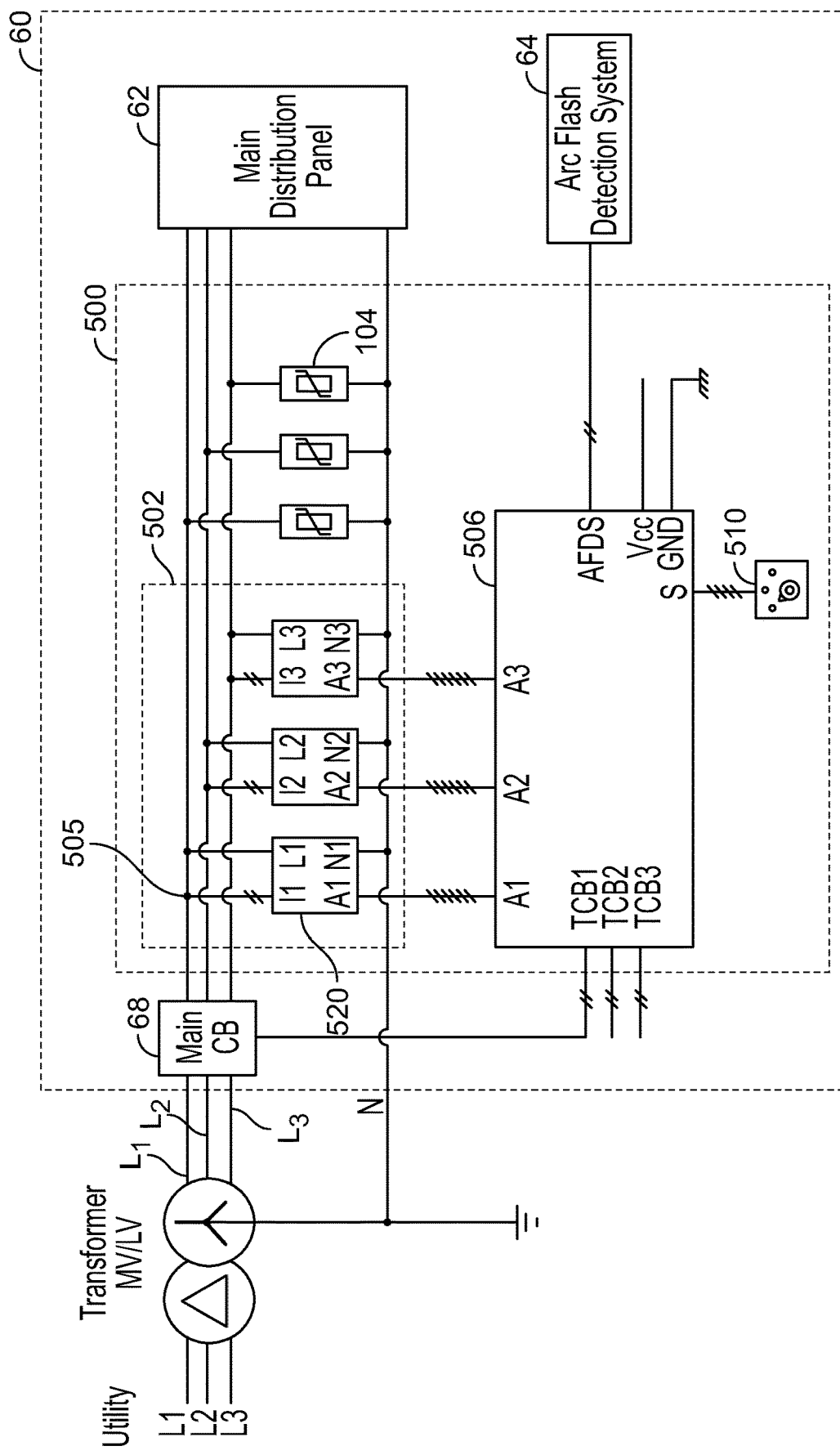
FIG. 24 is a schematic diagram illustrating an arc flash and surge protection system used in protecting equipment according to some embodiments of the present invention.

Reference is now made to FIG. 24, which is a schematic diagram illustrating an arc flash, overvoltage, overcurrent and surge protection system according to some embodiments of the present invention. FIG. 24 may include elements that are described above regarding at least FIG. 5 and thus additional description thereof may be omitted. In some embodiments, the arc flash, overvoltage, overcurrent and surge protection system 500 may protect the electrical system of a wind turbine generator from arc flash, overcurrent and/or surge or lightning events. Some embodiments provide that arc flash, overvoltage, overcurrent and surge protection system 500 includes a crowbar device 502 that is operable to prevent an overvoltage condition by generating a low resistance path from the phase voltage lines L1, L2, L3 to the neutral line N. Some embodiments provide that the crowbar device 502 includes crowbar modules 520 that are each connected between the corresponding phase voltage line L1, L2, L3 and the neutral line N.

Some embodiments provide that each of the crowbar modules 520 may be connected to a current sensor 505 that may monitor the current flow of the corresponding phase line. In some embodiments, the current sensor 505 may be separate from the crowbar module 520 and/or the crowbar device 502 while in some other embodiments the current sensor 505 may be integrated into the crowbar module 520 and/or the crowbar device 502.

Some embodiments include surge protection devices (SPDs) 104. As illustrated, each of the SPDs 104 may be connected between respective ones of L1, L2 and L3, and neutral (N). The use of the SPD 104 may protect the thyristors of the crowbar device 502 during lightning events and/or transient overvoltage conditions, as well as protect other equipment in the installation.

In some embodiments, the crowbar device 502 may be triggered by an arc flash trigger circuit 506. As described above, an arc flash detection system 64 may be configured to detect an arc flash within the switchgear cabinet 60 and provide an arc flash detection signal (AFD) to the arc flash trigger circuit 506. In some embodiments, the arc flash trigger circuit 506 may manage trigger and alarm signals from the crowbar modules 520 and provide the trigger outputs to one or more circuit breakers 68. Some embodiments provide that the arc flash trigger circuit 506 may also provide indications corresponding to the condition of each crowbar module 520 and a cause of triggering ones of the crowbar modules 520.

The arc flash, overvoltage, overcurrent and surge protection system 500 may also include a threshold selector 510 that provides a signal to the arc flash trigger circuit 506 to set the current threshold at which the arc flash trigger circuit 506 causes the crowbar module 520 to actuate.

In use and function, under normal operating conditions, a crowbar module 520 may remain inactive and thus not conduct current between phase lines L1, L2, L3 and the neutral line N. Normal operating conditions may include those in which a phase line voltage is less than a specific threshold. For example, in some embodiments, the specific threshold may be about 1800 V peak, however, such embodiments are non-limiting as the threshold voltage may be more or less than 1800 V.

A crowbar module 520 may be triggered in different ways depending on when a fault condition is detected. For example, the crowbar module 520 may be triggered in a first manner during a start-up period and a second manner during steady state operation.

During a start-up period, such as within about 2 seconds or less from the start of a wind turbine or other generating device, the crowbar module 520 may operate without a power supply from the arc flash trigger circuit 506. In this regard, the crowbar module 520 cannot be triggered by an alarm signal from the arc flash detection system 64 as such system is generally unavailable for operation during a start-up period. In this manner, the crowbar module 520 may be self triggered during the start-up period.

Figure 25:
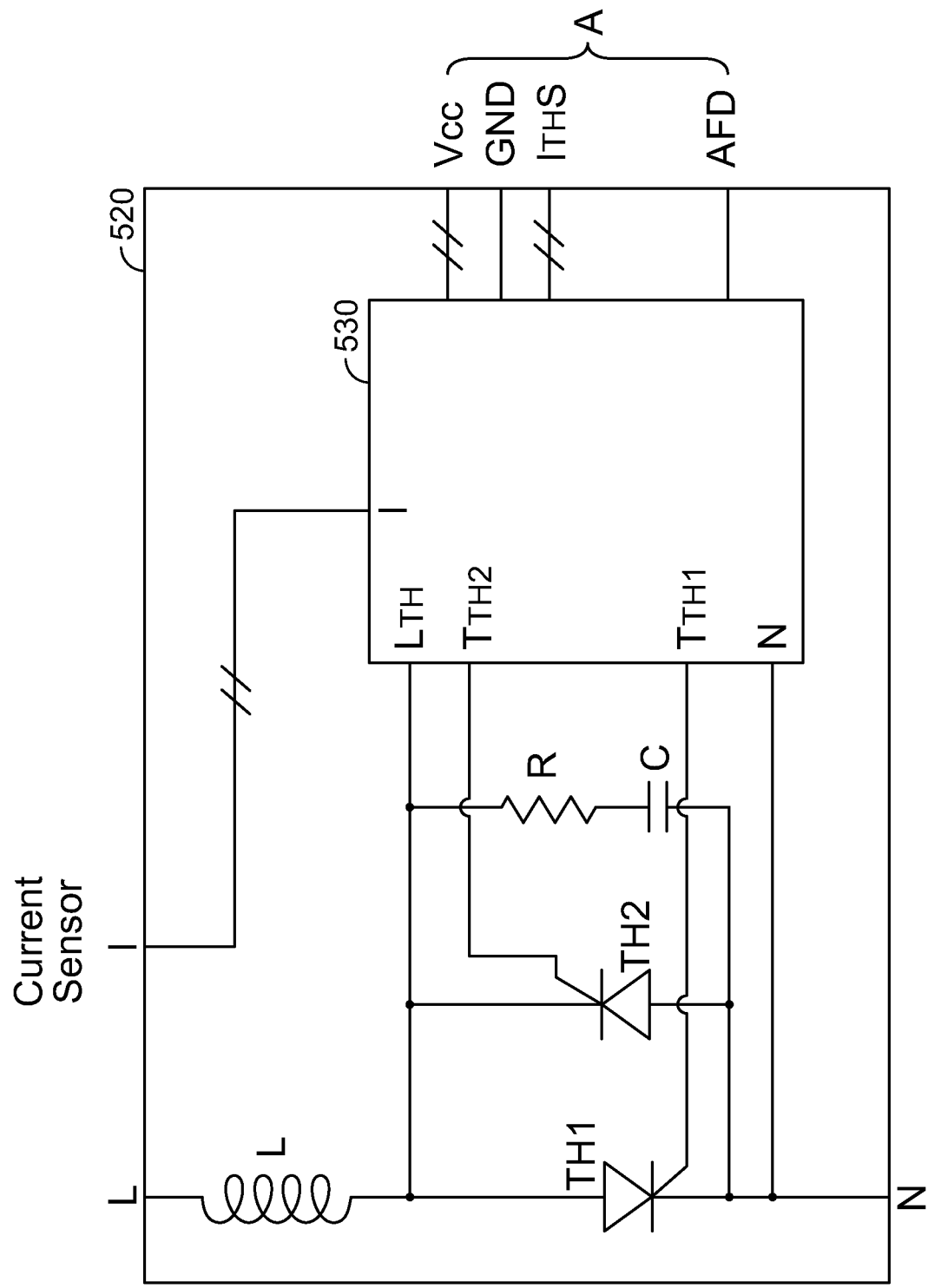
FIG. 25 is a schematic block diagram illustrating a crowbar module as briefly described above regarding FIG. 24, according to some embodiments of the present invention.

Reference is now made to FIG. 25, which is a schematic block diagram illustrating a crowbar module as briefly described above regarding FIG. 24, according to some embodiments of the present invention. The crowbar module 520 may include two thyristors TH1, TH2 that are connected anti-parallel to one another and in series with an inductor L. As used herein, the term "anti-parallel" may refer to a configuration in which components are connected in parallel with one another, but in a complementary arrangement relative to one another. For example, an anode terminal of a first component may be connected to a cathode terminal of a second component while the cathode terminal of the first component is connected to the anode terminal of the second component. In some embodiments, a resistor R and a capacitor C may be connected in series with one another and in parallel with the thyristors TH1, TH2. The crowbar module 520 may further include the crowbar trigger circuit 530 that is configured to provide a self triggering function within the crowbar module 520. During a start-up period, the crowbar trigger circuit 530 may be powered by current received from the current sensor 505. For example, the crowbar module 520 may be self triggered once the current through the phase line is above the threshold current ($I_{TH}$) for a period of more than 2 ms. In such cases only the crowbar module 520 that is connected to the corresponding phase line may be triggered.

Figure 27:
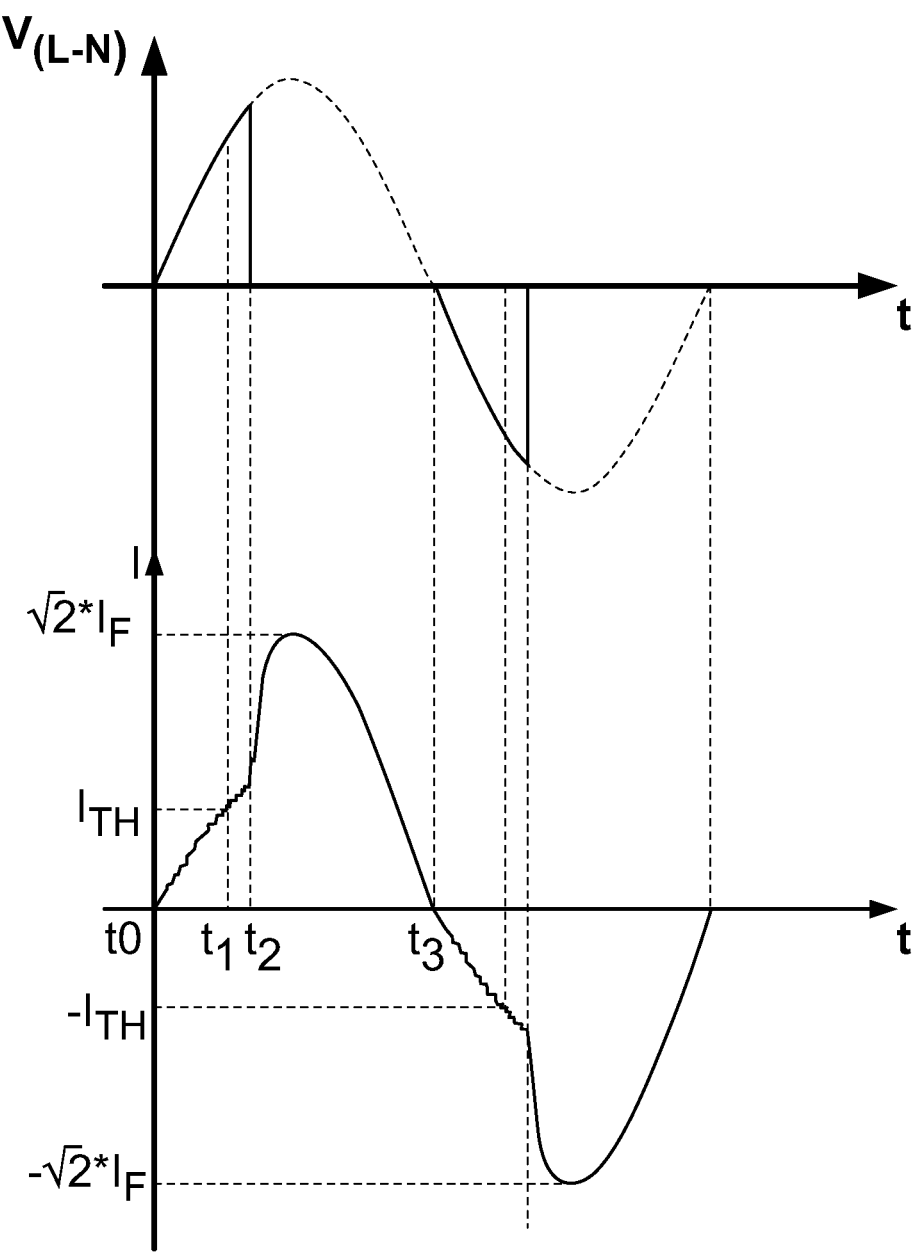
FIG. 27 is a graph illustrating voltage and current values during an overvoltage condition according to some embodiments of the present invention.

Brief reference is now made to FIG. 27, which is a graph illustrating voltage and current values during a fault condition according to some embodiments of the present invention. Continuing with the example above, at time t1 a fault current I reaches the threshold current $I_{TH}$. At time t2, responsive to the fault current I exceeding the threshold current $I_{TH}$ for a specific period of time, crowbar module 520 begins to conduct the fault current thus reducing the voltage for the remaining portion of that cycle at time t3 to about zero volts. If the fault is still present during the second half of the cycle, then the crowbar module 520 again conducts the fault current thus reducing the voltage for the remaining portion that cycle.

Figure 26:
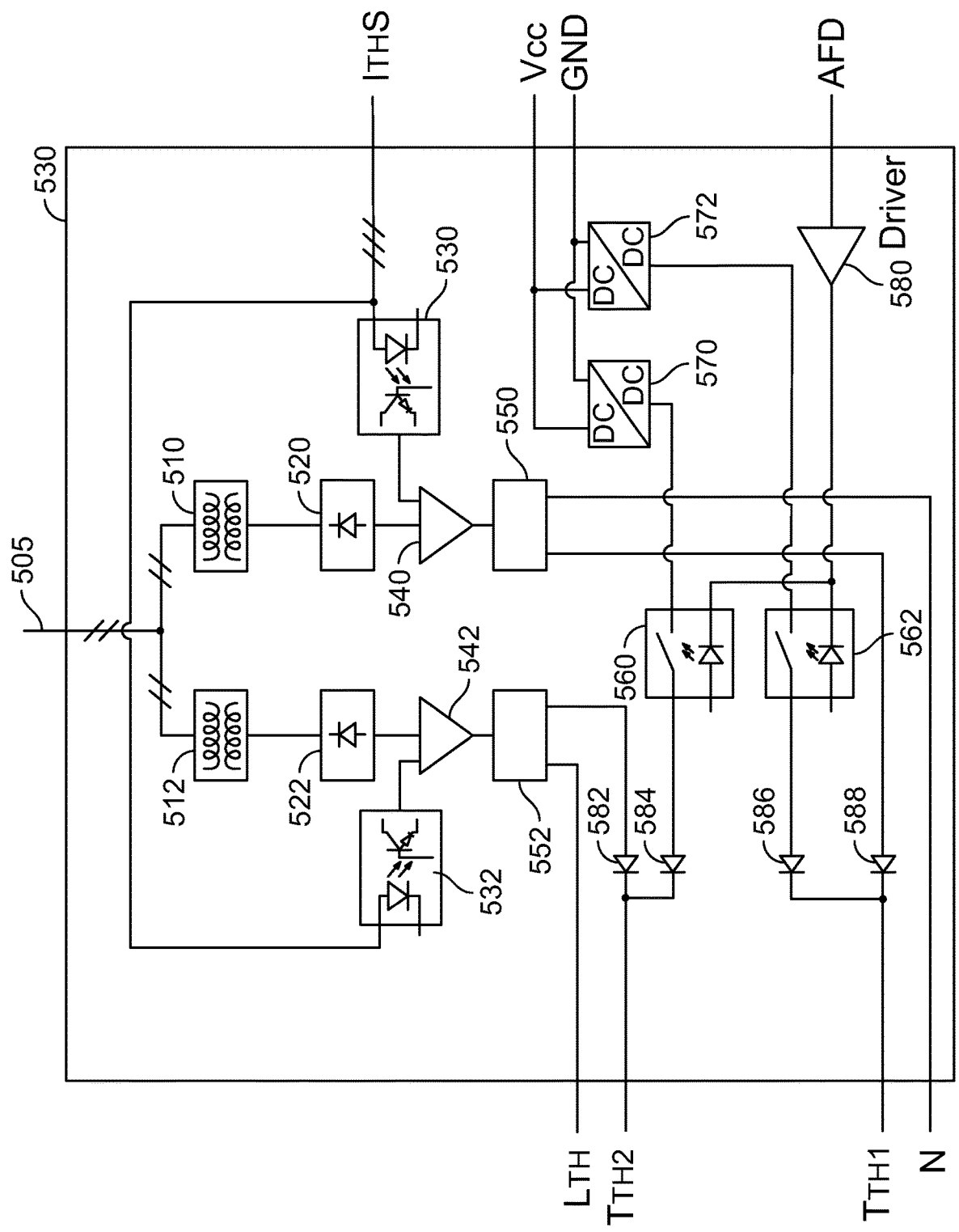
FIG. 26 is a schematic block diagram illustrating a trigger circuit of the crowbar module as briefly described above regarding FIG. 25, according to some embodiments of the present invention.

Referring back to FIG. 25, some embodiments provide that every time the crowbar module 520 is triggered a trigger signal will be provided to the arc flash trigger circuit 506. In some embodiments, the response time of the crowbar module 520, from the time the overcurrent is detected, may be less than about 1 ms. In some embodiments, the response time may be less than about 500 μs. Some embodiments provide that the response time may be about 300 μs Reference is now made to FIG. 26, which is a schematic block diagram illustrating a crowbar trigger circuit of the crowbar module as briefly described above regarding FIG. 25, according to some embodiments of the present invention. The crowbar trigger circuit 530 may receive a current signal from current sensor 505 into one or more step up transformers 510, 512. Since the current signal and the output from the step up transformers 510, 512 may be an alternating current (AC) signal, the outputs from the step up transformers 510, 512 may be received by rectifiers 520, 522, respectively. The rectifiers 520, 522 may generate direct current (DC) signals that correspond to the current signal from the current sensor 505.

The crowbar trigger circuit 530 may also include variable reference signal generators 530, 532 which provide reference signals corresponding to the selected value of $I_{TH}$. Comparators 540, 542 may be configured to receive the DC signals from the rectifiers 520, 522, respectively and reference signals from the variable reference generators 532, 530. Responsive to the one of DC signals from the rectifier exceeding the reference signal, the output state of the comparator changes from high to low, or vice versa. The crowbar trigger circuit 530 may include delay circuits 550, 552 that are configured to receive output signals from the comparators 540, 542. Responsive to receiving a changed output from the comparators 540, 542, the output of the delay circuits 550, 552 will change after a given time delay. By providing the time delay, a false triggering of the thyristors may be prevented and/or reduced. The output from the delay circuits 550, 552 may provide thyristor trigger signals via diodes 588, 582 that cause corresponding ones of the thyristors to turn on into a conducting state.

In some embodiments, the delay circuits 550, 552 may provide different reference voltage signals relative to one another. For example, delay circuit 550 may provide a positive voltage relative to the neutral line for triggering thyristor TH1. Similarly, delay circuit 552 may provide a positive voltage relative to the inductor bottom terminal $L_{TH}$.

While the above describes the self-triggering operation of the crowbar trigger circuit 530 during a start-up period, once the start-up period is over the normal operation of the crowbar module 520 is responsive to the arc flash trigger circuit 506. The crowbar trigger circuit 530 may receive a control voltage Vcc and ground into DC-DC converters 570, 572. In some embodiments, a first DC-DC converter 572 may provide a DC voltage that is capable of triggering the first thyristor TH1 and a second DC-DC converter 570 may provide a DC voltage that is capable of triggering the second thyristor TH2. The crowbar trigger circuit 530 may also receive an arc flash detection signal into a driver 580. In response, the driver 580 may energize optical switches 560 and 562, causing the DC voltages to be applied to the thyristors TH1, TH2 via diodes 584, 588.

Figure 28:
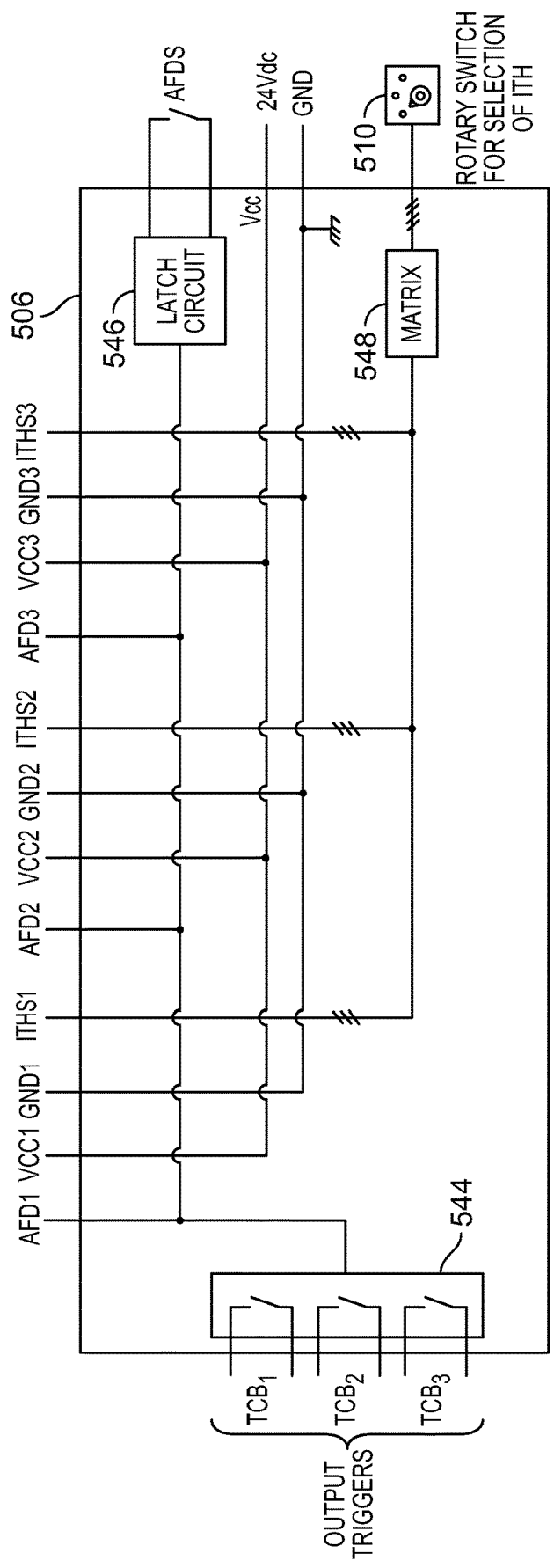
FIG. 28 is a schematic block diagram illustrating an arc flash trigger circuit of the crowbar module as briefly described above regarding FIG. 24, according to some embodiments of the present invention.

Reference is now made to FIG. 28, which is a schematic block diagram illustrating an arc flash trigger circuit of the crowbar module as briefly described above regarding FIG. 24, according to some embodiments of the present invention. The arc flash trigger circuit 506 may receive a ground and an operating voltage Vcc, such as, for example, 24 V DC. A latch circuit 546 may receive and latch an alerted state of an arc flash signal received from an arc flash detection system 64. Some embodiments provide that the arc flash trigger circuit 506 includes a plurality of output triggers 544 that may be used to provide a trip signal to one or more circuit breakers and/or alarms.

In some embodiments, the arc flash trigger circuit 506 include a matrix 548 that is configured to receive a discrete digital input from a threshold selector 510 and to generate a current threshold value based on the value of the received digital input signal. Some embodiments provide that the threshold selector 510 may be a rotary switch that provides a discrete digital signal, such as a two bit binary signal. In such embodiments, different outputs of the threshold selector 510 may be 00, 01, 10 and 11. In some embodiments, the 00 may correspond to a default threshold current value that is used in the self-triggering operation of the crowbar module 520. In this manner, the absence of a signal during a start-up period may correspond to the 00 binary value. By way of example, current threshold values corresponding to the different binary signals may include 6.3 kA, 500 A, 8 kA and 10 kA.

The arc flash trigger circuit 506 may provide a reliable voltage ($V_{CC}$) to the three crowbar modules 520 after the first 2 s from the start-up and may transfer the alarm signal from the arc flash detection system 64 to the three crowbar modules 520 without introducing any delay after the first 2 s from the start-up.

In some example embodiments, the crowbar module 520 may be triggered when the current through the power line is above $I_{TH}$ peak for a period of more than 2 ms. In that case, only the crowbar module 520 that is connected to the corresponding power line is self triggered each time the current goes above $I_{TH}$. In some embodiments, the response time of the crowbar module 520 once triggered is around 300 μs.

Some embodiments provide that the crowbar module 520 may also be triggered when there is an alarm signal from the arc flash detection system 64. In that case, all three crowbar modules 520 are triggered until the main circuit breaker 68 is tripped. Some embodiments provide that the response time of the crowbar module 520 once triggered, is less than 2 ms, and may typically be around 300 μs. Then, the crowbar module 520 will be in continuous trigger for a period of 100 ms.

Some embodiments provide that an arc flash and surge protection system may include a crowbar module as an electronic switch that is connected in series with an energy absorber. In such applications, there TOV (overvoltages) in the system that could damage the equipment. In this regard, a solution to direct part of the energy to a device that will absorb it may be advantageous. Some embodiments include an energy absorber that may be based on multiple metal oxide varistors (MOVs) that are connected in parallel to absorb the TOV event. For example, the voltage may be clamped during such an event by turning on the MOVs to conduct some current when the voltage is increased.

For example, for a 240V system, the peak voltage is 336V. The use of an MOV with a Maximum Continuous Operating Voltage (MCOV) of 250 VAC as close as possible to the nominal voltage may be used such that during normal conditions the MOV will not conduct any current. The MOV may conduct a very small leakage current (~1 mA) at 336V. However, as the voltage is increased, the MOV may start conducting heavily in an effort to limit the voltage. In this case, the voltage cannot exceed the value of 1000V peak.

However, there are power systems that may need protection at much lower voltage levels, for example 700V instead of 1000V. In such cases, to reduce the protection level, MOVs with lower MCOV, i.e. thinner MOV disks, may be used. For example, the MOV may have a MCOV of 150 VAC instead of 250 VAC. In such cases, under normal operation the MOV may conduct a significant current (above a few Amps) that will force it to failure within a limited period of time (depending on the exact level of the conducted current). In this regard, an energy absorber may be used with an MOV having an MCOV of 150 VAC in series with one another.

Figure 29:
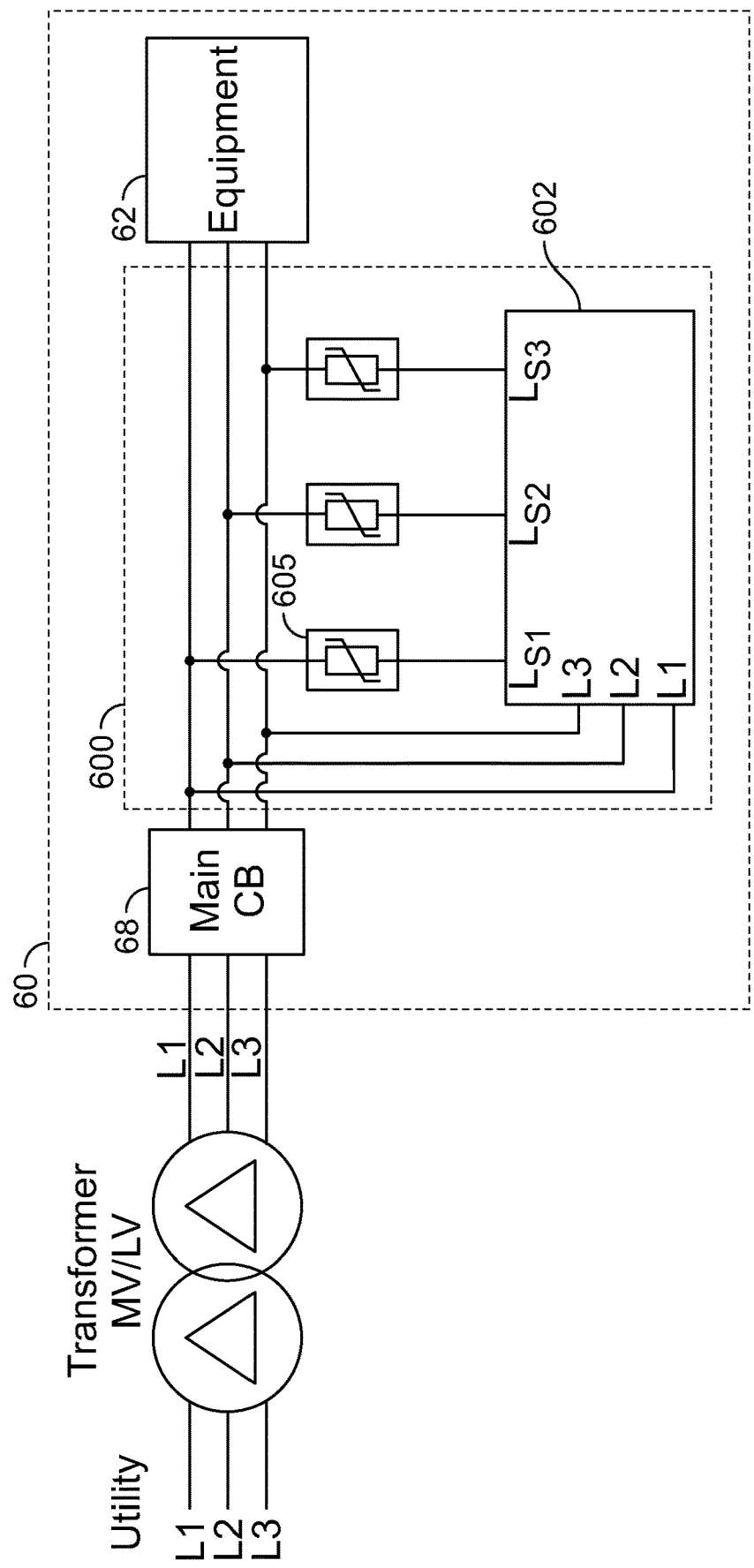
FIG. 29 is a schematic block diagram illustrating a surge protection system used in protecting equipment according to some embodiments of the present invention.

For example, reference is now made to FIG. 29, which is a schematic block diagram illustrating a surge protection system used in protecting equipment according to some embodiments of the present invention. As illustrated, the arc flash, overvoltage, overcurrent and surge protection system 600 may include a crowbar device 602 that is connected between the different phase lines L1, L2, L3. The crowbar device 602 may be connected in series with multiple MOVs 605 that are connected to respective ones of the plurality of phase lines L1, L2, L3.

The crowbar device 602 may function as a switch that will connect the MOVs 605 that function as energy absorbers to the phase lines only when the voltage exceeds a given threshold. In some embodiments, the given threshold is about 600V, however, this is merely a non-limiting example. The MOVs 605 may conduct as much current as necessary to keep the voltage below 700 V. By way of example, based on the voltage-current curve of a 150 VAC MOV, at 700 V, the MOV 605 may conduct 10 kA of current, which exceeds the current that can be produced by the TOV. As such, the phase lines L1, L2, L3 cannot reach the 700V level.

Additionally, when the sinusoidal system voltage declines to cross the zero level, the impedance of the MOV will increase and will limit the current through the thyristor in the crowbar module 602. Then when the current through thyristor in the crowbar device 602 goes below 200 mA, the thyristor will disconnect the energy absorber from the system. This may occur as soon as the system voltage drops below 280V peak approximately.

Figure 30:
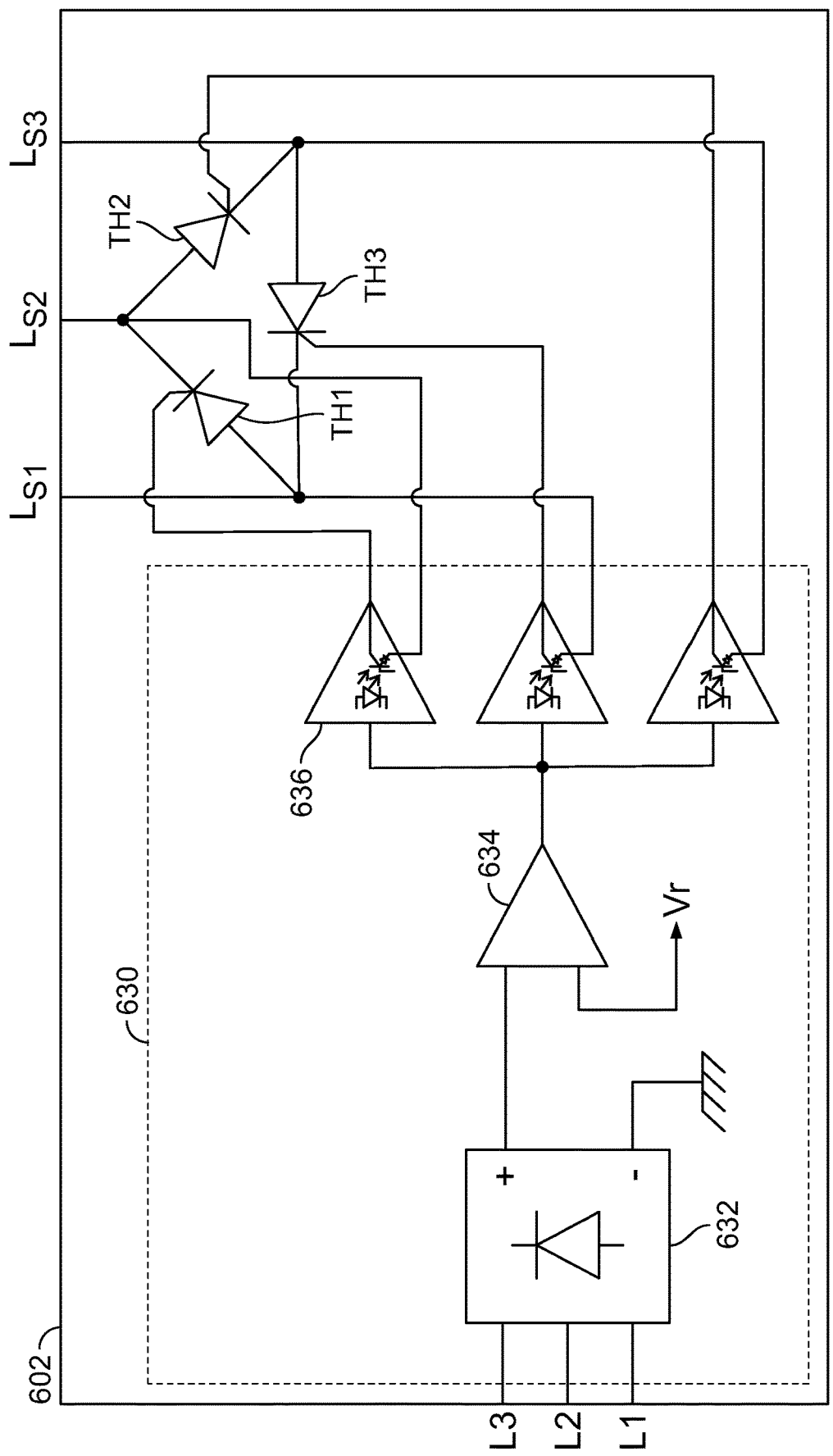
FIG. 30 is a schematic block diagram illustrating a crowbar device as briefly described above regarding FIG. 29, according to some embodiments of the present invention.

Brief reference is now made to FIG. 30, which is a schematic block diagram illustrating a crowbar device as briefly described above regarding FIG. 29, according to some embodiments of the present invention. The crowbar device 602 may include a plurality of thyristors TH1, TH2, TH3 that are connected between the different pairs of the plurality of phase lines L1, L2, L3. A crowbar device trigger circuit 630 may include a rectification circuit 632 that receives three phase AC current from the plurality of phase lines L1, L2, L3 and generates a corresponding DC signal. The crowbar device trigger circuit 630 may include a comparator 634 that receives the DC signal and a reference voltage Vr and compares the two signals. If the DC signal exceeds the reference voltage Vr, then the comparator 634 generates an output to a plurality of trigger drivers 636 that are configured to trigger the thyristors into a conduction mode responsive thereto. Once the DC signal drops below the reference voltage Vr, then the comparator 634 output changes state and the trigger drivers 636 turn off the thyristors.

Figure 31:
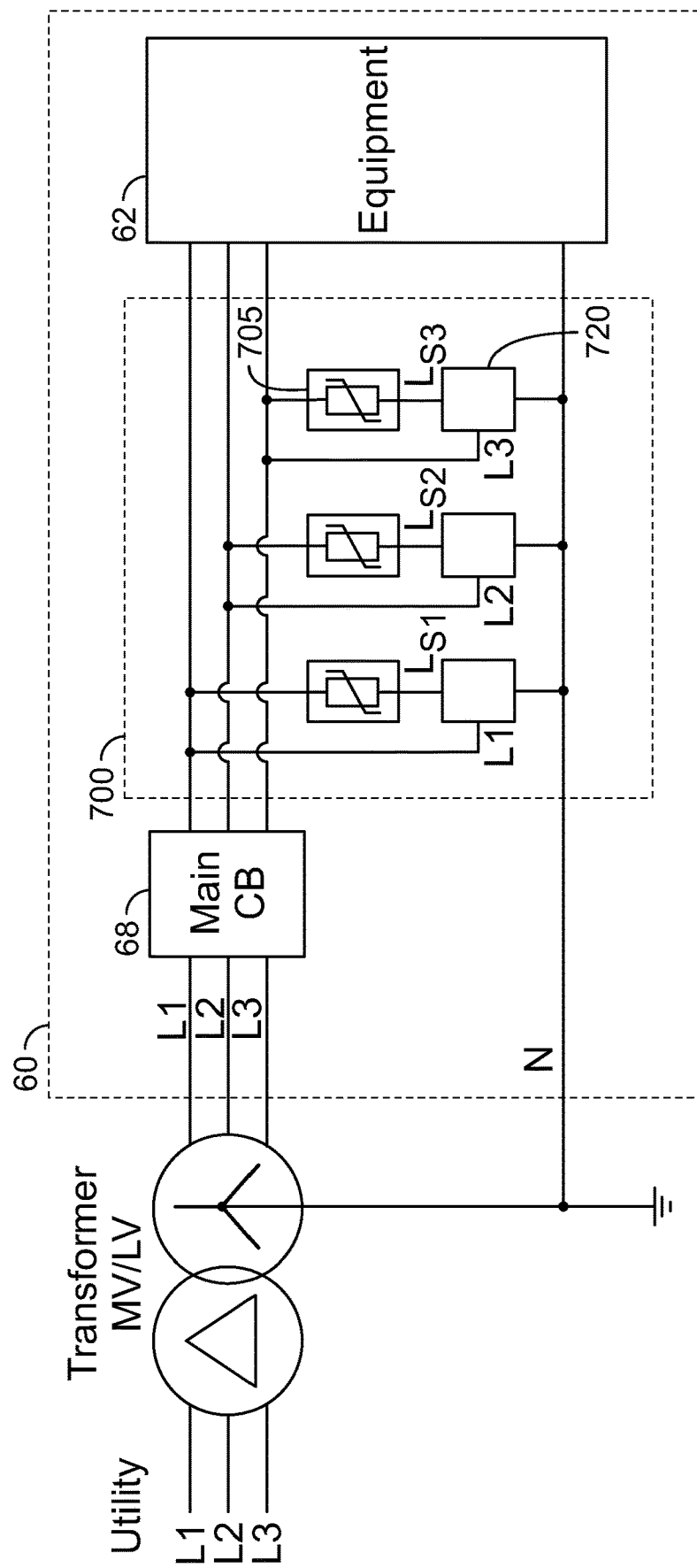
FIG. 31 is a schematic block diagram illustrating a surge protection system used in protecting equipment according to some embodiments of the present invention.
Figure 32:
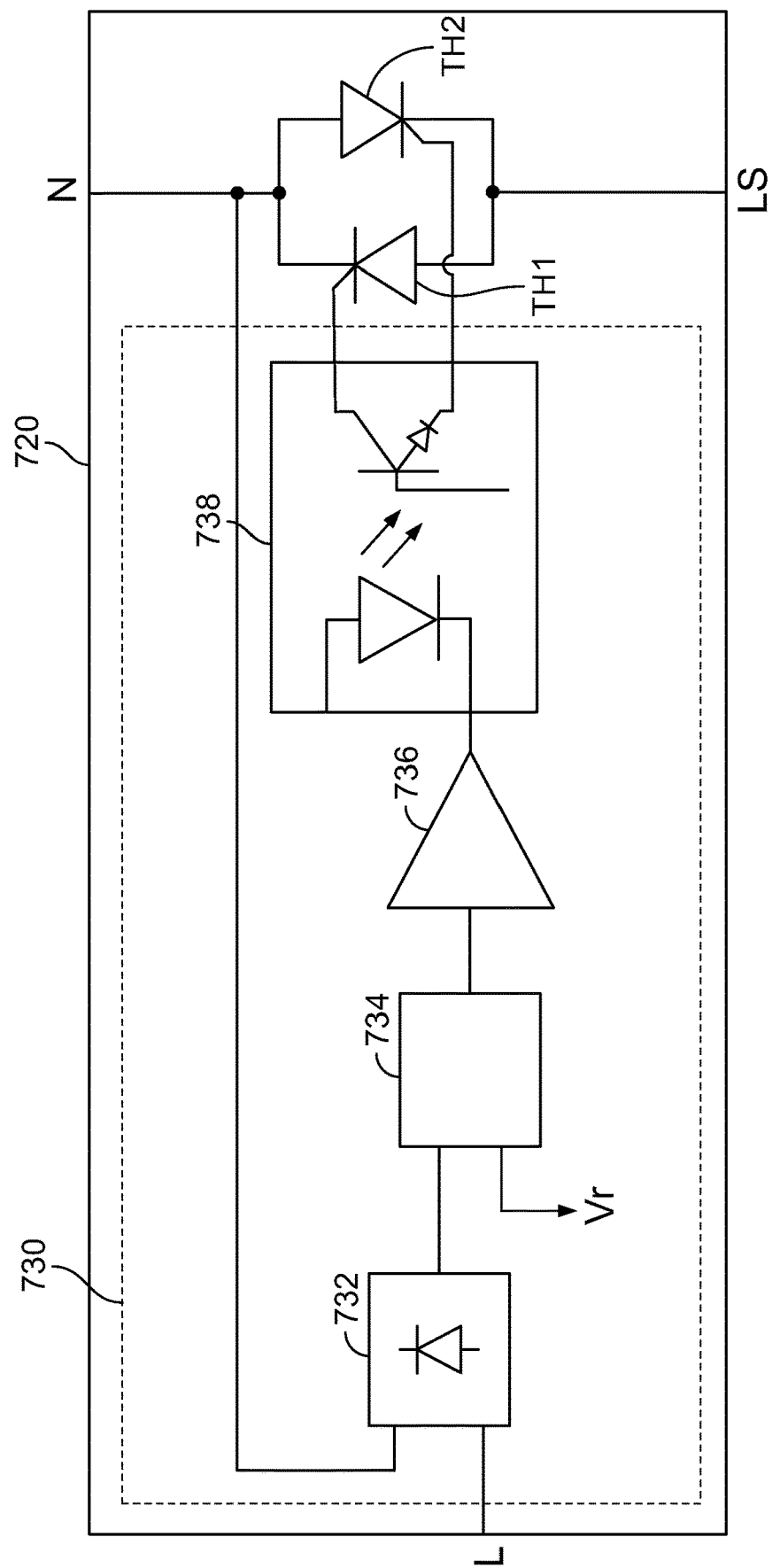
FIG. 32 is a schematic block diagram illustrating a crowbar module as briefly described above regarding FIG. 31, according to some embodiments of the present invention.

Reference is now made to FIG. 31, which is a schematic block diagram illustrating a surge protection system 60 used in protecting equipment according to some embodiments of the present invention. Instead of the line to line connection described above regarding FIGS. 29 and 30, the arc flash, overvoltage, overcurrent and surge protection system may include a crowbar device 700 that includes MOVs 705 that are series connected with crowbar modules 720 from each phase line L1, L2, L3 to neutral N. Since each phase line includes an independent MOV 705/crowbar 720 module combination, then a fault at an individual phase line may be addressed without triggering the MOV 705/crowbar module 720 combination of the other phase lines. Brief reference is now made to FIG. 32, which is a schematic block diagram illustrating a crowbar module as briefly described above regarding FIG. 31, according to some embodiments of the present invention. A crowbar device trigger circuit 730 may include a rectification circuit 732 that receives an AC phase current from a corresponding phase line and generates a corresponding DC signal. The crowbar device trigger circuit 730 may include a comparator 734 that receives the DC signal and a reference voltage Vr signal and compares the two received signals. If the DC signal exceeds the reference voltage Vr, then the comparator 734 generates an output to a trigger driver 736 that then activates an optical isolator 738. The output from the optical isolator 738 is configured to trigger the thyristors TH1, TH2 into a conduction mode responsive thereto. Once the DC signal drops below the reference voltage Vr, then the comparator 734 output changes state and the trigger driver 736 turns off the thyristors TH1, TH2.

Figure 33:
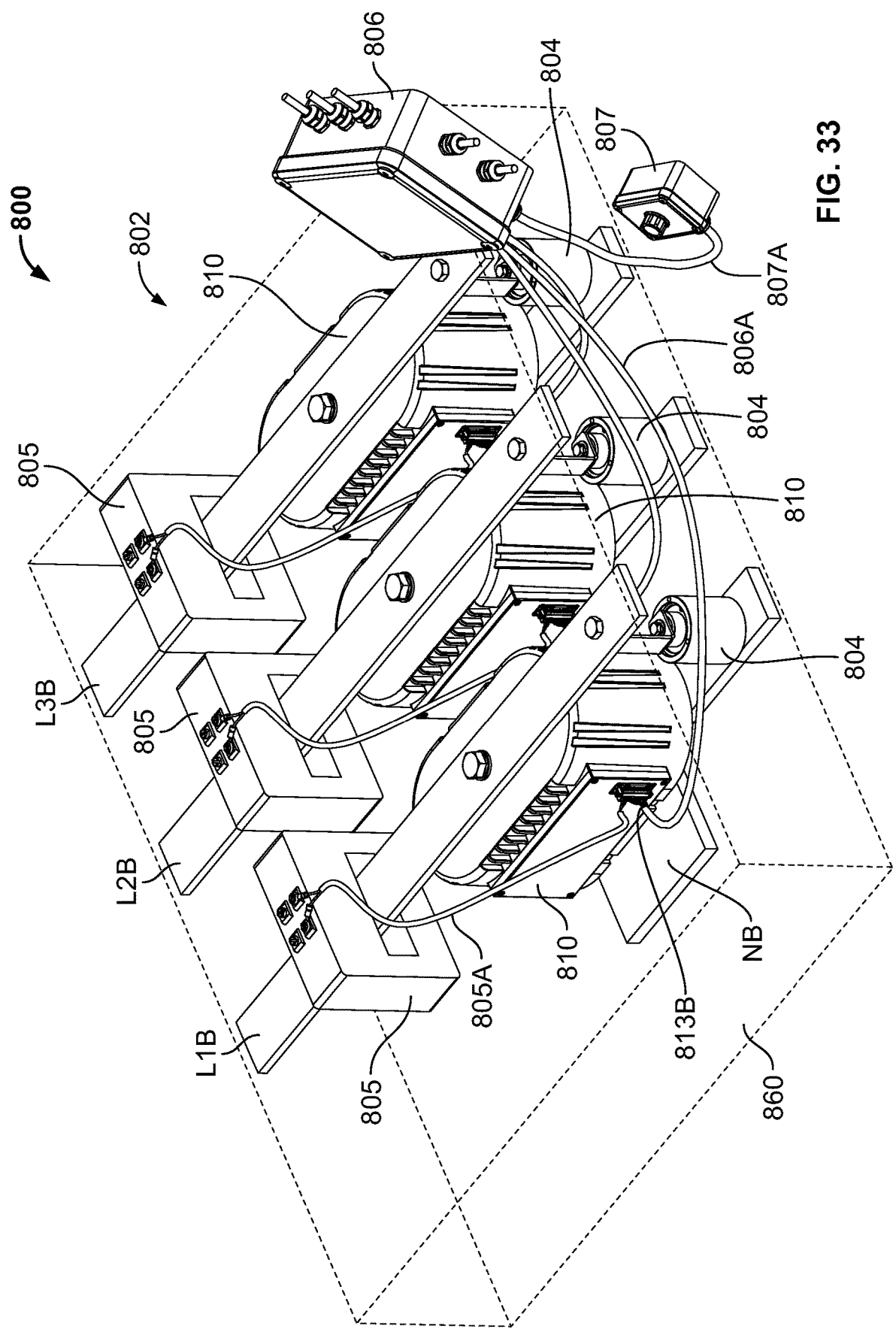
FIG. 33 is a top perspective view of a crowbar system according to some embodiments of the present invention.
Figure 34:
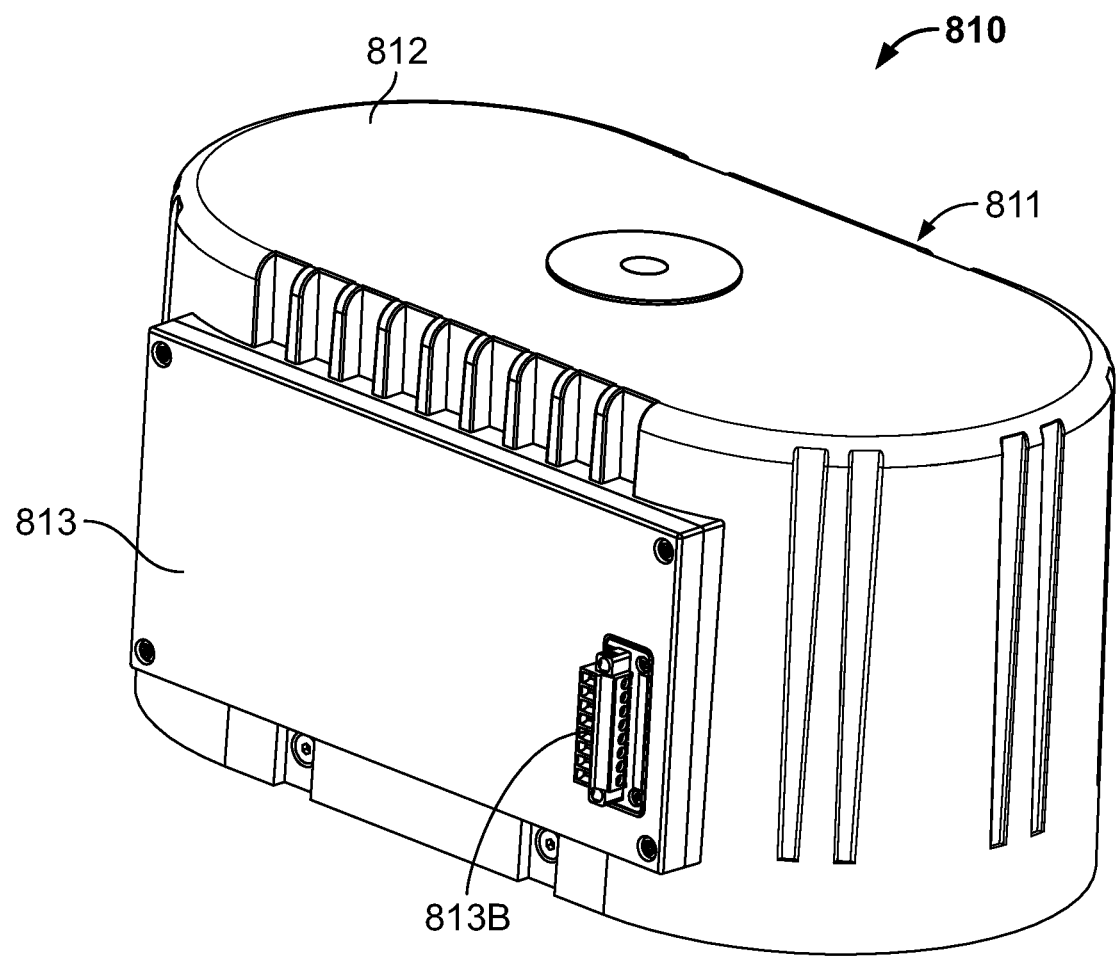
FIG. 34 is a top perspective view of a crowbar module forming a part of the crowbar system of FIG. 33.
Figure 35:
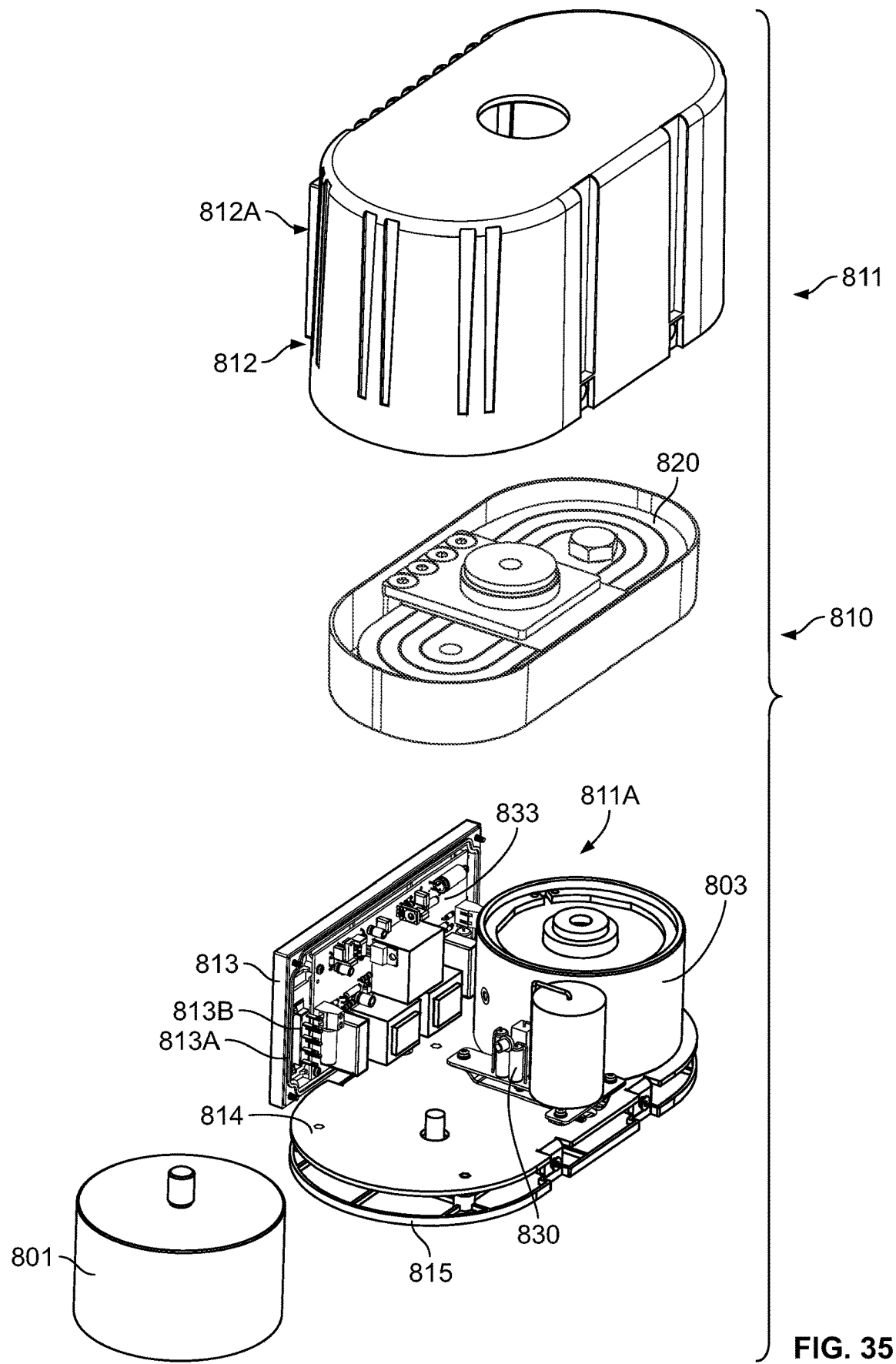
FIG. 35 is a fragmentary, exploded, top perspective view of the crowbar module of FIG. 33.

With reference to FIGS. 33-35, a crowbar system 800 according to further embodiments of the invention is shown therein. The crowbar system 800 includes a crowbar device 802 (corresponding to the crowbar device 502 of FIG. 24), a trigger and alarm interface circuit unit 806 (corresponding to the trigger circuit 506 of FIG. 24), and a remote threshold selector switch 807 (corresponding to the threshold selector 510 of FIG. 24).

With reference to FIG. 33, the crowbar device 800 includes three crowbar modules 810, three SPDs 804, a neutral conductor NB, line conductors L1B, L2B, L3B, and three current sensors 805. The crowbar device 800 further includes a crowbar device housing 860 (shown in dashed lines) within which the crowbar modules 810, SPDs 804, conductors NB, L1B, L2B, L3B, and current sensors 805 are mounted, disposed and encased.

In some embodiments, the trigger and alarm interface circuit unit 806 and the remote selector switch 807 are located outside of the crowbar device housing 860. For example, the trigger and alarm interface circuit unit 806 may be located elsewhere in an electrical service cabinet containing the crowbar device 802 and the lines L1, L2, L3 so that the trigger and alarm interface circuit unit 806 is better positioned for operator access or to detect activity in the cabinet. The remote selector switch 807 may be located a substantial distance (e.g., at least 20 feet) from the crowbar device 802. For example, the crowbar device 802 may be located high above the ground on a tower while the remote selector switch 807 is mounted near ground level to enable convenient access by an operator.

The crowbar modules 810 correspond to the crowbar modules 520 of FIG. 24. Each of the crowbar modules 810 is electrically and mechanically coupled to the neutral conductor NB (corresponding to neutral line N) and a respective one of the line conductors L1B, L2B, L3B (corresponding to the lines L1, L2, L3).

A respective SPD 804 (corresponding to the SPDs 104 of FIG. 24; e.g., an MOV-based SPD) is mounted between and electrically connects the associated line conductor L1B, L2B, L3B and the neutral conductor NB in parallel to the associated crowbar module 810.

The current sensors 805 correspond to the current sensors 505. Each of the current sensors 805 is operatively mounted on a respective one of the line conductors L1B, L2B, L3B and has an output signal wire 805A connected to the associated crowbar module 810.

Each crowbar module 810 is also electrically connected by an electrical cable 806A to the trigger and alarm interface circuit unit 806. The remote selector switch 807 is in turn electrically connected to the interface circuit unit 806 by an electrical cable 807A.

The crowbar modules 810 may be constructed and operate generally as described herein with regard to the crowbar module 210, except as described below. Each module 810 may include a filler material corresponding to the filler material 218; however, this filler material is not shown in FIG. 35.

With reference to FIGS. 34 and 35, the crowbar module 810 includes a module housing 811 defining an enclosed chamber 811A. The module housing 811 includes an outer cover 812, a removable cover or back plate 813, and a base plate 815. The outer cover 812 is provided with a rear side opening 812A. The opening 812A is closed and environmentally sealed by a removable cover or back plate 813. The interface between the back plate 813 and the cover 812 about the opening may be hermetically sealed by a rubber seal 813A. In some embodiments, the chamber 811A is hermetically sealed or moisture sealed.

With reference to FIG. 35, crowbar units 801, 803 corresponding to the crowbar units 201, 202 and a circuit board assembly 830 corresponding to the circuit board assembly 230 are disposed in the chamber 811A between a coil assembly 820 (corresponding to coil assembly 220) and a base busbar 814.

The circuit board assembly 830 may include a snubber circuit corresponding to the snubber circuit of the circuit board assembly 230.

An internal circuit board assembly 833 is secured to the back plate 813 in the chamber 811A. The internal circuit board assembly 833 may include the crowbar self trigger circuit 530 of the crowbar module 520 of FIGS. 25 and 26. Advantageously, placing the trigger circuit 530 in the crowbar module housing 811 in close proximity to the thyristors TH1, TH2 can reduce or prevent induced noise on the cables that might otherwise trigger the thyristors TH1, TH2 accidentally.

An electrical connector 813B is mounted on the back plate 813 to electrically connect the wires 805A, 806A to the circuit board assembly 830, the circuit board assembly 833, and the thyristors of the crowbar units 801, 803. The electrical connector 813B may be environmentally sealed.

Various inventive aspects as disclosed herein may be used independently of one another. For example, a crowbar unit 201 including a cable gland 280 as described may be used without the unitarily assembling the crowbar unit 201 with a coil, busbars, a snubber circuit, and or another crowbar unit.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protection system comprising:
 a crowbar device that is coupled to and between a plurality of phase lines and is configured to prevent an overvoltage condition by selectively generating a low resistance current path between the plurality of phase lines;
 a plurality of surge protection devices that are connected to respective ones of the plurality of phase lines and to the crowbar device and that are configured to protect the equipment during an overvoltage condition by conducting a limited amount of current that corresponds to the overvoltage condition; and
 an external trigger and alarm interface circuit electrically connected to the crowbar device.

2. The surge protection system according to claim 1, wherein ones of the plurality of surge protection devices each comprise:
 a first terminal that is connected to a corresponding one of the plurality of phase lines; and
 a second terminal that is connected to the crowbar device, wherein the crowbar device comprises:
 a plurality of phase terminals that are connected to the plurality of surge protection devices; and
 a plurality of thyristors that are connected between different pairs of the phase terminals.

3. The surge protection system according to claim 2, wherein the crowbar device further comprises a crowbar trigger circuit that is operable to generate thyristor trigger signals to the plurality of thyristors responsive to detecting a fault condition on the phase lines.

4. The surge protection system according to claim 3, wherein the crowbar trigger circuit comprises:
- a rectification circuit that generates a direct current (DC) signal corresponding to voltages between the plurality of phase lines;
- a comparator that compares the DC signal from the rectification circuit to a reference signal; and
- a plurality of isolation drivers that receive a comparator output, and, responsive to the comparator output indicating that the DC signal exceeds the reference signal, generates a trigger signal that turns on the plurality of thyristors.

5. The surge protection system according to claim 1, wherein the surge protection devices comprise metal oxide varistors.

6. The surge protection system of claim 2, further comprising:
- a plurality of snubber circuits electrically connected in parallel with the plurality of thyristors, respectively, between the different pairs of the phase terminals.

7. The surge protection system of claim 6, further comprising:
- a plurality of inductors electrically connected in series with the parallel combinations of the plurality of thyristors and the plurality of snubber circuits, respectively, between the different pairs of the phase terminals.

8. The surge protection system of claim 7, wherein each of the plurality of inductors comprises:
- an electrically conductive coil member, the coil member including a spirally extending coil strip defining a spiral coil channel; and
- an electrically insulating casing including a separator wall portion that fills the coil channel.

9. The surge protection system of claim 1, further comprising:
- a housing that includes a cover defining an enclosed cavity;
- wherein the crowbar device and the plurality of surge protection devices are within the housing; and
- wherein the housing includes a filler material that at least partially fills a volume enclosed cavity not occupied by the crowbar device and the plurality of surge protection devices.

10. The surge protection system of claim 1, wherein the crowbar device is electrically connected to an external current sensor.

11. A crowbar system comprising:
- a crowbar module including:
  - a module housing;
  - a thyristor disposed in the module housing;
  - a coil disposed in the module housing;
  - a trigger circuit disposed in the module housing; and
  - a snubber circuit disposed in the module housing; and
- an external trigger and alarm interface circuit electrically connected to the crowbar module.

12. The crowbar system of claim 11, wherein the crowbar module is coupled to and between a plurality of phase lines and is configured to prevent an overvoltage condition by selectively generating a low resistance current path between the plurality of phase lines.

13. The crowbar system of claim 12, wherein the thyristor is connected between a pair of the plurality of phase lines.

14. The crowbar system of claim 12, wherein the trigger circuit is configured to generate a thyristor trigger signal responsive to detecting a fault condition on the pair of the plurality of phase lines, the thyristor being responsive to the thyristor trigger signal.

15. The crowbar system of claim 12, wherein the trigger circuit comprises:
- a rectification circuit that generates a direct current (DC) signal corresponding to voltages between the plurality of phase lines;
- a comparator that compares the DC signal from the rectification circuit to a reference signal; and
- a plurality of isolation drivers that receive a comparator output, and, responsive to the comparator output indicating that the DC signal exceeds the reference signal, generates a trigger signal that turns on the plurality of thyristors.

16. The crowbar system of claim 11, wherein the crowbar module is electrically connected to an external current sensor.

17. The crowbar system of claim 11, wherein the external trigger and alarm interface circuit is configured to provide a connection between the trigger circuit and a monitoring location.

18. The crowbar system of claim 17, further comprising:
- a microcontroller connected between the trigger circuit and the external trigger and alarm interface circuit;
- wherein the microcontroller is configured to send an alarm signal and/or supervisory control and data acquisition (SCADA) information to the monitoring location.

19. The crowbar system of claim 18, wherein the monitoring location comprises a remote visual and/or audible annunciator.

20. A surge protection system comprising:
- a crowbar device that is coupled to and between a plurality of phase lines and is configured to prevent an overvoltage condition by selectively generating a low resistance current path between the plurality of phase lines; and
- a plurality of surge protection devices that are connected to respective ones of the plurality of phase lines and to the crowbar device and that are configured to protect the equipment during an overvoltage condition by conducting a limited amount of current that corresponds to the overvoltage condition;
- wherein ones of the plurality of surge protection devices each comprise:
  - a first terminal that is connected to a corresponding one of the plurality of phase lines; and
  - a second terminal that is connected to the crowbar device,
- wherein the crowbar device comprises:
  - a plurality of phase terminals that are connected to the plurality of surge protection devices; and
  - a plurality of thyristors that are connected between different pairs of the phase terminals;
- wherein the crowbar device further comprises a crowbar trigger circuit that is operable to generate thyristor trigger signals to the plurality of thyristors responsive to detecting a fault condition on the phase lines; and
- wherein the crowbar trigger circuit comprises:
  - a rectification circuit that generates a direct current (DC) signal corresponding to voltages between the plurality of phase lines;

a comparator that compares the DC signal from the rectification circuit to a reference signal; and a plurality of isolation drivers that receive a comparator output, and, responsive to the comparator output indicating that the DC signal exceeds the reference signal, generates a trigger signal that turns on the plurality of thyristors.

\* \* \* \* \*